(12) United States Patent
Yamamoto et al.

(10) Patent No.: US 6,340,209 B1
(45) Date of Patent: Jan. 22, 2002

(54) VEHICLE BODY ACCELERATION SENSOR FOR SEAT BELTS

(75) Inventors: Kazuo Yamamoto; Yoshito Hashimoto; Masanao Fukunaga, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/508,453

(22) PCT Filed: Sep. 11, 1998

(86) PCT No.: PCT/JP98/04123

§ 371 Date: Mar. 10, 2000

§ 102(e) Date: Mar. 10, 2000

(87) PCT Pub. No.: WO99/14084

PCT Pub. Date: Mar. 25, 1999

(30) Foreign Application Priority Data

| Sep. 12, 1997 | (JP) | 9-248759 |
| Oct. 16, 1997 | (JP) | 9-283886 |
| Dec. 10, 1997 | (JP) | 9-340242 |
| Dec. 24, 1997 | (JP) | 9-355344 |
| Dec. 24, 1997 | (JP) | 9-355345 |
| Mar. 6, 1998 | (JP) | 10-65602 |
| Mar. 16, 1998 | (JP) | 10-65603 |
| Apr. 6, 1998 | (JP) | 10-93390 |

(51) Int. Cl.[7] ............................................. B60R 21/00
(52) U.S. Cl. ........................................ 297/478; 297/480
(58) Field of Search ................................ 297/478, 480, 297/216.1, 216.13

(56) References Cited

U.S. PATENT DOCUMENTS

| 5,660,444 A | * | 8/1997 | Thomas |
| 5,716,102 A | * | 2/1998 | Ray et al. |
| 5,839,790 A | * | 11/1998 | Doty |
| 5,882,084 A | * | 3/1999 | Verellen et al. |

FOREIGN PATENT DOCUMENTS

| JP | 1-202553 | 8/1989 | .......... B60R/22/40 |
| JP | 3-121058 | 12/1991 | .......... B60R/22/40 |
| JP | 9-506714 | 6/1997 | .......... G01P/15/02 |
| JP | 9-193742 | 7/1997 | .......... B60R/22/40 |
| JP | 10-175511 | 6/1998 | .......... B60R/22/40 |
| JP | 10-181526 | 7/1998 | .......... B60R/22/40 |

* cited by examiner

*Primary Examiner*—Milton Nelson, Jr.
(74) *Attorney, Agent, or Firm*—Sughrue Mion, PLLC

(57) ABSTRACT

A vehicle body acceleration sensor suitable for being used in a retractor attached to a backrest. A vehicle body acceleration sensor (32) for use with a seat belt having a transmission device (39) which pivots a sensor case (30) about its pivot axis S according to reclining angle of a backrest (62) in synchronization with reclining action of the backrest (62) so as to retain an inertial body support surface (30b) of the sensor case (30) in an appropriate orientation. The transmission device (39) has a slide member (53) disposed in a seat portion (63), a cam plate (54) which causes to move the slide member (53) back and forth within only a pivotable range of the sensor case (30), and a wire (56) for transmitting the movement of the slide member (53) to the sensor case (30).

18 Claims, 71 Drawing Sheets

VEHICLE BODY ACCELERATION SENSOR FOR SEAT BELTS

TECHNICAL OF THE INVENTION

The present invention relates to a vehicle body acceleration sensor for use with a seat belt, and more particularly, to an improvement in a vehicle body acceleration sensor for use with a seat belt which is used for a seat belt retractor attached to a backrest of a reclining seat of a vehicle and which activates lock means for preventing withdrawal of a webbing in the event of an emergency.

BACKGROUND ART

For a seat belt apparatus for safely retaining a vehicle occupant on his seat, there has conventionally been used an emergency lock type retractor which has an emergency lock mechanism for physically locking a retractor through use of inertia sensing means for responding to urgent acceleration, collision, or deceleration and which safely and effectively restrains the occupant.

Inertia sensing means used for such an emergency lock type retractor includes a vehicle body acceleration sensor for sensing the acceleration of the vehicle body. For example, the vehicle body acceleration sensor is constructed such that, when an inertial body is moved as a result of collision or inclination of the vehicle body, a sensor arm provided on top of the inertial body is pivoted, thereby activating lock means for locking rotation in the direction in which the webbing is drawn-out from a take-up shaft around which a webbing is wound.

Recently, there have been proposed various types of vehicle body sensors for use with a seat belt, in which a retractor such as that mentioned previously is provided within a backrest of a reclining seat and which, even when the backrest is titled, can be activated in the same way as when the backrest is not reclined.

For example, like vehicle body acceleration sensors described in German Patent Publication No. 4,032,157, U.S. Pat. No. 4,978,087, and Japanese Patent Unexamined Publications No. Hei.1-202553 and No. Hei.3-148350, there have already been proposed various types of vehicle body acceleration sensors which are provided with transmission means, such as a flexible shaft or a gear device, for controlling the angle of a sensor case by pivotal movement of the sensor case about its pivot in synchronization with reclining action of a backrest, in such a way that an inertial body support surface formed on the sensor case is retained in an appropriate position with respect to the sensor case pivotally supported by a retractor base regardless of reclining angle of the backrest, or are provided with rotary drive means such as a servo motor which rotatively actuates the sensor case according to a reclining angle of the backrest.

By means of the seat belt apparatus having such a structure, even when the backrest is inclined or slid between the full forward and full back positions, the positional relationship between a shoulder belt of the webbing and a backrest remains unchanged, thereby ensuring superior restraining performance.

In a case where the sensor case is rotatively actuated by means of a servo motor, or the like, according to the reclining angle of the backrest, use of a motor adds to component costs, results in an increase in the number of components, and renders the structure of the seat belt apparatus complicated, thus leading to an increase in manufacturing costs.

In a case where the sensor case is rotated, through use of the transmission means, about its pivot in synchronization with the reclining action of the backrest according to the reclining angle of the backrest, the pivotable range of the sensor case is set so as to correspond to an optimum working range of the retractor which is attached to the backrest and is capable of appropriately restraining the occupant by means of webbing. However, the optimum working range of the retractor generally constitutes a portion of the reclining range of the backrest and is narrower than the reclining range. For this reason, in a case where the sensor case is rotatively actuated by means of transmission means—such as a flexible shaft or a gear device—interposed between the sensor case and seat hardware, when the backrest is reclined beyond the optimum working range of the retractor, the sensor case is actuated by way of the transmission means, thereby resulting in interference with another component or straining and damaging the sensor case.

To prevent such a problem, the angle at which the backrest is reclined is limited so as to match the pivotable range of the sensor case, with the result that the range of inclination of the backrest becomes narrower than that of a seat having not a built-in retractor, thereby rendering a vehicle seat very difficult to use.

In contrast, in a case where the sensor case is arranged so as to be able to pivot in synchronization with the reclining action of the backrest even when the backrest in reclined beyond the optimum working range of the seat belt, a large space is required for movement of the sensor case, thereby rendering the retractor large.

An angle sensing means provided in the transmission means for sensing the inclination of the backrest includes an angle sensing means for sensing the inclination of the backrest by sensing relative rotation between a member disposed in a seat and a member which is provided on the side of a recliner mechanism (a hinge mechanism of the seat) facing the backrest and which pivots together with the backrest.

Since the angle sensing means pivots in agreement with the pivotal movement of the backrest, the pivot of the angle sensing means is desirably placed in line with the reclining pivot of the backrest. As shown in FIG. 78, if a reclining pivot O of the backrest does not match a pivot Q of the angle sensing means, a pivotable angle $\theta$ of the backrest does not match a pivotable angle $\alpha$ of the angle sensing means at, e.g., a point V (a position where the angle sensing means is mounted on the backrest), thereby rendering impossible correct adjustment of the orientation of the sensor case.

In order to cause the reclining pivot of the backrest to coincide with the pivot of the angle sensing means, the reclining mechanism on which the angle sensing means is mounted and the angle sensing means must be manufactured with a high degree of dimensional precision. Both the reclining mechanism and the angle sensing means require a large number of components, thereby becoming expensive.

Accordingly, the object of the present invention is to provide a vehicle body acceleration sensor to be disposed in a retractor mounted on a backrest, and more particularly, to provided a vehicle body acceleration sensor for use with a seat belt which is capable of reliably and stably sensing the acceleration of a vehicle body regardless of the reclining angle of the backrest and which enables a reduction in manufacturing costs by employment of a simple mechanism.

DISCLOSURE OF THE INVENTION

The foregoing object of the present invention is achieved by a vehicle body acceleration sensor for use with a seat belt comprising:

a sensor case which is supported in a movable manner by a retractor base mounted on a backrest of a reclining vehicle seat;

a sensor arm which is pivotally mounted on the sensor case or the retractor base so as to move lock means between a first position where the lock means is actuated and a second position where the lock means becomes inoperative, the lock means preventing a take-up shaft, around which a webbing is wound, from rotating in a direction in which the webbing is drawn-out;

an inertial body which moves in relation to an inertial body support surface of the sensor case upon receipt of a velocity change of greater than a predetermined value, thereby moving the sensor arm to the first position; and transmission means for moving the sensor case in synchronization with reclining action of the backrest according to a reclining angle of the backrest so that the inertial body support member is held at an appropriate orientation regardless of reclining angle of the backrest, wherein the lock means is actuated by means of movement of the inertial body caused when a predetermined acceleration acts on the vehicle body.

By means of the foregoing structure of the sensor case, when the inclination of the backrest is changed, the inertial body support surface is held at an appropriate position by means of transmission means which is actuated in synchronization with reclining action of the backrest. The vehicle body acceleration sensor can properly operate even when the backrest is in another reclined position and can sense the acceleration of the vehicle body without fail.

The object of the present invention is also achieved by a vehicle body acceleration sensor for use with a seat belt including:

a sensor case which is supported in a movable manner by a retractor base mounted on a backrest of a reclining vehicle seat;

a sensor arm which is pivotally mounted on the sensor case or the retractor base so as to move lock means between a first position where the lock means is actuated and a second position where the lock means becomes inoperative, the lock means preventing a take-up shaft, around which a webbing is wound, from rotating in a direction in which the webbing is drawn-out;

an inertial body which moves in relation to an inertial body support surface of the sensor case upon receipt of a velocity change of greater than a predetermined value, thereby moving the sensor arm to the first position; and transmission means for moving the sensor case in synchronization with reclining action of the backrest according to a reclining angle of the backrest so that the inertial body support member is held in an appropriate orientation regardless of reclining angle of the backrest, wherein the lock means is actuated by means of movement of the inertial body caused when a predetermined acceleration acts on the vehicle body, the vehicle body acceleration sensor being characterized by that the transmission means includes a synchronous movement cancelation mechanism capable of canceling the movement of the sensor case which is in synchronization with the reclining action of the backrest.

By means of the foregoing structure of the sensor case, when the inclination of the backrest is changed, the inertial body support surface is held at an appropriate position by means of transmission means which is actuated in synchronization with reclining action of the backrest. The vehicle body acceleration sensor can properly operate even when the backrest is in another reclined position and can sense the acceleration of the vehicle body without fail.

When the backrest is reclined beyond the optimum working range of the seat belt, the synchronous movement cancelation mechanism can cancel the pivotal movement of the sensor case in synchronization with the reclining action of the backrest. Therefore, the reclining angle of the backrest is prevented from being limited by the pivotable range of the sensor case. Further, the sensor case is prevented from being unnecessarily rotated in synchronization with the reclining action of the backrest, thereby preventing the retractor from becoming bulky.

In this case, the pivotable range of the sensor case is set so as to become slightly larger than the reclining range of the backrest within the optimum working range of the seat belt, so as to prevent damage to the sensor case.

More preferably, the transmission means comprises a slide member movably disposed in a seat portion of the reclining seat;

a cam plate which causes the slide member to advance or recede within only the pivotable range of the sensor case according to the reclining angle of the backrest; and a flexible transmission member, one end of which is connected to the slide member and the other end of which is connected to the sensor case and which transmits the movement of the slide member to the sensor case. As a result, the transmission member that retains the inertial body support surface in an optimal state in synchronization with the reclining action of the backrest is made up of a simple mechanism comprising the slide member, the cam plate, and the flexible transmission member and does not require an expensive component such as a motor. Therefore, a rise in manufacturing costs can be prevented.

More preferably, the transmission member comprises a transmission member which is actuated in synchronization with the reclining action of the backrest; and a synchronous movement cancelation mechanism which is interposed at least between a retractor-side joint section of the transmission section and the sensor case and which prevents the sensor case from moving in synchronization with the reclining action of the backrest when the backrest is reclined beyond the optimum working range of the seat belt. There can be prevented complication of a mechanism which is provided on the seat reclining pivot of the backrest and which transmits the reclining action of the backrest to a seat-reclining-pivot-side joint section of the transmission member to thereby actuate the sensor case. Consequently, the vehicle body acceleration sensor can cope with a plurality of types of seats by merely minor modification of the retractor.

More preferably, the synchronous movement cancelation mechanism comprises a slider which is joined to the sensor case by means of the retractor-side end section of the transmission member and has a range of movement limited to the pivotable range of the sensor case that is set to the optimum working range of the set belt; and an elastic member which is interposed between the slider and the retractor-side joint section of the transmission member and which is resiliently deformable in the direction of movement of the slider upon receipt of a load of greater than a predetermined value. When the backrest is reclined beyond the optimum working range of the seat belt, the elastic member deflects and absorbs the displacement of the transmission member, thereby readily preventing the sensor case from pivoting in synchronization with the reclining action of the backrest.

More preferably, the synchronous movement cancelation mechanism comprises a gear with a cam which engages with the retractor-side joint of the transmission section and is rotated; and the sensor case which follows the cam of the gear and pivots within a pivotable range which is set so as to correspond to the optimum working range of the seat belt. When the backrest is reclined beyond the optimum working range of the seat belt, the sensor case can be readily prevented from pivoting in synchronization with the backrest.

The object of the present invention is also achieved by a vehicle body acceleration sensor for use with a seat belt including:
- a sensor case which is movably supported by a retractor base mounted on a backrest of a reclining vehicle seat;
- a sensor arm which is pivotally mounted on the sensor case or the retractor base so as to move lock means between a first position where the lock means is actuated and a second position where the lock means becomes inoperative, the lock means preventing a take-up shaft, around which a webbing is wound, from rotating in a direction in which the webbing is drawn-out;
- an inertial body which moves in relation to an inertial body support surface of the sensor case upon receipt of a velocity change of greater than a predetermined value, thereby moving the sensor arm to the first position; and
- transmission means for moving the sensor case in synchronization with reclining action of the backrest according to a reclining angle of the backrest so that the inertial body support member is held in an appropriate orientation regardless of reclining angle of the backrest, wherein the lock means is actuated by means of movement of the inertial body caused when a predetermined acceleration acts on the vehicle body, the vehicle body acceleration sensor being characterized by
- the transmission means including a cam plate whose cam surface extends in the circumferential direction from the seat reclining pivot of the backrest, and a transmission member which follows the cam surface of the cam plate and pivots the sensor case in conjunction with the reclining action of the backrest.

By means of the foregoing structure of the sensor case, when the inclination of the backrest is changed, the transmission member follows the cam surface to thereby pivot the sensor case in synchronization with the reclining action of the backrest. Accordingly, the inertial body support surface is retained in an appropriate orientation. The vehicle body acceleration sensor can properly operate regardless of the reclined angle of the backrest and can sense the acceleration of the vehicle body without fail.

The transmission member is made up of a simple mechanism comprising a transmission member such as a rod member having a simple shape or a flexible transmission member and a cam plate, both of which can be readily and inexpensively mass-produced by press-working of plate material, and does not require an expensive component such as a motor. Therefore, a rise in manufacturing costs can be prevented.

By provision of cam plates having different cam profiles, there may be produced a vehicle body acceleration sensor of superior versatility which can be used with a plurality of types of reclining seats and seat belt retractors through selection of an appropriate one of the cam plates.

More preferably, the cam surface of the cam plate comprises a synchronous movement area in which the sensor case is pivoted in synchronization with the reclining action of the backrest within only the optimum working range of the seat belt, and non-synchronous movement areas in which the sensor case is not pivoted in synchronization with the reclining action of the backrest. When the backrest is reclined within the optimum working range of the seat belt, the transmission member follows the synchronous movement area of the cam surface and causes the sensor case to pivot in synchronization with the reclining action of the backrest. In contrast, when the backrest is reclined beyond the optimum working range of the seat belt, the transmission member follows a non-synchronous movement area of the cam surface and prevents the sensor case from pivoting in synchronization with the reclining action of the backrest. Accordingly, the range of reclining angle of the backrest is not limited by the pivotable range of the sensor case. Further, the sensor case is not required to pivot more than necessary so as to stay in synchronization with the reclining action of the backrest, thereby preventing the retractor from becoming bulky.

Here, the pivotable range of the sensor case is set so as to become slightly wider than the range of reclining angle of the backrest within the optimum working range of the seat belt so as to prevent damage to the sensor case.

More preferably, a cam contact section formed on the cam-plate-side end section of the transmission member which moves back and forth toward the cam surface of the cam plate is set so as to move back and forth in such a direction as to impart an optimum pressing force on the entire surface of the cam surface with which the cam contact section makes slidable contact. Consequently, the cam-plate-side end section of the transmission member can be prevented from being twisted and protected from excessive force.

More preferably, the cam plate is fixed on a seat portion of the reclining seat, and the cam-plate-side end section of the transmission member is fixed on the backrest so as to be able to move back and forth toward the cam surface of the cam plate. As a result, the transmission member is prevented from being bent every time the backrest is reclined, thereby preventing deterioration of durability of the transmission member.

More preferably, the transmission means comprises a cam plate which has an inner peripheral cam surface and extends in the circumferential direction of the seat reclining pivot of the backrest; a follower which is provided on the inner peripheral cam surface of the cam plate so as to be able to move back and forth; and a transmission member which has a cam-plate-side end section joined to the follower and a retractor-side section joined to the sensor case and which transmits the forward and backward movement of the follower to the sensor case. When the backrest is reclined, the follower that follows the inner peripheral cam surface pivots the sensor case in synchronization with the reclining action of the backrest by way of the transmission member, thereby retaining the inertial body support surface in an appropriate orientation. As a result, regardless of the reclining angle of the backrest, the vehicle body acceleration sensor can operate appropriately and can sense the acceleration of the vehicle body without fail.

The transmission member is made up of a simple mechanism comprising a transmission member such as a rod member having a simple shape or a follower and a cam plate which can be readily and inexpensively mass-produced by press-working of plate material, and does not require an expensive component such as a motor. Therefore, a rise in manufacturing costs can be prevented.

By provision of cam plates having different inner peripheral cam surfaces, there may be produced a vehicle body acceleration sensor of superior versatility which can be used with a plurality of types of reclining seats and seat belt retractors through selection of an appropriate one of the cam plates.

More preferably, the inner peripheral cam surface of the cam plate is provided with only the synchronous movement area in which the sensor case is pivoted in synchronization with the reclining action of the backrest within only the optimum working range of the seat belt. Alternatively, the inner peripheral cam surface is provided with a synchronous movement area in which the sensor case is pivoted in synchronization with the reclining action of the backrest within only the optimum working range of the seat belt, and non-synchronous movement areas in which the sensor case is prevented from pivoting in synchronization with the reclining action of the backrest. As a result, when the backrest is reclined beyond the optimum working range of the seat belt, the follower is disengaged from the inner peripheral cam surface or follows a non-synchronous movement area of the inner peripheral cam surface, so that the sensor case is prevented from pivoting in synchronization with the reclining action of the backrest. Accordingly, the reclining angle of the backrest is not limited by the pivotable range of the sensor case. Further, the sensor case is not required to pivot more than necessary in synchronization with the reclining action of the backrest, thereby preventing the retractor from becoming bulky.

Here, the pivotable range of the sensor case is set so as to become slightly wider than the range of reclining angle of the backrest within the optimum working range of the seat belt so as to prevent damage to the sensor case.

More preferably, the follower has a roller which moves over the inner peripheral cam surface in a rotatable manner, and hence frictional resistance between the inner peripheral cam surface and the follower can be reduced, thereby enabling smooth forward and backward movement of the follower.

More preferably, the cam plate is mounted on the seat portion of the reclining seat, and the follower is fixed on the backrest so as to be able to move back and forth along the inner peripheral cam surface of the cam plate. Therefore, the transmission member is prevented from being bent every time the backrest is reclined, thereby preventing deterioration of durability of the transmission member.

The object of the present invention is also achieved by a vehicle body acceleration sensor for use with a seat belt including:
- a sensor case which is movably supported by a retractor base mounted on a backrest of a reclining vehicle seat;
- a sensor arm which is pivotally mounted on the sensor case or the retractor base so as to move lock means between a first position where the lock means is actuated and a second position where the lock means becomes inoperative, the lock means preventing a take-up shaft, around which a webbing is wound, from rotating in a direction in which the webbing is drawn-out;
- an inertial body which moves in relation to an inertial body support surface of the sensor case upon receipt of a velocity change of greater than a predetermined value, thereby moving the sensor arm to the first position; and
- transmission means for moving the sensor case in synchronization with reclining action of the backrest according to a reclining angle of the backrest so that the inertial body support member is held in an appropriate orientation regardless of reclining angle of the backrest, wherein the lock means is actuated by means of movement of the inertial body caused when a predetermined acceleration acts on the vehicle body, the vehicle body acceleration sensor being characterized by
- the transmission means including a transmission member which can be wrapped around a take-up member provided concentrically and in line with the seat reclining pivot of the backrest, and the sensor case being pivoted in agreement with the amount of the transmission member which is wrapped around the take-up member in association with the reclining action of the backrest.

By means of the foregoing structure of the sensor case, when the transmission member is wrapped around the take-up member, the sensor case is pivoted in agreement with the amount of the transmission member which is wrapped around the take-up member, so that the inertial body support surface is retained in an appropriate orientation. Accordingly, the vehicle body acceleration sensor can properly operate regardless of the reclining angle of the backrest and can sense the acceleration of the vehicle body without fail.

More preferably, when the backrest is reclined forwardly beyond an area which enables an occupant to use the seat, the transmission member is prevented from being wrapped around the take-up member. As a result, the sensor case is prevented from pivoting in synchronization with the backrest and remains stationary. Accordingly, it is possible to eliminate a need for provision of a space for pivotal movement of the sensor case within the retractor corresponding to a range of reclining action of the backrest in which the occupant cannot use the seat, thereby rendering the retractor compact.

More preferably, the end member of the transmission member facing the vehicle body acceleration sensor is wrapped about the a take-up shaft, and the take-up member pivots the sensor case in agreement with the amount of the transmission member that is wrapped around the take-up member, by causing the winding radius of the end member of the transmission member facing the take-up member to match the winding radius of the end member of the transmission member facing the vehicle body acceleration sensor. A take-up surface of the take-up member can be formed into a simple circular arc shape.

The object of the present invention is also achieved by a vehicle body acceleration sensor for use with a seat belt including:
- a sensor case which is movably supported by a retractor base mounted on a backrest of a reclining vehicle seat;
- a sensor arm which is pivotally mounted on the sensor case or the retractor base so as to move lock means between a first position where the lock means is actuated and a second position where the lock means becomes inoperative, the lock means preventing a take-up shaft, around which a webbing is wound, from rotating in a direction in which the webbing is drawn-out;
- an inertial body which moves in relation to an inertial body support surface of the sensor case upon receipt of a velocity change of greater than a predetermined value, thereby moving the sensor arm to the first position; and transmission means for moving the sensor case in synchronization with reclining action of the backrest according to a reclining angle of the backrest so that the inertial body support member is held in an appropriate orientation regardless of reclining angle of the backrest, wherein the lock means is actuated by means of movement of the inertial body caused when a predetermined acceleration acts on the vehicle body, the vehicle body acceleration sensor being characterized by the transmission means having angle sensing means for sensing the reclining angle of the backrest by detection of relative turning movement between a member which is provided on the backrest and pivots in conjunction with the backrest and a member which is provided in a seat portion; and a seat pivot shaft placed in line with the seat reclining pivot of the backrest and a pivot shaft of the angle sensing means being provided concentrically and in line with the seat reclining pivot of the backrest, the pivot shafts having irregularities which mesh each other.

By means of the foregoing configuration, the irregularities formed on the seat pivot shaft of the backrest and the irregularities formed on the pivot shaft of the angle sensing means bring the seat reclining pivot of the backrest in alignment with the pivotable axis of the angle sensing means.

Consequently, since the reclining angle of the backrest and the pivoting angle of the angle sensing means match, the transmission means can correctly adjust the orientation of sensing means of the sensor case. Since only requirement is to form irregularities, which mesh each other, on the seat pivot shaft of the backrest and the pivot shaft of the angle sensing means, an increase in manufacturing costs can be prevented.

More preferably, holes used for mounting the angle sensing means are formed so as to be large enough to allow offset of the pitch at which the angle sensing means is attached to the mount section of the seat portion. Therefore, formation of mount holes does not require a high degree of dimensional precision, thereby enabling a reduction in manufacturing costs.

Accordingly, there can be provided a vehicle body acceleration sensor for use with a seat belt which is attached to a retractor positioned in a backrest, is capable of sensing the acceleration of the vehicle body regardless of the reclining angle of the backrest without fail, and enables a reduction in manufacturing costs by employment of a simple structure.

BEST MODES FOR CARRYING OUT THE INVENTION

A vehicle body acceleration sensor for use with a seat belt according to one embodiment of the present invention will be described in detail hereinbelow with reference to the accompanying drawings.

Figure 1:
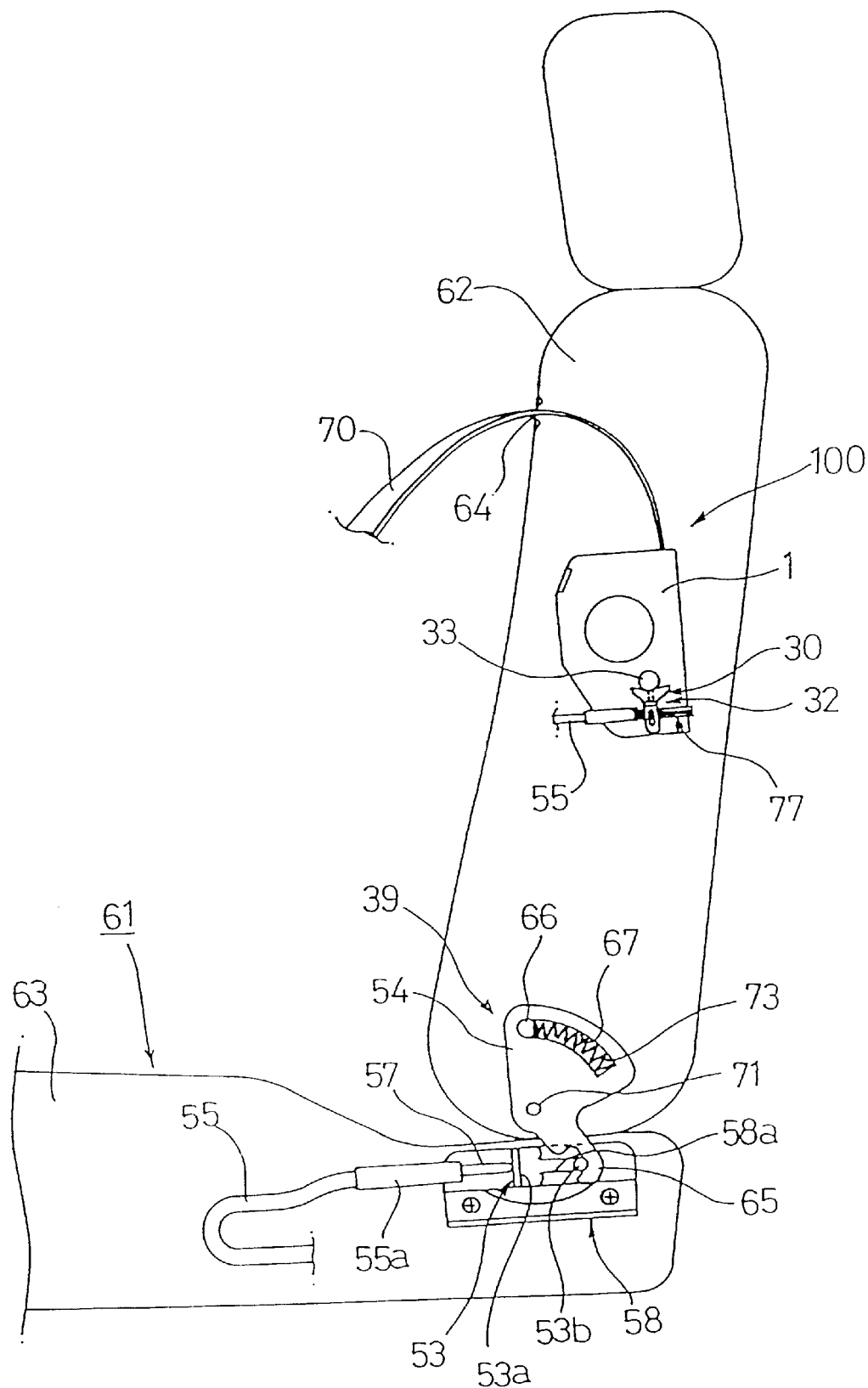
FIG. 1 is a schematic side view showing a reclining seat on which is mounted a seat belt retractor having a vehicle body acceleration sensor according to a first embodiment of the present invention.

FIG. 1 is a schematic side view showing a reclining seat, in which a seat belt retractor 100 equipped with a vehicle body acceleration sensor 32 according to a first embodiment of the present invention is incorporated in a backrest 62.

As shown in FIG. 1, the seat belt retractor 100 is built in the backrest 62 of the reclining seat 61 mounted on a vehicle body. The backrest 62 is connected to a seat portion 63 so as to be pivotal about a seat reclining pivot (a backrest reclining pivot) 71 extending in the widthwise direction of the vehicle body. According to the physique of an occupant, the inclination of the backrest 62 is adjusted.

Figure 2:
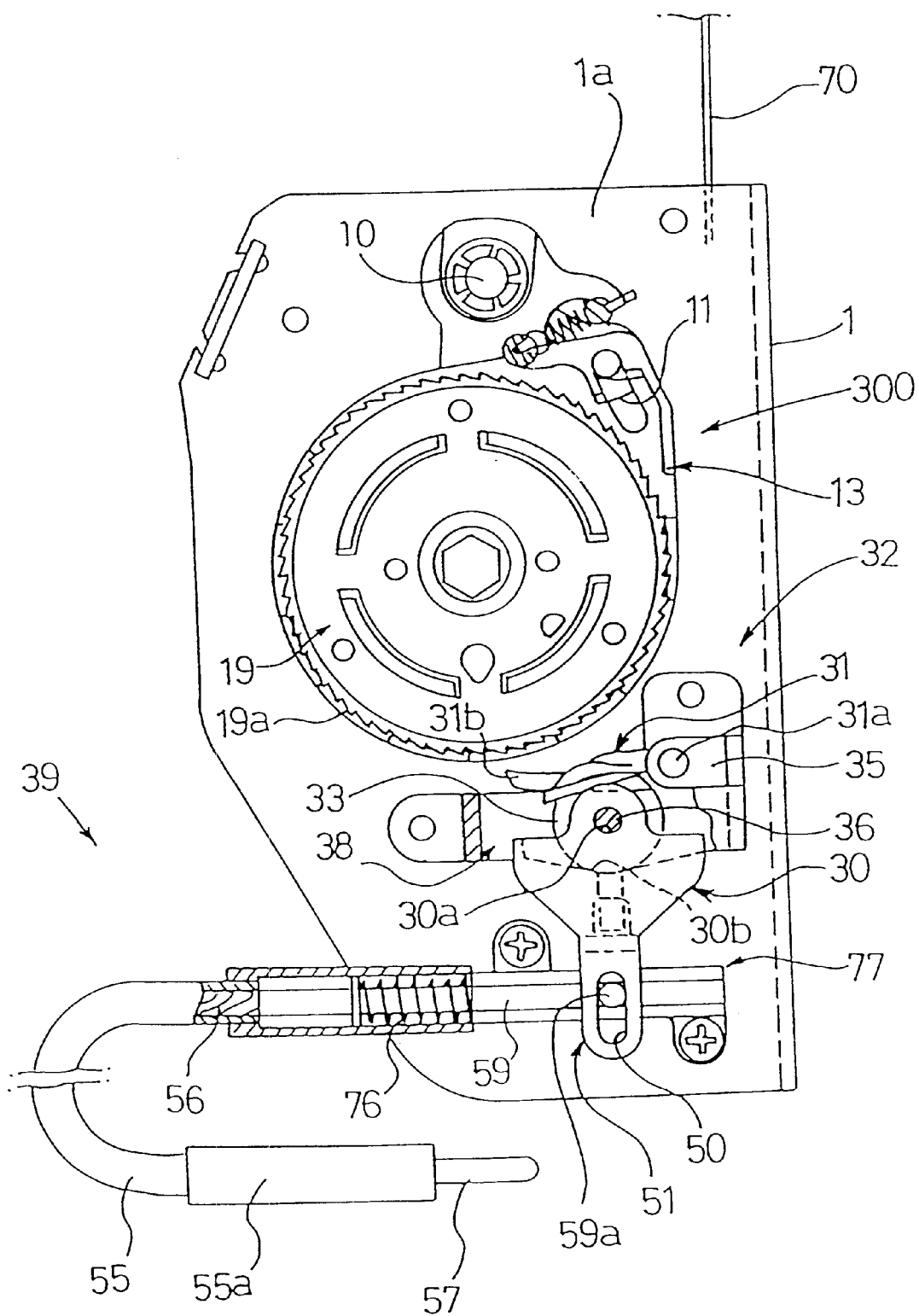
FIG. 2 is a side view showing the seat belt retractor shown in FIG. 1.
Figure 3:
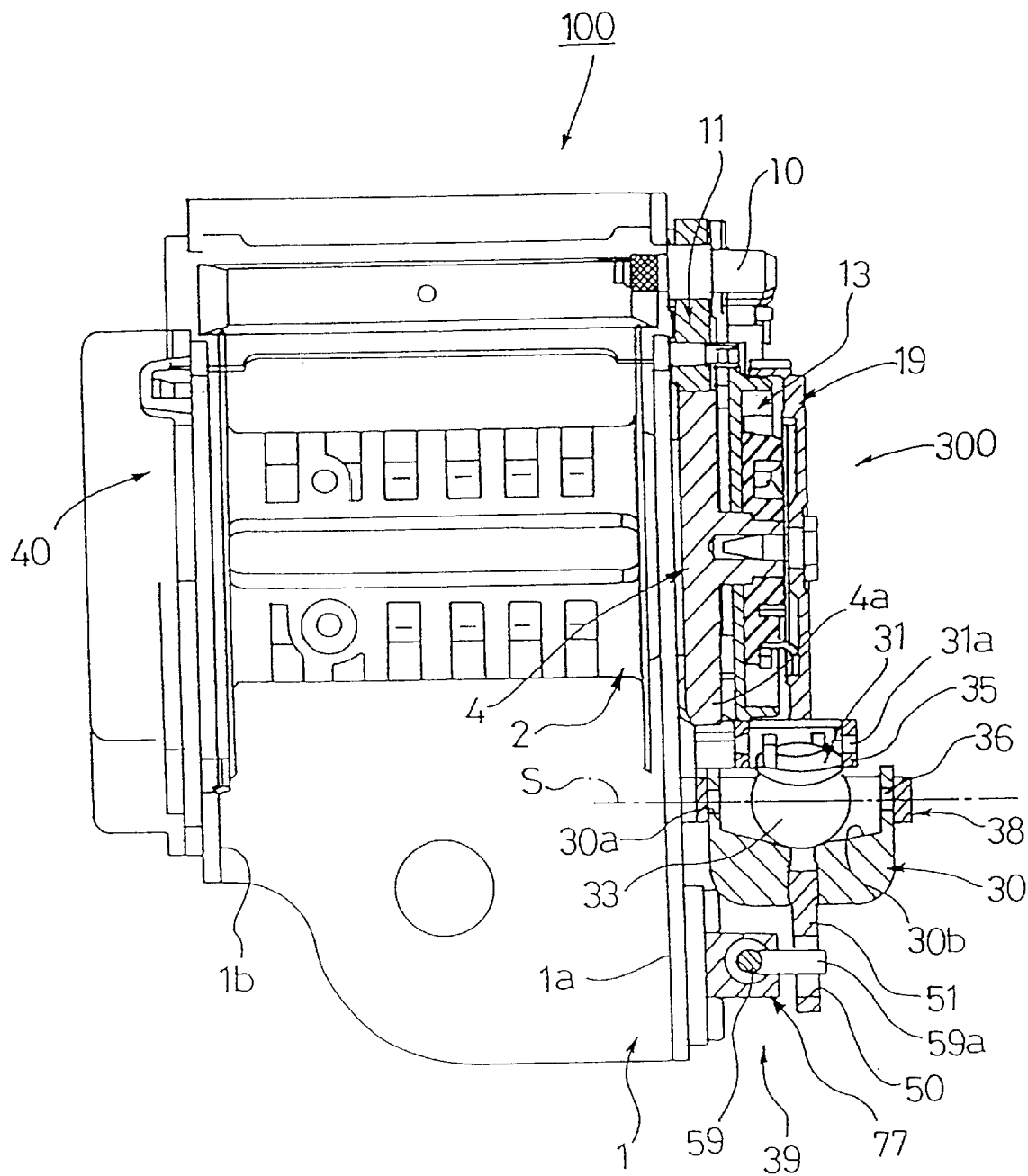
FIG. 3 is a front view showing the seat belt retractor shown in FIG. 1.

As shown in FIGS. 2 and 3, the seat belt retractor 100 comprises a substantially cylindrical bobbin 2 around which a webbing 70 is wound; a take-up shaft 4 which is inserted into the bobbin 2, is rotatively supported by means of a retractor base 1, and has at one end thereof (i.e., on the right-side of the take-up shaft 4 shown in FIG. 3) a latch plate 4a formed from a ratchet wheel; and an emergency lock mechanism 300 which, in the event of an emergency, prevents rotation of the latch plate 4a in a direction in which the webbing 70 is drawn-out. The webbing 70 withdrawn from the retractor 100 by way of a slot 64 formed in the backrest 62 restraints the occupant.

The retractor base 1 mounted on a frame member (not shown) of the backrest 62 is formed from a metal plate through press molding such that the majority of the retractor base 1 assumes a substantially angular C-shaped cross section. The take-up shaft 4 fitted into the bobbin 2 is rotatable and sandwiched between both sides plates 1a and 1b of the retractor base 1. The end of the take-up shaft 4 that passes through the side plate 1b of the retractor base 1 is provided with a known take-up spring device 40. At all times, the take-up spring device 40 urges the bobbin 2, in the direction in which the webbing 70 is taken up, by way of the take-up shaft 4.

According to the present invention, the emergency lock mechanism 300 that, in the event of an emergency prevents rotation of the take-up shaft 4 in the direction in which the webbing 70 is drawn-out may employ any of various known structures. For example, according to the first embodiment, a ratchet wheel 19 serving as a lock actuation means rotates so as to lag behind the take-up shaft 4, so that a ratchet cup 13 causes a pole 11 to engage the latch plate 4a, thereby preventing rotation of the take-up shaft 4 in the direction in which the webbing 70 is drawn-out. The pole 11 is rotatively supported by means of a pole pin 10 fitted into the side plate 1a.

The vehicle body acceleration sensor 32 according to the first embodiment is provided below the ratchet wheel 19.

As shown in FIGS. 2 and 3, the vehicle body acceleration sensor 32 comprises a sensor arm 31, a sensor case 30, an inertial body 33, a hanger 38, and transmission means 39.

The hanger 38 is a support frame fixed on the side plate 1a of the retractor base 1 and comprises an arm support section 35 for rotatively supporting the base end of the sensor arm 31 and a case support section 36 for rotatively supporting the sensor case 30. In the case of the first embodiment, the support arm section 35 corresponds to a bearing hole into which is rotatively fitted a pin 31a provided at the base end of the sensor arm 31. The center of rotation of the sensor case 30 passes through the center of a spherical inertial body 38.

The pin 31a provided at the base end of the sensor arm 30 is rotatively supported by the arm support section 35 of the hanger 38 and is attached to the side plate 1a of the retractor base 1 by way of the hanger 38. While being attached to the retractor base 1 by way of the hanger 38, the sensor arm 31 can pivot about the shaft 31 from a first position to a second position. In the first position, a leading edge 31b engages teeth 19a of the ratchet wheel 19, thereby actuating a lock means so as to prevent rotation of the take-up shaft 4 in the direction in which the webbing 70 is drawn-out. In the second position, the leading edge 31b is disengaged from the teeth 19a, thereby rendering the lock means inoperative. The expression "lock means" used in the present invention signifies the emergency lock mechanism from which the vehicle body acceleration sensor is excluded.

When the leading edge 31b of the sensor arm 31 engages the teeth 19a of the ratchet wheel 19, the ratchet wheel 19 rotates so as to lag behind the take-up shaft 4, so that the pole 11 engages the latch plate 4a by way of the latch cup 13 to thereby prevent rotation of the take-up shaft 4 in the direction in which the webbing 70 is drawn-out.

An inertial body support surface 30b on which the inertial body 33 is placed is provided at the inner bottom of the sensor case 30. Further, a support hole 30a is formed in a position on the peripheral upper edge of the sensor case 30 so as to correspond to and to rotatively receive the case support section 36 of the hanger 38.

While being attached to the retractor base 1, the case support section 36 of the hanger 38 serves as a pivot axis extending in parallel with the seat reclining pivot 71 of the backrest 62 of the reclining vehicle seat 61.

Accordingly, while being attached to the retractor base 1 by way of the hanger 38, the sensor case 30 is supported by the retractor base 1 so as to be pivotable about a pivot axis S extending in parallel with the seat reclining pivot 71 of the backrest 62.

The inertial body support surface 30b of the sensor case 30 is formed into the shape of a fan having its center extending below the main portion of the fan. The bottom center in which the inertial body support surface 30b is formed is connected to a joint section 51 which has an elongated hole 50 to be joined to a rotation transmission means 39, which will be described later.

The inertial body 33 assumes a spherical shape and is placed on the inertial body support surface 30b. Upon receipt of a velocity change of greater than a predetermined level, the inertial body 33 moves in relation to the inertial body support surface 30b, thereby moving toward the first position the sensor arm 31 brought into contact with the exterior surface of the inertial body 33. The radius of the inertial body 33 is set so that the center of the inertial body 33 is located at the pivot axis S of the sensor case 30 when the inertial body 33 is placed at the center of the inertial body support surface 30b. When the inertial body 33 is placed in the center of the inertial body support surface 20b, the sensor arm 31 is retained in the second position even when the sensor case 30 is rotated about the pivot axis S.

The transmission means 39 pivots the sensor case 30 about the pivot axis S thereof in synchronization with the reclining action of the backrest 62 according to the reclining angle thereof such that the inertial body support surface 30b is retained in an appropriate orientation regardless of reclining angle of the backrest 62. The sensor case 30 joined to the transmission means 39 is not pivoted about the pivot axis S by the inertial force which would otherwise be exerted on the sensor case 30 in the event of collision.

As shown in FIG. 1, the transmission means 39 comprises a slide member 53 which is disposed in the seat portion 63 of the reclining seat 61 so as to be linearly movable forward and backward; a cam plate 54 which is pivoted about the seat reclining pivot 71 and which causes the slide member 53 to advance or recede within only a predetermined range corresponding to the optimum working range of the seat belt according to the reclining action of the backrest 62; and a wire 56, one end of which is connected to the slide member 53 and the other end of which is connected to the joint section 51 of the sensor case 30 and which serves as a transmission member for transmitting the movement of the slide member 53 to the sensor case 30. The wire 56, which is a flexible transmission member, is inserted into a flexible guide tube 55, one end of which is fixed, by way of a fixed portion 55a, to the vicinity of the position where the slide member 53 is provided and the other end of which is connected to the retractor base 1 provided in the backrest 62.

The slide member 53 comprises a contact receiver 53a which is freely moved forward and backward along a guide frame 58 mounted on the seat portion 63, and an operation pin 53b which is provided integrally with the contact receiver 53a and is inserted in an elongated hole 58a of the guide frame 58. As shown in FIG. 1, a press element 57 provided at one end of the wire 56 is brought into contact with the contact receiver 53a, and an operation section 65 of the cam plate 54 engages the operation pin 53b.

Figure 4:
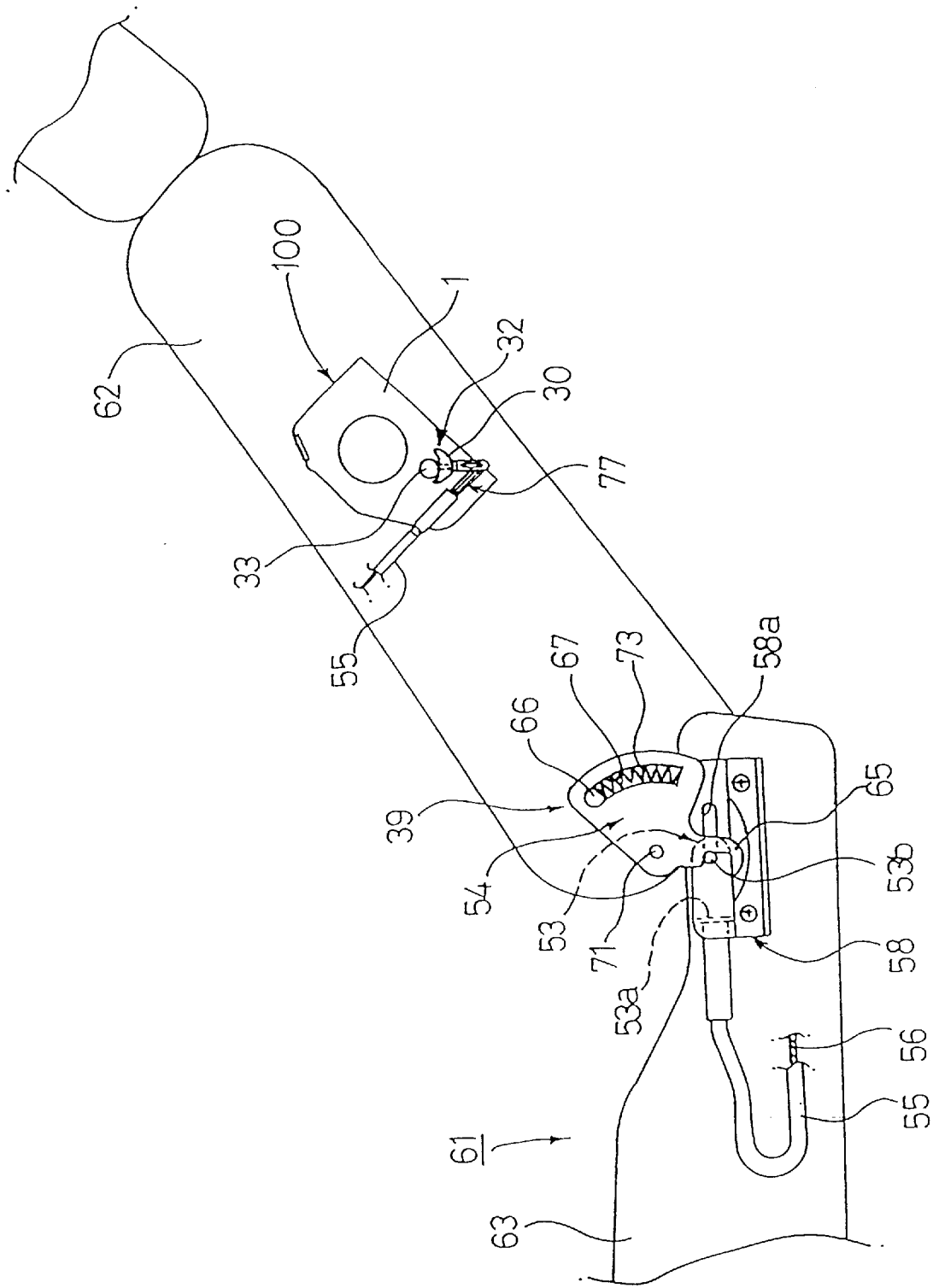
FIG. 4 is a side view showing the reclining seat shown in FIG. 1 when a backrest of the reclining seat is reclined to the most backwardly reclined position within a working range of a seat belt.
Figure 5:
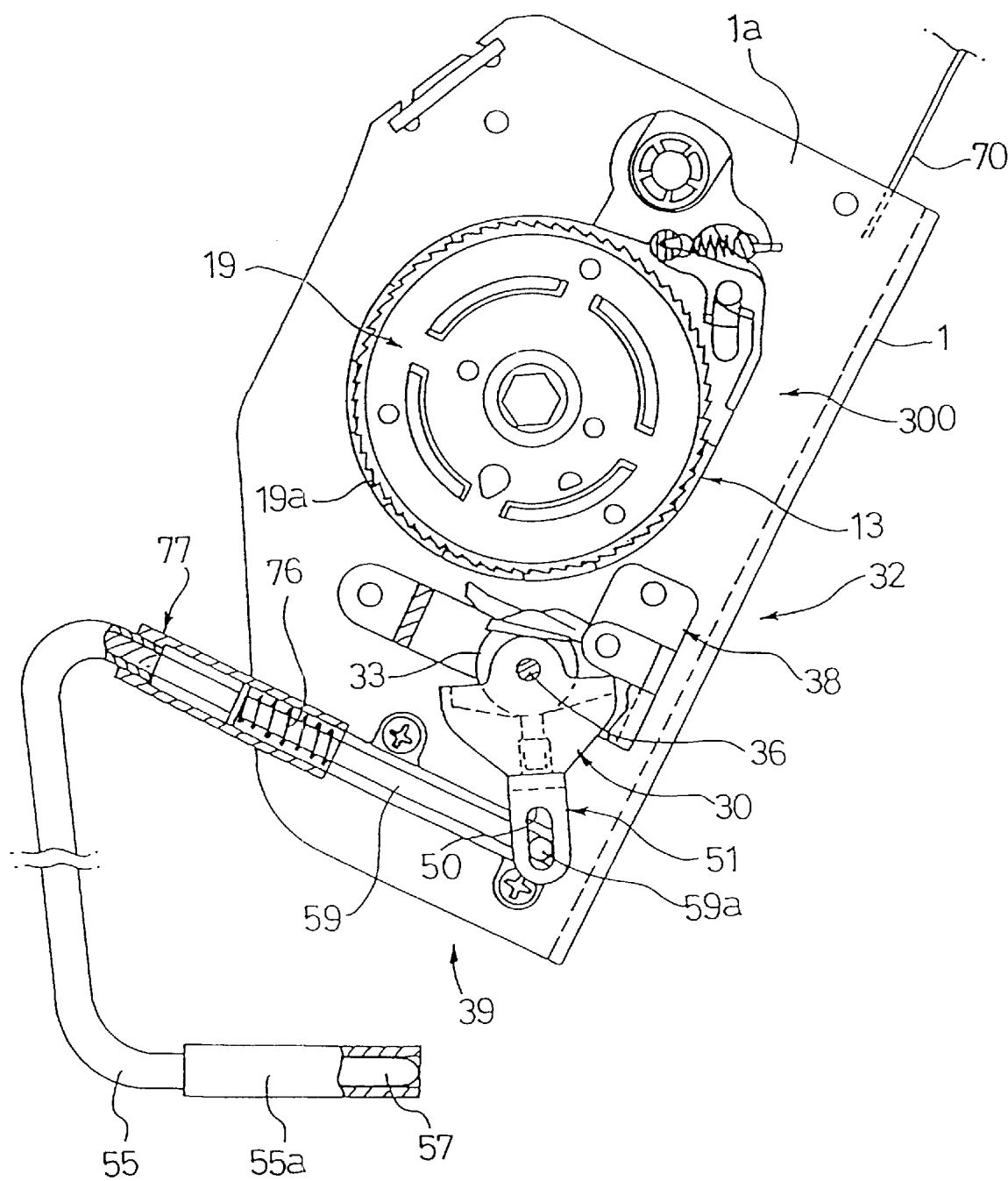
FIG. 5 is a side view of the seat belt retractor showing the state of the vehicle body acceleration sensor when the backrest shown in FIG. 4 is reclined.

The cam plate 54 is supported so as to be pivotal about the seat reclining pivot 71 and comprises an elongated hole 67 which is engaged by a fixed pin 66 mounted on the backrest 62 in an upright position, and the hook-shaped operation section 65 that engages the operation pin 53b. The elongated hole 67 extends in a circular arc shape centered on the seat reclining pivot 71. When the backrest 62 is in a reclined position beyond the most-backwardly reclined position within the working range of the seat belt (as shown in FIG. 4), the fixed pin 66 is arranged so as to come into contact with the front end of the elongated hole 67 (i.e., the left end of the elongated hole 67 shown in FIG. 1).

A compressed coil spring 73 is sandwiched between the rear end of the elongated hole 67 (i.e., the right end of the elongated hole 67 shown in FIG. 1) and the fixed pin 66. When the backrest 62 is reclined back, the cam plate 54 is pivoted clockwise in FIG. 1 about the seat reclining pivot 71, by way of the fixed pin 66 and the compressed coil spring 73, in association with the rearward reclining action of the backrest 62. Since the compressed coil spring 73 possesses a sufficient spring force, the pivotal movement of the cam plate 54 is continued with the fixed pin 66 in contact with the front end of the elongated hole 67 until the backrest 62 is reclined back to the maximum reclined position within the optimum working range of the seat belt, as shown in FIG. 4.

When an attempt is made to backwardly recline the backrest 62 beyond the maximum reclined position (i.e., so as to exceed the optimum working range of the seat belt), the operation pin 53*b* reaches the front end of the elongated hole 58*a* of the guide frame 58 (the left end of the elongated hole 58*a* shown in FIG. 6), thereby hindering the pivotal movement of the cam plate 54 engaging the operation pin 53*b*. As a result, as shown in FIG. 6, the fixed pin 66 advances toward the back end of the elongated hole 67 while compressing the compressed coil spring 73, so that only the backrest 62 is pivoted but the cam plate 54 remains stationary.

Specifically, when the backrest 62 is reclined back within the optimum working range of the seat belt, the cam plate 54 is pivoted in a clockwise direction in FIG. 1, thereby pressing the slide member 53 in a leftward direction in FIG. 1 by way of the operation pin 53*b* engaging the operation section 65. However, when the backrest 62 is reclined back beyond the optimum working range of the seat belt, the pivotal movement of the cam plate 54 is hindered, thereby preventing pressing of the slide member 53 in the leftward direction in FIG. 1 in response to the reclining action of the backrest 62. Thus, the cam plate 54 constitutes a synchronous movement cancelation mechanism.

Figure 6:
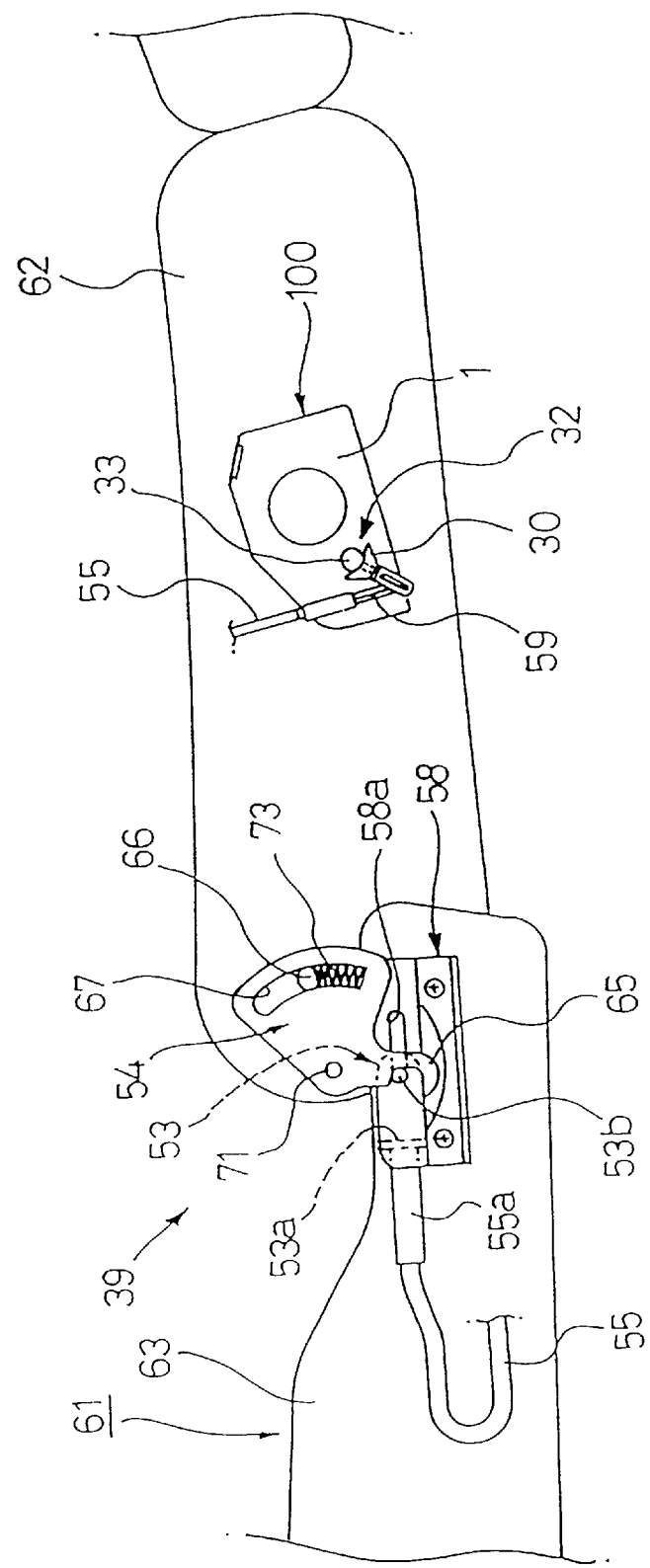
FIG. 6 is a side view showing the reclining seat shown in FIG. 1 when the backrest of the reclining seat is reclined to the most backwardly reclined position.

When the backrest 62 is raised gradually from the reclined position outside the optimum working range of the seat belt shown in FIG. 6, the compressed coil spring 73 is restored to its original state in association with the raising action of the backrest 62. When the backrest 62 reaches the maximum reclined position within the optimum working range of the seat belt, the fixed pin 66 comes into contact with the front end of the elongated hole 67, as shown in FIG. 4. If the backrest 62 is raised further, the cam plate 54 is pivoted in a counterclockwise direction in FIG. 1 in association with the forward reclining action of the backrest 62, so that the operation section 65 recedes in a rightward direction in FIG. 1.

Figure 7:
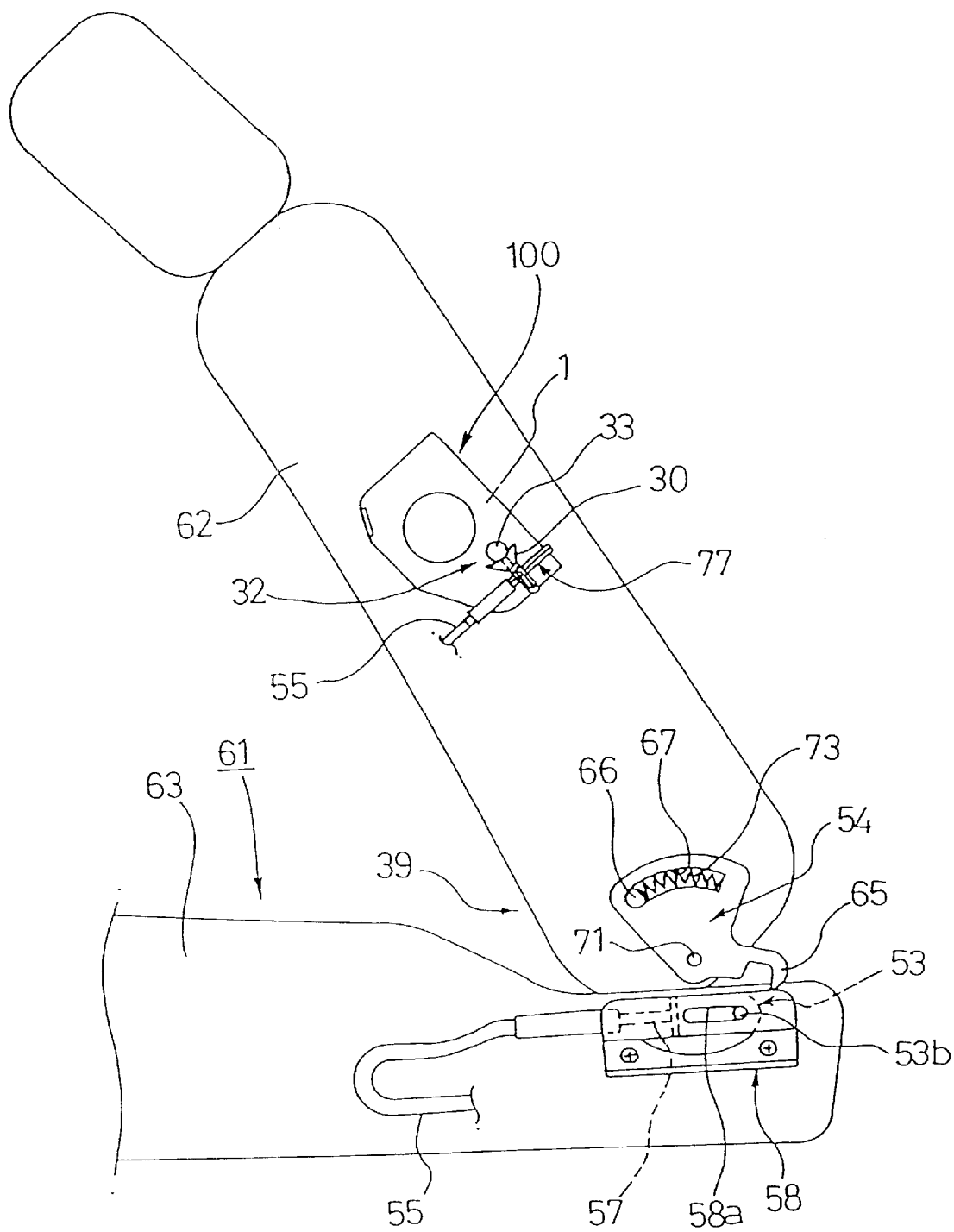
FIG. 7 is a side view showing the reclining seat shown in FIG. 1 when the backrest of the reclining seat is reclined to the most forwardly reclined position.
Figure 8:
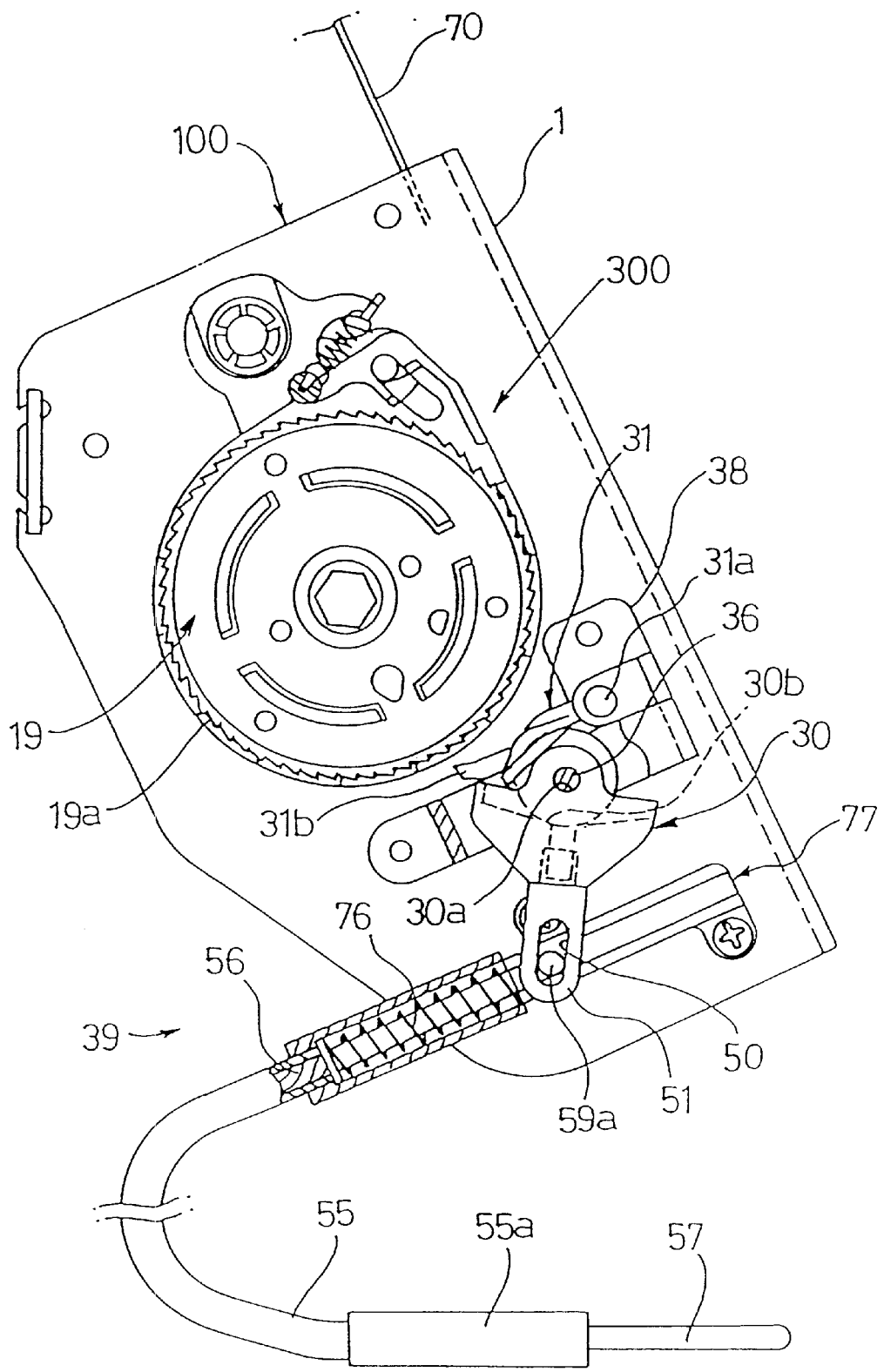
FIG. 8 is a side view of the seat belt retractor showing the state of the vehicle body acceleration sensor when the backrest shown in FIG. 7 is reclined.

When the backrest 62 is further reclined forward after having passed through the maximum forward reclined position (shown in FIG. 1) within the optimum working range of the seat belt, the operation pin 53*b* reaches the back end of the elongated hole 58*a* of the guide frame 58 (i.e., the right end of the elongated hole 58*a* shown in FIG. 7), thereby hindering the movement of the slide member 53 in the rightward direction in FIG. 1. As shown in FIG. 7, the operation section 65 of the cam plate 54 is disengaged from the operation pin 53*b* of the slide member 53, thus bringing the cam plate 54 into a synchronous movement cancelation state in which the operation section 65 does not affect the forward and backward movement of the slide member 53.

An operating element 59 provided at the end of the wire 56 facing the retractor base 1 is supported by a guide member 77 mounted on the retractor base 1 so as to be able to move back and forth and is connected to the sensor case 30 by way of a pin 59*a* inserted into the elongated hole 50 formed in the joint section 51 of the sensor case 30. By means of a compressed coil spring 76 interposed between the operating element 59 and the guide member 77, the press element 57 is constantly urged so as to remain in contact with the contact section 53*a* of the slide member 53. The compressed coil spring 76 is set so as to have a force weaker than that of the compressed coil spring 73, and therefore the compressed coil spring 76 will not press and displace the slide member 53 engaging the cam plate 54.

In accordance with the reclining action of the backrest 62, the cam plate 54 moves the slide member 53 forward and backward within only the longitudinal range of the elongated hole 58*a* of the guide frame 58 corresponding to the optimum working range of the seat belt. According to the reclining angle of the backrest 62, the transmission means 39 pivots the sensor case 30 about its pivot axis S in synchronization with the reclining action of the backrest 62 by way of the wire 56 that transmits the movement of the slide member 53, in such a way as to hold the inertial body support surface 30*b* in an appropriate orientation regardless of reclining angle of the backrest 62.

When the backrest 62 is reclined, the inertial body support surface 30*b* of the sensor case 30 of the vehicle body acceleration sensor 32 according to the first embodiment is retained in an appropriate position by means of the transmission means 39 that operates in synchronization with the reclining action of the backrest 62. Therefore, even when the reclined position of the backrest 62 is changed, the sensor case 30 is retained in an appropriate position. Hence, only the inertial body 33 placed on the sensor case 30 is moved by the inertial force which would be caused by physical shock in the event of an emergency. Therefore, the sensitivity of the sensor is prevented from becoming deteriorated, thereby enabling the sensor to reliably and stably sense the acceleration of the vehicle body.

Further, the transmission means 39 of the vehicle body acceleration sensor 32 has the foregoing synchronous movement cancelation mechanism. If the backrest 62 is reclined beyond the pivotable range of the sensor case 30 (i.e., the working angle range of the vehicle body acceleration sensor 32), the transmission means 39 cancels the movement of the sensor case 30 that is synchronous with the reclining action of the backrest 62. Here, in order to prevent damage to the sensor case 30, the pivotable range of the sensor case 30 is set so as to become slightly wider than the reclining range of the backrest 62 within the optimum working range of the seat belt.

As shown in FIGS. 6 and 7, even when the backrest 62 is reclined beyond the working angle range of the vehicle body acceleration sensor 32, the reclining force of the backrest 62 is prevented from acting on the sensor case 30 by way of the wire 56, thus preventing strain on the sensor case 30. Accordingly, the provision of the transmission means 39 does not cause such inconvenience as to limit the reclining angle of the backrest 62. Further, the sensor case 30 is prevented from pivoting more than necessary, thereby preventing the seat belt retractor 100 from becoming bulky.

Further, the transmission means 39 that retains the inertial body support surface 30*b* in an appropriate position in synchronization with the reclining action of the backrest 62 is made up of a simple mechanism such as that formed from the slide member 53, the cam plate 54, and the wire 56 and does not require an expensive component such as a motor. Accordingly, manufacturing costs can also be prevented from increasing.

Figure 9:
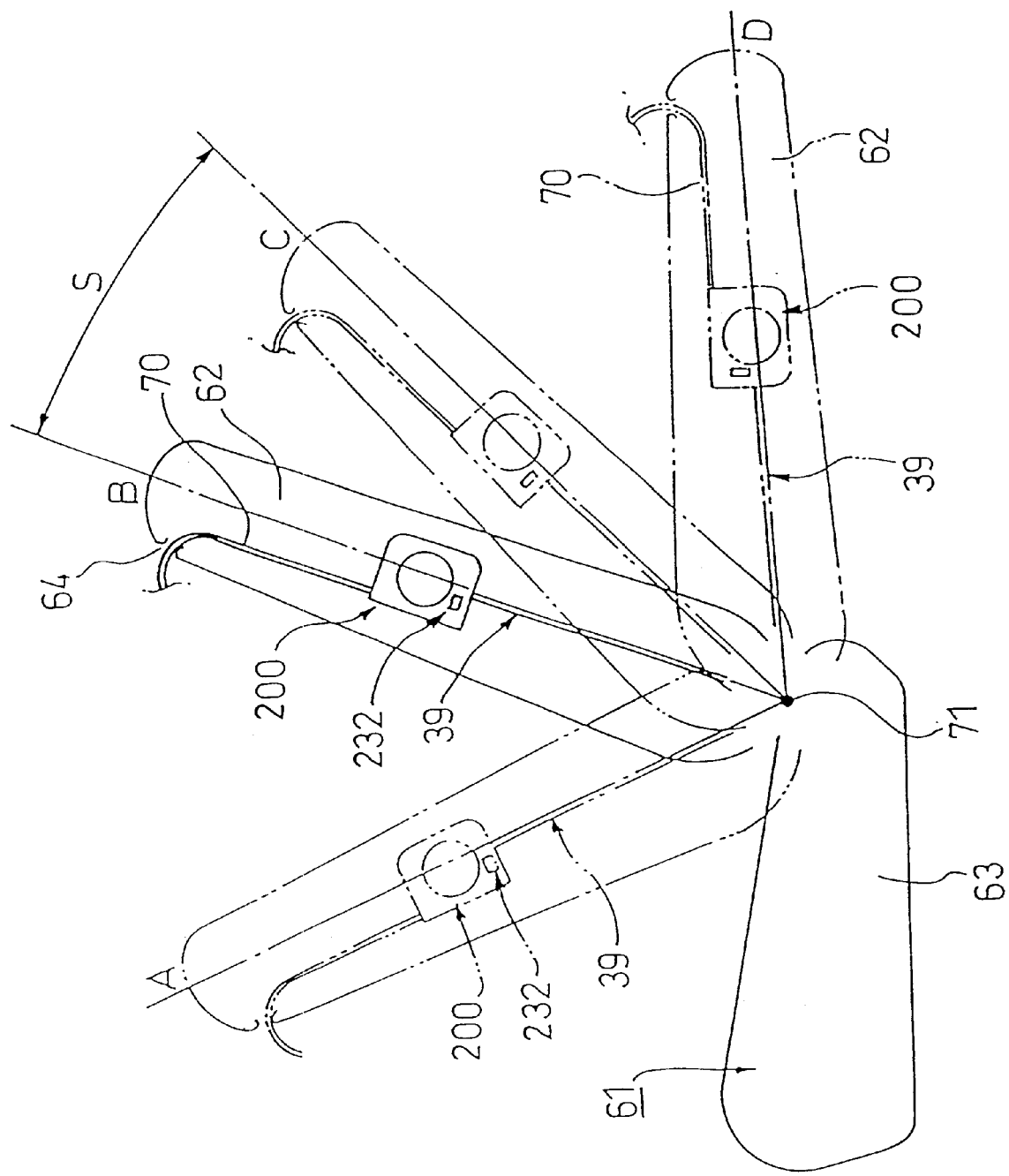
FIG. 9 is a schematic side view showing a reclining seat, wherein a seat belt retractor having a vehicle body acceleration sensor for use with a seat belt according to a second embodiment is incorporated in a backrest.

FIG. 9 is a schematic side view showing a reclining seat, in which a seat belt retractor 200 equipped with a vehicle body acceleration sensor 232 according to a second embodiment of the present invention is incorporated in the backrest. The components which are the same as those used in the seat belt retractor 100 according to the first embodiment are assigned the same reference numerals, and repetition of their detailed explanations is omitted.

As in the case with the seat belt retractor 100 according to the first embodiment shown in FIG. 1, the seat belt retractor 200 is built into the backrest 62 of the reclining seat 61 mounted on the vehicle body.

The reclining (tilting) range of the backrest 62 extends from a forwardly reclined state A shown in FIG. 9 to the maximum backwardly reclined state D, i.e., a fully flat state, in which the surface of the backrest 62 is substantially level with the surface of the seat portion 63. The reclined state of the backrest 62 suitable for the occupant during driving ranges from a reclined state B in which the backrest 62 is slightly reclined back from its upright position to a reclined state C in which the backrest 62 is reclined back to an appropriate extent. The reclining range from the reclined state B to the reclined state C is an optimum working range E of the seat belt in which the seat belt is capable of correctly restraining the occupant.

Although not shown in detail, the seat belt retractor 200 comprises the take-up shaft 4 which is fitted into a substantially cylindrical bobbin, around which the webbing 70 is wound, and which is rotatably supported by a retractor base 223, and the emergency lock mechanism 300 that, in the event of an emergency, prevents rotation of the take-up shaft 4 in the direction in which the webbing 70 is drawn-out. The webbing 70 extending from the retractor 200 by way of the slot 64 formed in the backrest 62 restrains the occupant.

The retractor base 223 mounted on a frame member (not shown) of the backrest 62 is formed from a metal plate through press molding such that the majority of the retractor base 223 assumes a substantially angular C-shaped cross section. The take-up shaft 4 fitted into the bobbin is rotatable and is sandwiched between the sides plates 223a and 223b of the retractor base 223. The end of the take-up shaft 4 that passes through the side plate 223b of the retractor base 223 is provided with a known take-up spring device (not shown). At all times, the take-up spring device urges the bobbin, in the direction in which the webbing 70 is taken up, by way of the take-up shaft 4.

The vehicle body acceleration sensor 232 according to the second embodiment is provided below the ratchet wheel 19 constituting the emergency lock mechanism 300.

Figure 10:
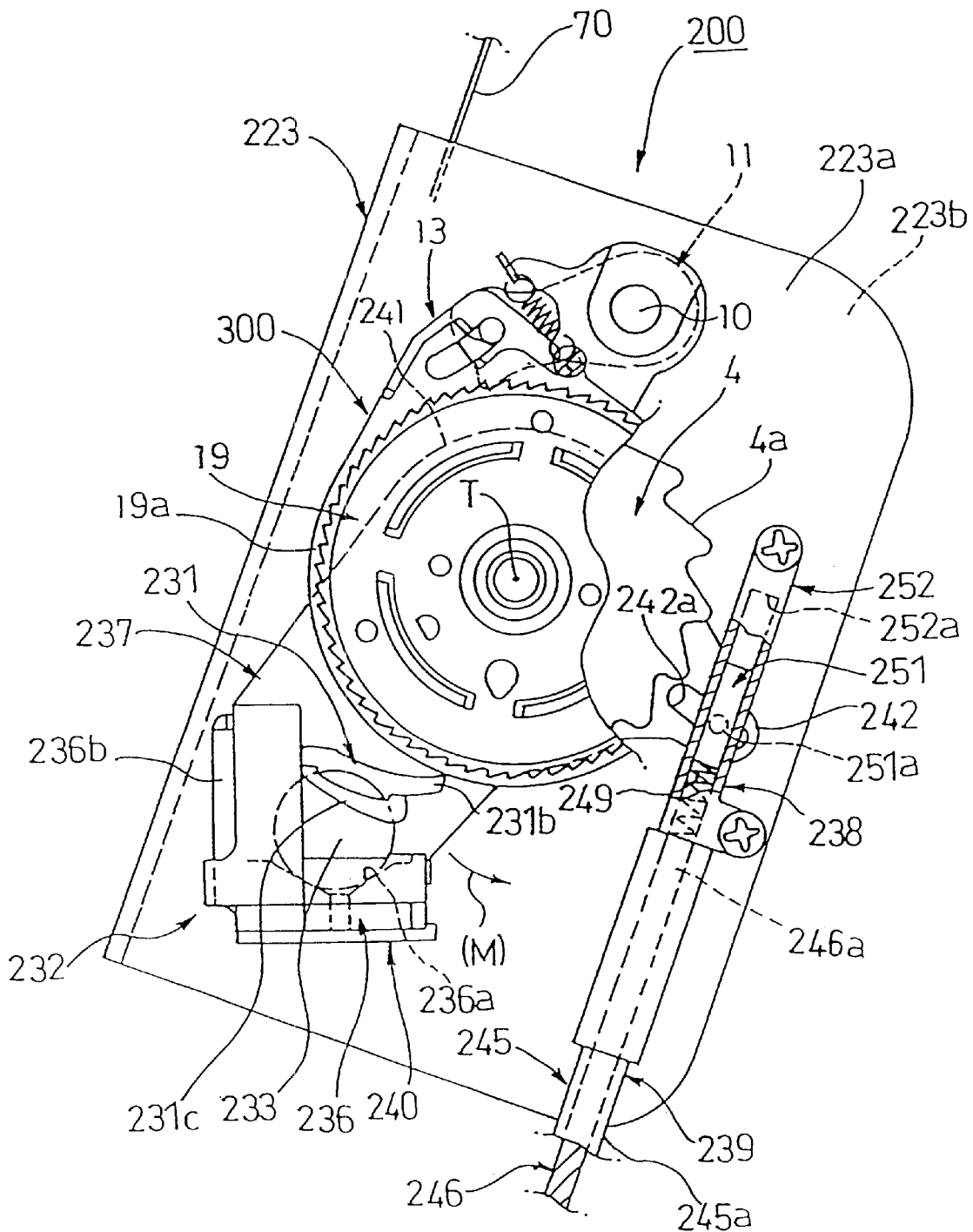
FIG. 10 is a side view of the retractor showing the state of the vehicle body acceleration sensor when the backrest shown in FIG. 9 is reclined to the most forwardly reclined position within an optimum working range of the seat belt.
Figure 11:
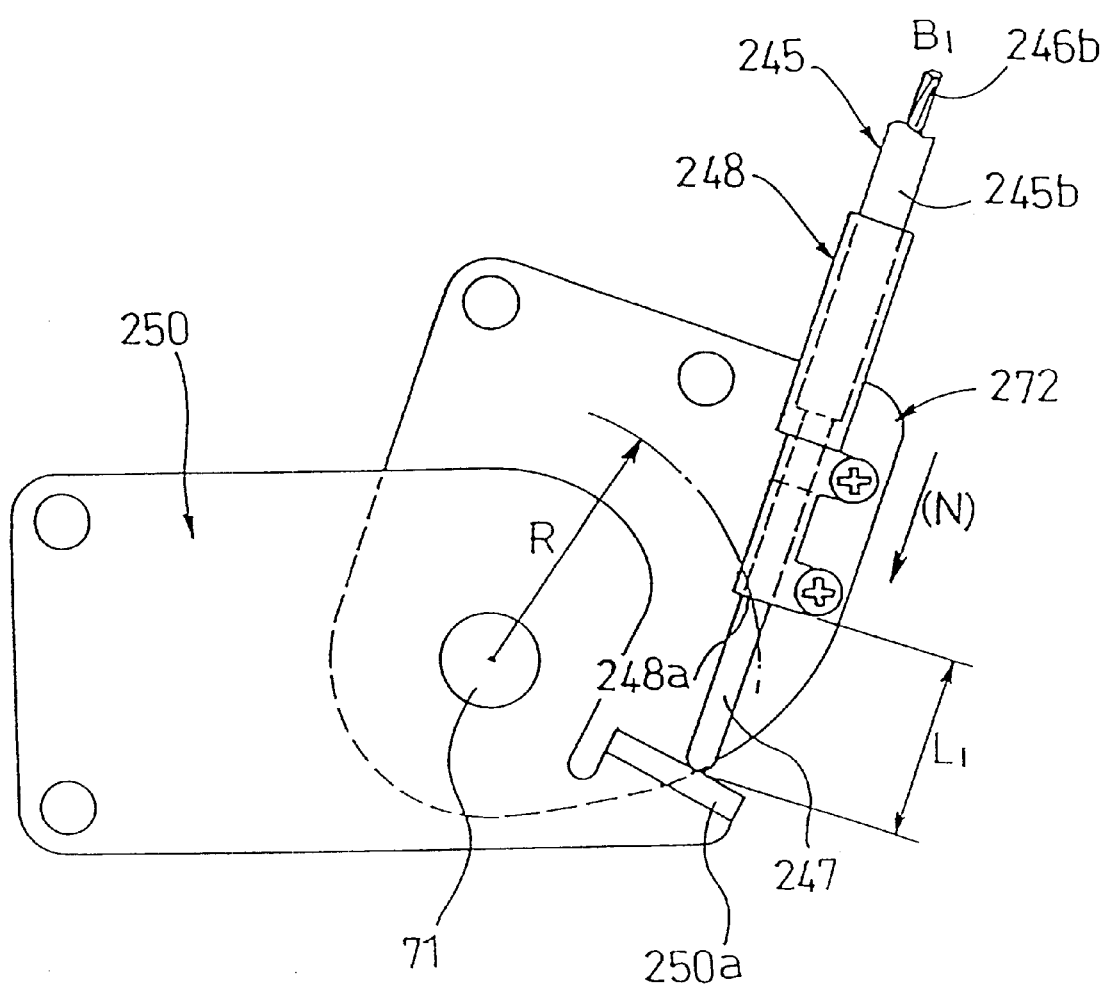
FIG. 11 is a side view showing the state of the side of the transmission means facing a seat reclining pivot when the backrest shown in FIG. 9 is positioned in the most forwardly reclined position within the optimum working range of the seat belt.

As shown in FIGS. 10 and 11, the vehicle body acceleration sensor 232 according to the second embodiment comprises a sensor arm 231, a sensor case 236, an inertial body 233, a case support member 237, a transmission means 239, and a synchronous movement cancelation mechanism 238.

The sensor case 236 comprises an inertial body support surface 236a on which the inertial body 233 is placed, and an arm support section 236b that rotatively supports the sensor arm 231. The inertial body support surface 236a of the sensor case 236 is formed into the shape of a fan having its center extending below the main portion of the fan.

The case support member 237 comprises a case support section 240 in which the sensor case 236 is removably fitted; a pivot section 241 which extends upward from one side of the case support section 240 and is rotatably supported so as to rotate around the pivot axis T of the take-up shaft 4; and a tongue-shaped joint section 242 extending from the pivot section 241 in a radially outward direction.

The joint section 242 is connected to transmission means 239, which will be described later. When the backrest 62 is reclined, the case support member 237 is pivoted by the transmission means 239 in synchronization with the reclining action of the backrest 62. The pivot section 241 is supported so as to be able to pivot about the pivot axis T of the take-up shaft 4 by way of, for example, a bearing bush of the retractor base whose mount through holes are positioned in the vicinity of the outer periphery of the take-up shaft 4.

A pin section provided at the base end of the sensor arm 231 is rotatively supported by the sensor case 236. While the sensor case 236 is attached to the retractor, the sensor arm 231 can be pivoted about the pin section provided at the base end thereof and can switch between a first position—where a leading edge 231b of the sensor arm 231 engages the teeth 19a of the ratchet wheel 19—and a second position where the leading edge 231b is disengaged from the teeth 19a. In the first position, there is actuated a lock means of the retractor which prevents rotation of the take-up shaft 4 in the direction in which the webbing is drawn-out. In the second position, the lock means is not actuated. A dish-shaped contact section 231c which is in contact with an upper portion of the inertial body 233 in order to detect the movement of the inertial body 244 is integrally formed with the sensor arm 241.

The "lock means" used herein signifies the emergency lock mechanism 300 from which the vehicle body acceleration sensor 232 is excluded.

The inertial body 233 assumes a spherical shape and is placed on the inertial body support surface 236a. Upon receipt of a velocity change greater than a predetermined magnitude, the inertial body 233 moves in relation to the inertial body support surface 236a, thereby moving to the first position the sensor arm 231 that remains in contact with the outside of the inertial body 233.

When the leading edge 231b of the sensor arm 231 engages the teeth 19a of the ratchet wheel 19, the ratchet wheel 19 rotates so as to lag behind the take-up shaft 4. As a result, the pole 11 engages the latch plate 4a by way of the latch cup 13, thereby bringing the lock means into an operative state. Consequently, there is prevented rotation of the take-up shaft 4 in the direction in which the webbing is drawn-out.

The transmission means 239 pivots the sensor case 236 about its pivot axis according to the reclining angle of the backrest 62 in such a way as to retain the inertial body support surface 236a in an appropriate orientation regardless of reclining angle of the backrest 62. The sensor case 236 joined to the transmission means 239 is prevented from pivoting about the pivot axis by the inertial force which would be exerted in the event of collision.

As shown in FIGS. 10 and 11, the transmission means 239 comprises a press plate 250 fixed on the seat portion 63; a wire 246 which serves as a transmission member and is pressed and actuated by a folded press piece 250a formed on the press plate 250 to thereby pivot the sensor case 236 about its pivotable axis within only a predetermined range corresponding to the optimum working range of the seat belt in synchronization with the reclining action of the backrest; and a guide tube 245 which houses the wire 246 in a slidable fashion and is provided in the backrest 62.

As shown in FIG. 10, a guide member 252 fixed on the side plate 223a of the retractor base 223 is attached to the retractor-side end section 245a of the guide tube 245—in which the wire 246 is inserted—in such a way that a slider 251 connected to one end of a coil spring 249—the other end of which is connected to a retractor-side end section 246a of the wire 246—passes by an area in the vicinity of the joint section 242 of the case support member 237. The retractor-side end section 246a of the wire 246 is joined to the case support member 237 by way of the slider 251 on which a joint pin 251a to be engaged with an elongated hole 242a of the joint section 242 is formed in an upright position, thereby constituting a retractor-side joint section.

As shown in FIG. 11, a reclining-pivot-side end section 245b of the guide tube 245 is mounted on a fixed plate 272 attached to the backrest 62, by way of a guide member 248 in such a way that a follower 247 joined to a recliningpivot-side end 246b of the wire 246 extends to the press piece 250a of the press plate 250. The press piece 250a of the press plate 250 attached to the seat portion 63 imparts to the follower 247 displacement corresponding to the reclining angle of the backrest 62 within the optimum working range of the seat belt.

A reclining-pivot-side end section 248a of the guide member 248 is mounted on the fixed plate 272 of the backrest 62 so as to become spaced a given distance apart from the seat reclining pivot 71. The follower 247 connected to the reclining-pivot-side end section 246b of the wire 246 is urged by means of an unillustrated spring member in a direction of arrow (N) so as to protrude from the open end of the reclining-pivot-side end section 248a of the guide member 248 by a given length $L_1$ toward the seat reclining pivot 71. When the backrest 62 is reclined, the reclining-pivot-side end section 248a of the guide member 248 moves along a circular-arc R—which is spaced a given radius away from the seat reclining pivot 71—in conjunction with the backrest 62.

When the backrest 62 is in a reclined state B which is shown in FIG. 9 and is the start position of the optimum working range E of the seat belt, the guide member 248 and the follower 247 are placed in position $B_1$ shown in FIG. 11 with respect to the press piece 250a of the press plate 250, in which the follower 247 starts coming into contact with the press piece 250a.

Figure 12:
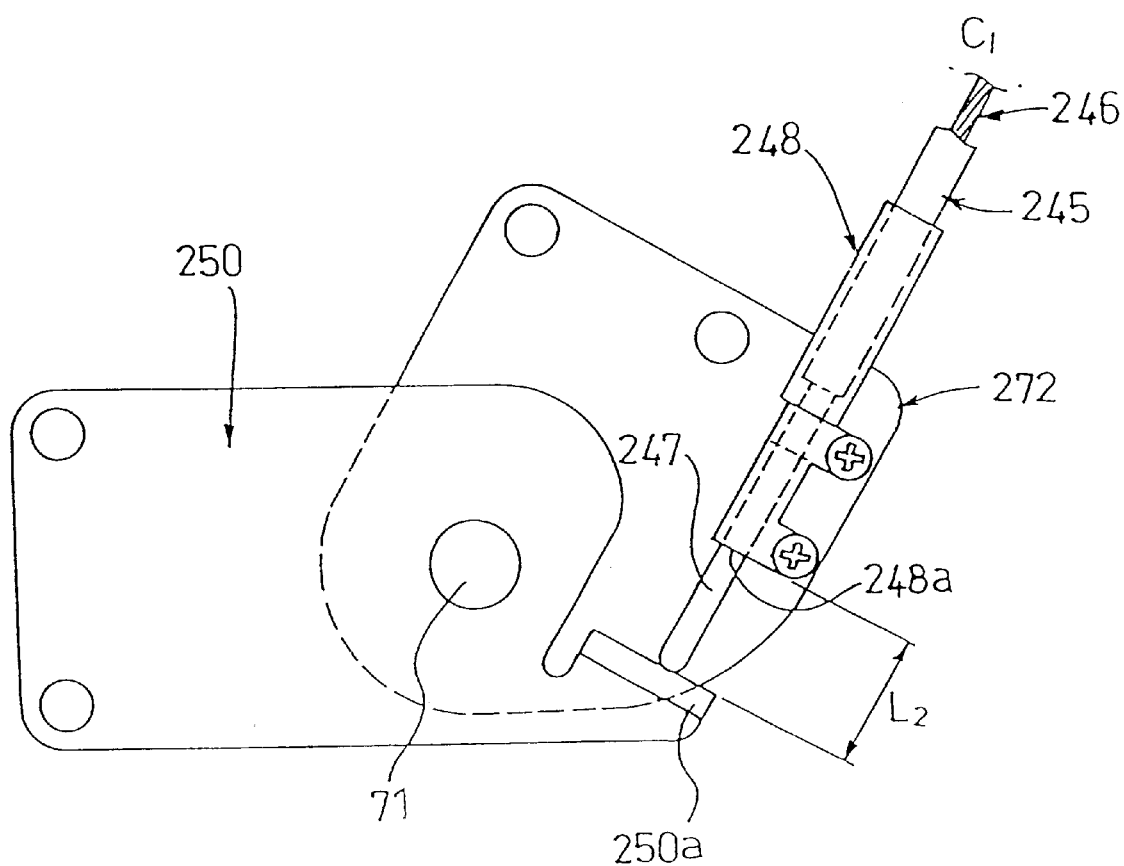
FIG. 12 is a side view showing the state of the side of the transmission means facing a seat reclining pivot when the backrest shown in FIG. 9 is positioned in the most backwardly reclined position within the optimum working range of the seat belt.

Similarly, when the backrest 62 is in a reclined state C which is shown in FIG. 9 and is the end position of the optimum working range E of the seat belt, the guide member 248 and the follower 247 are placed in position $C_1$ shown in FIG. 12, in which the follower 247 is pushed into the press piece 250a in association with the reclining action of the backrest 62. As a result, the length of a projected portion of the follower 247 is diminished to $L_2$.

The wire 246—whose retractor-side end section 246a is connected to the case support member 237 by way of the slider 251—pivots the case support member 237 in a direction of arrow (M) shown in FIG. 10 by only the extent to which the press piece 250a—which constitutes the reclining-pivot-side joint section together with the follower 247—presses the follower 247 toward the retractor, thereby regulating the angle of the sensor case 236.

Figure 13:
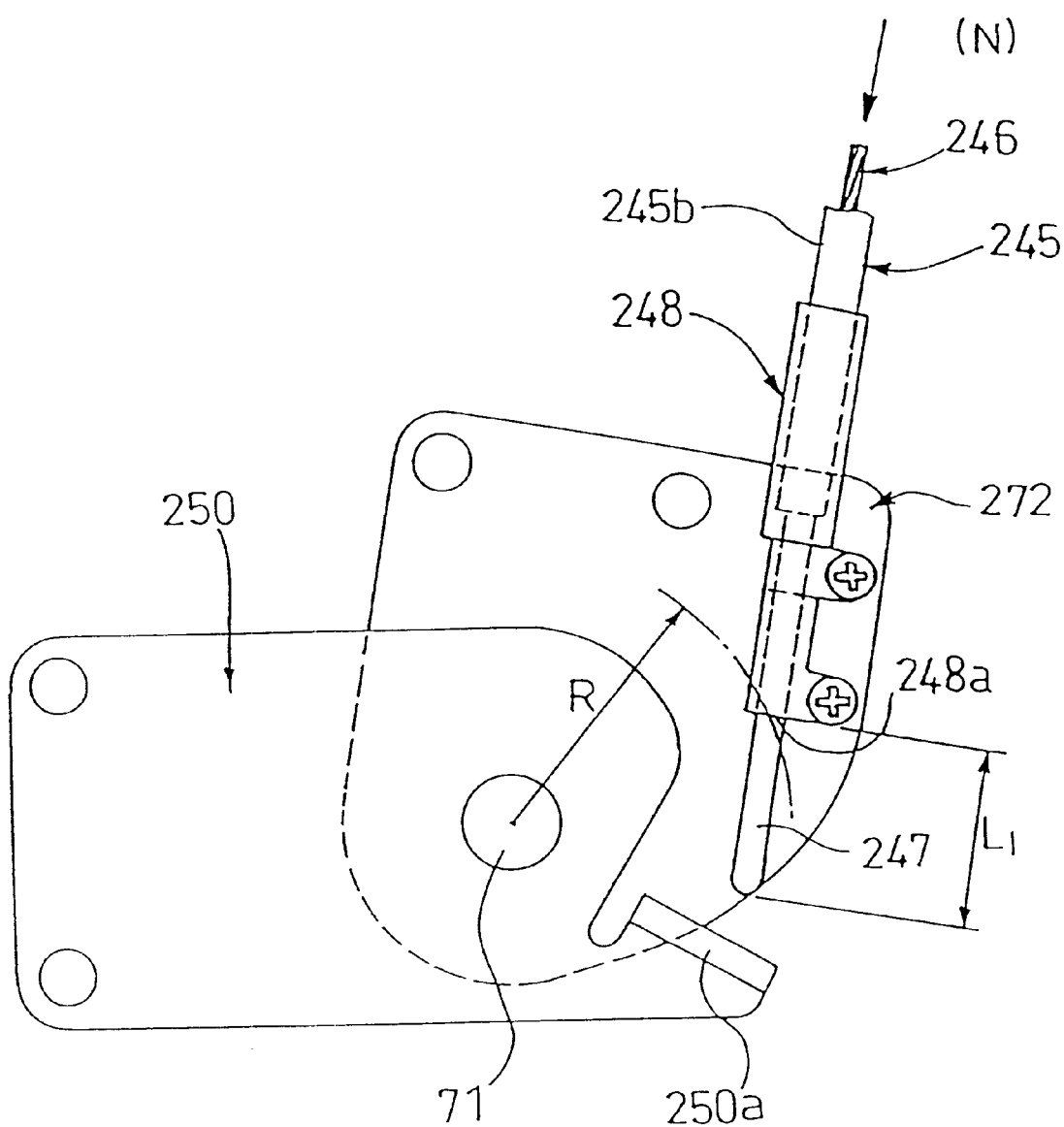
FIG. 13 is a side view showing the state of the side of the transmission means facing a seat reclining pivot when the backrest shown in FIG. 9 is positioned forward of the most forwardly reclined position within the optimum working range of the seat belt.

When the backrest 62 is reclined forward from the start position of the optimum working range E of the seat belt, the seat belt is not used and hence the angular adjustment of the sensor case 236 is not required. As shown in FIG. 13, the front end of the follower 247 departs from the foregoing press piece 250a, and the follower 247 retains its initial projection length $L_1$ and does not adjust the orientation of the sensor case 236.

Accordingly, when the backrest 62 is in a reclined state at any location between the start position and the end position of the optimum working range E of the seat belt, the leading end of the follower 247 protruding toward the seat reclining pivot 71 comes into contact with the press piece 250a of the press plate 250, thereby displacing the wire 246 in its axial direction according to the reclining angle of the backrest 62. The wire 246 actuated by the press piece 250a pivots the case support member 237 about the pivot axis T of the take-up shaft 4—which is also the pivotable axis of the case support member 237—by way of the slider 251, thereby controlling the orientation of the inertial body support surface 236a of the sensor case 236.

Figure 14:
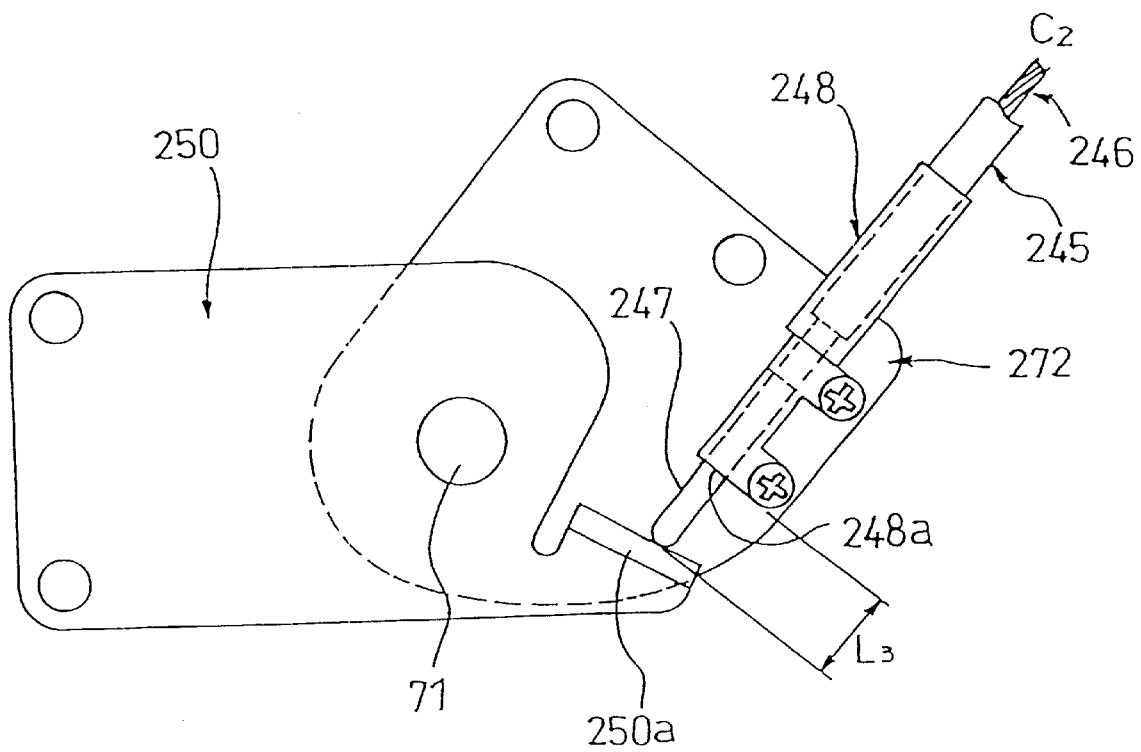
FIG. 14 is a side view showing the state of the side of the transmission means facing a seat reclining pivot when the backrest shown in FIG. 9 is positioned backward of the most backwardly reclined position within the optimum working range of the seat belt.

When the backrest 62 is reclined back further in a backward direction from the reclined position C, the guide member 248 and the follower 247 are placed in position $C_2$ shown in FIG. 14. In response to the backward reclining action of the backrest 62, the follower 247 is further pushed by the press piece 245a, so that the length of projection of the follower 247 toward the seat reclining pivot 71 is diminished to $L_3$.

Figure 15:
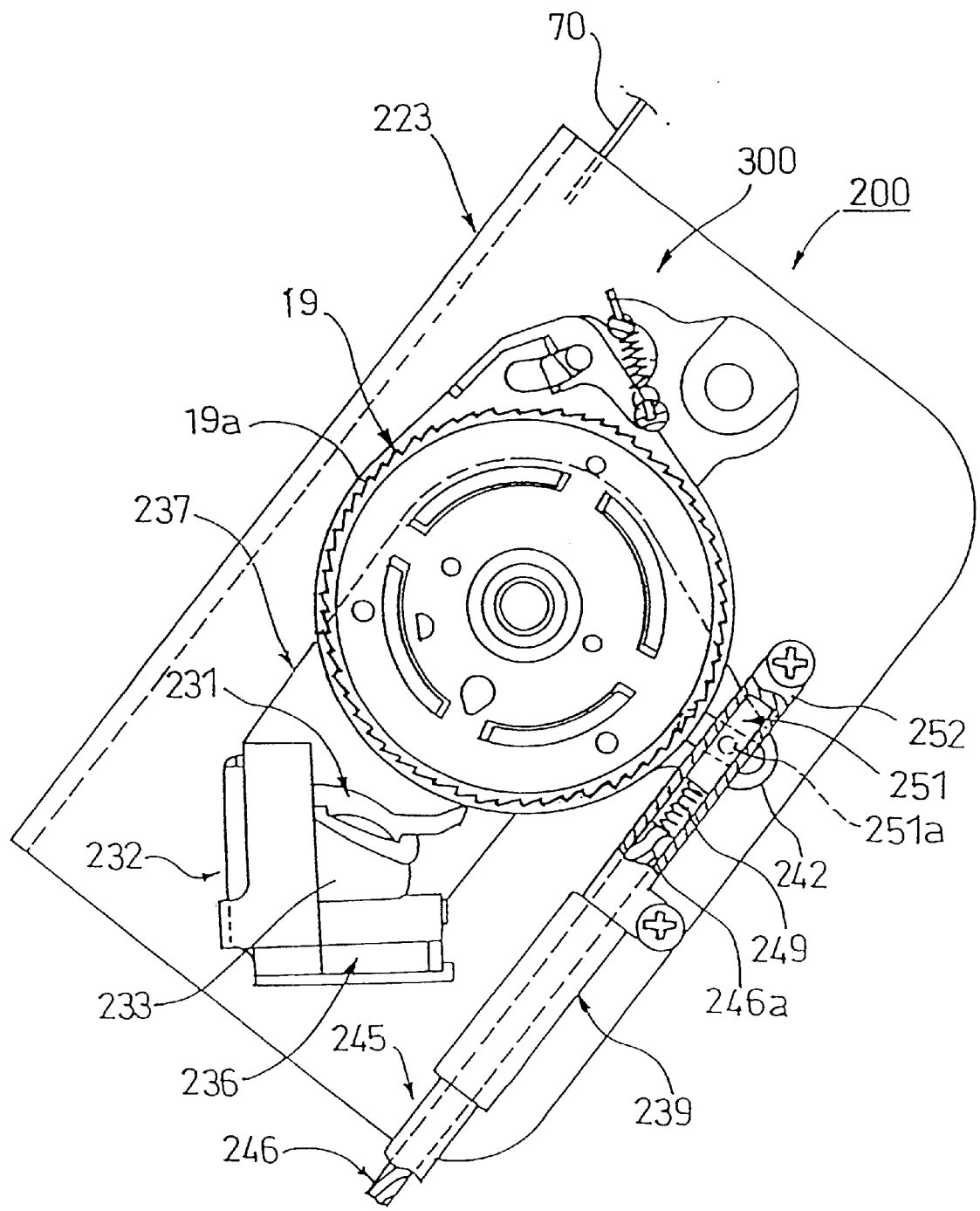
FIG. 15 is a side view of a seat belt retractor showing the state of the vehicle body acceleration sensor for use with a seat belt according to the second embodiment when the backrest shown in FIG. 9 is positioned backward of the most backwardly reclined position within the optimum working range of the seat belt.
Figure 16:
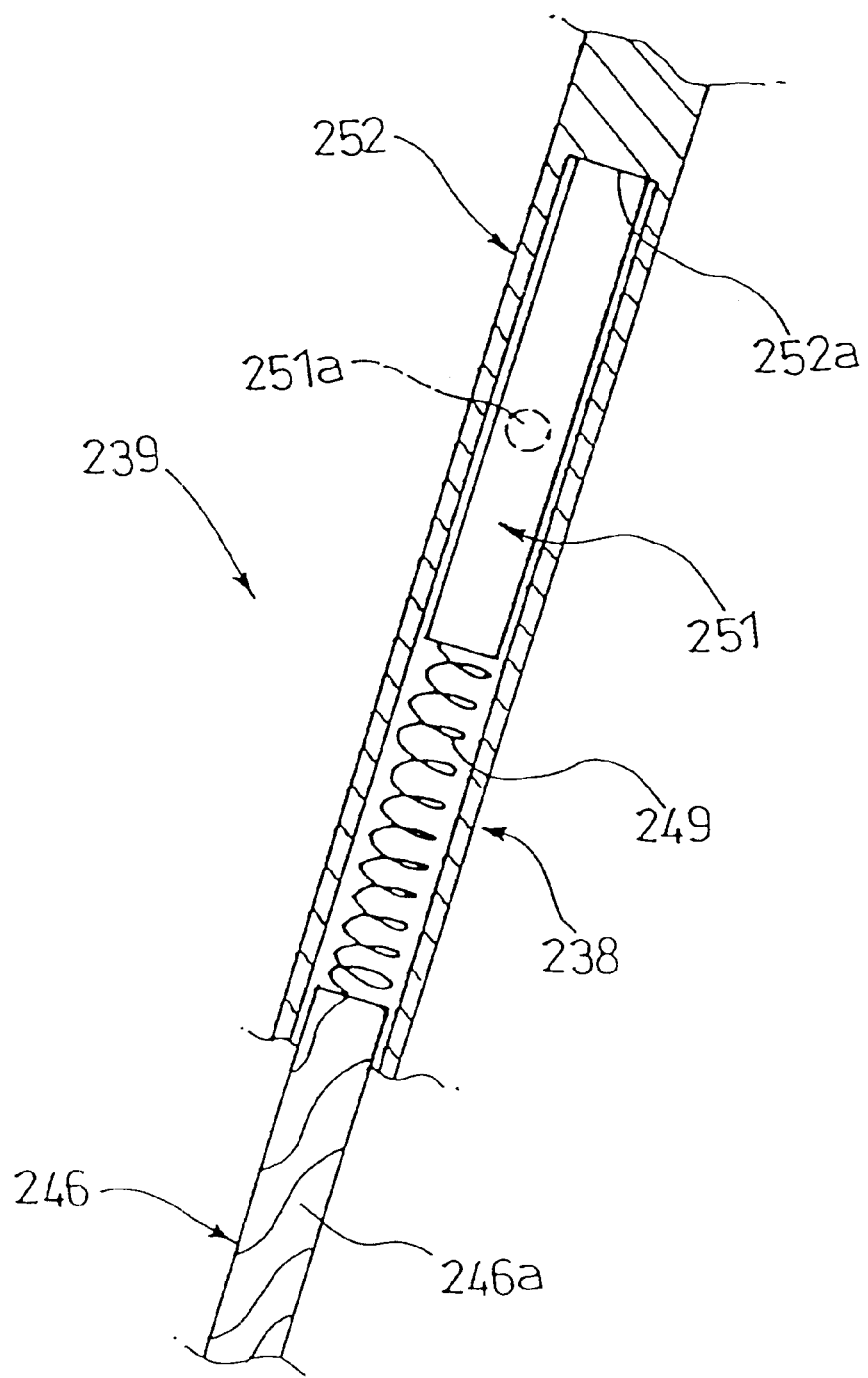
FIG. 16 is an enlarged cross-sectional view of the principle elements showing the state of a retractor-side portion of the transmission means in the vehicle body acceleration sensor shown in FIG. 15.
Figure 17:
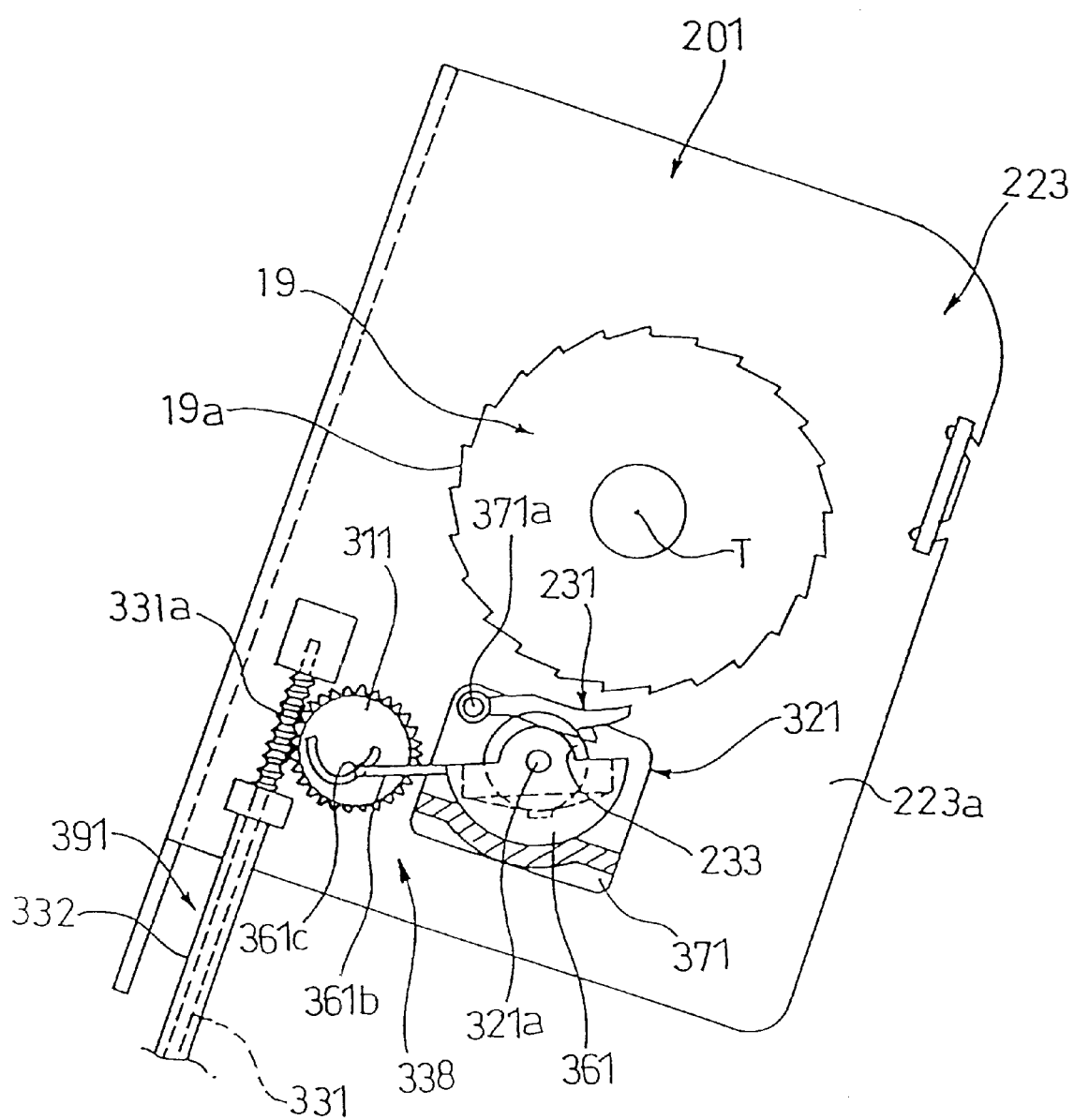
FIG. 17 is a side view showing the set belt retractor equipped with a vehicle body acceleration sensor for use with a seat belt according to a third embodiment of the present invention.

In this way, when the backrest 62 is reclined beyond the backward reclining limit of the optimum working range E of the seat belt, the leading end of the slider 251 comes into contact with a guide groove end 252a of the guide member 252, as shown in FIGS. 15 and 16, thereby preventing further displacement of the slider 251.

When the backrest 62 exceeds the backward reclining limit of the optimum working range E of the seat belt, the displacement exerted on the wire 246 by the press piece 250a is absorbed by the deflection of the coil spring 249 interposed between the slider 251 and the retractor-side end section 246a serving as a retractor-side joint section of the wire 246. Specifically, the coil spring 249 has such a spring strength as not to be changed in its inherent length even when subjected to frictional resistance of the slider 251 which is slid within the guide groove of the guide member 252 as a result of displacement of the wire 146.

In the synchronous movement cancelation mechanism 238 of the vehicle body acceleration sensor 232 according to the second embodiment, when the backrest 62 is reclined forward beyond the optimum working range E of the seat belt, the follower 247 that serves as the reclining-pivot-side joint section of the wire 246 departs from the press piece 250a, thereby canceling the movement of the sensor case 236 which is synchronous with the reclining action of the backrest 62. Further, when the backrest 62 is reclined back beyond the optimum working range E of the seat belt, the coil spring 249 is compressed, thereby absorbing the displacement of the wire 246. As a result, the movement of the sensor case 236 that is synchronous with the reclining action of the backrest 62 is canceled.

In the vehicle body acceleration sensor 232, when the backrest 62 of the reclining seat 61 is reclined beyond the optimum working range E of the seat belt, the synchronous movement cancelation mechanism 238 cancels the operation of the transmission means 239 which regulates the orientation of the inertial body support surface 236a of the sensor case 236 in synchronization with the reclining action of the backrest 62.

As mentioned above, when the backrest 62 is reclined beyond the optimum working range E of the seat belt, the sensor case 236 is not pivoted in synchronization with the reclining action of the backrest 62. Accordingly, the space for movement of the sensor case 236 does not have to be made larger than necessary, thereby rendering the retractor 200 compact.

The pivotable range of the sensor case 236 is limited by the synchronous movement cancelation mechanism 238 canceling the angular adjustment of the sensor case 236 by the transmission means 239. The transmission means 239 does not limit the reclining angle of the backrest 62 per se. The reclining seat 61 according to the present invention does not diminish the reclining seat when compared with a seat not having a built-in retractor. Consequently, the reclining seat 61 does not become difficult to use as a vehicle seat.

FIGS. 17 through 20 show a seat belt retractor 201 equipped with a vehicle body acceleration sensor 321 according to a third embodiment of the present invention. In all respects other than those addressed below, the retractor 201 equipped with the vehicle body acceleration sensor 321 is substantially identical in structure with the seat belt retractor 200 according to the second embodiment, and hence repetition of their detailed explanations is omitted.

In the vehicle body acceleration sensor 321 according to the third embodiment, a sensor case 361 having an inertial body support surface 361a for supporting the inertial body 233 is supported so as to be able to pivot about a pivotable axis 321a, by a case support member 371 mounted on a side plate 233a of the retractor base 223. The pivotable axis 321a is set so as to pass through the center of the inertial body 233. The sensor arm 231 engages the ratchet wheel 19 in association with the movement of the inertial body 233 placed on the inertial body support surface 361a of the sensor case 361, thereby actuating the lock mechanism 300. The sensor arm 231 is supported so as to be able to pivot about a pivot axis 371a of the case support member 371.

Figure 18:
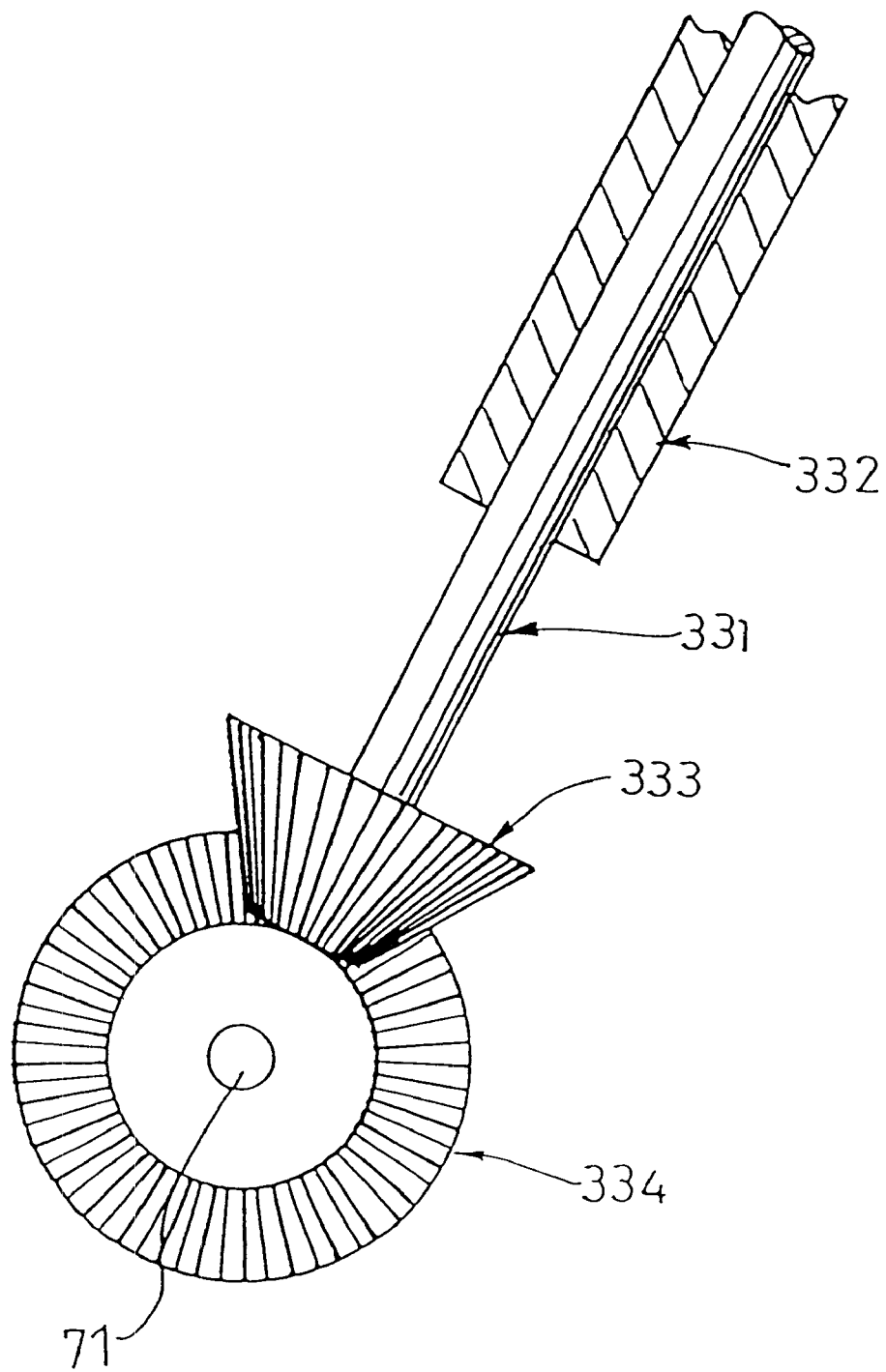
FIG. 18 is a side view showing the configuration of a seat-reclining-pivot-side section of the transmission means in the vehicle body acceleration sensor according to the third embodiment.
Figure 19:
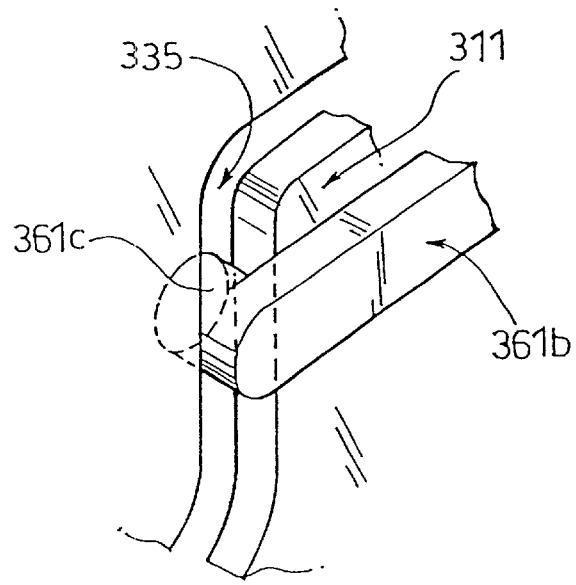
FIG. 19 is an enlarged perspective view of the principle elements showing engagement between a sensor case and a cam groove formed in a worm wheel which is attached to the retractor-side portion of the transmission means in the vehicle body acceleration sensor according to the third embodiment.
Figure 20:
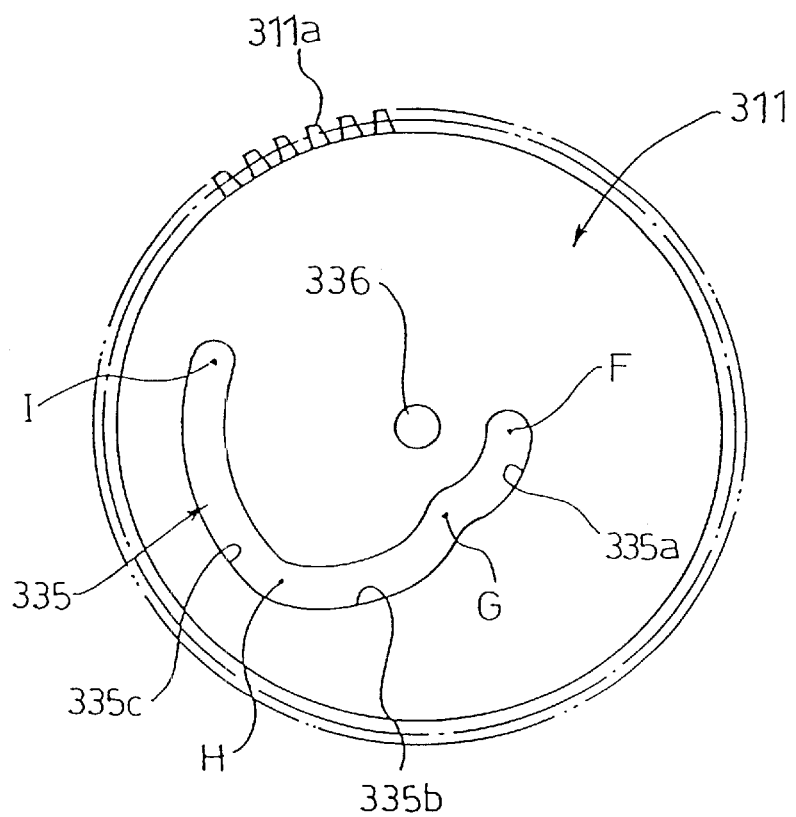
FIG. 20 is an enlarged front view showing the worm wheel attached to the retractor-side portion of the transmission means in the vehicle body acceleration sensor according to the third embodiment.

As shown in FIGS. 18 through 20, transmission means 391 for regulating the tilt angle of the sensor case 361 according to the reclining angle of the backrest 62 comprises a flexible shaft 331 which serves as a transmission member and is actuated torsionally in accordance with the reclining action of the backrest 62; a guide tube 332 in which the flexile shaft 331 is inserted so as to be torsionally rotatable; a stationary bevel gear 334 which is fixed on the seat portion 63 such that the axis of the stationary bevel gear 334 matches the seat pivotable axis 71 of the backrest 62; a drive bevel gear 333 which is connected to the end of the flexible shaft 331 facing the seat reclining pivot 71 and meshes with the stationary bevel gear 334; a worm wheel 331 which serves as a gear having a cam and is rotated by means of the torsional rotation of the flexible shaft 331 while meshing with a worm gear 331a formed on the retractor-side end portion of the flexible shaft 331; and a cam groove 335 which is formed in the worm wheel 311 and serves as a cam for pivoting the sensor case 361 in association with the rotation of the worm wheel 311.

In the transmission means 391, when the backrest 62 is reclined, the flexible shaft 331 is torsionally actuated by means of the drive bevel gear 333 that rotates in conjunction with the stationary bevel gear 334, and the worm wheel 311 is rotated in accordance with the amount of torsional movement of the flexible shaft 331. When the worm wheel 311 is rotated, the sensor case 361 is pivoted so as to follow the cam groove 335 formed in the worm wheel 311. Specifically, the torsional rotation of the flexible shaft 331 is transmitted to the sensor case 361 by way of an engagement arm 361b. As shown in FIG. 19, an engagement protuberance 361c which follows the cam groove 335 of the worm wheel 311 is formed at the leading edge of the engagement arm 361b.

As shown in FIG. 20, in order to pivot the sensor case 361 in synchronization with the reclining action of the backrest 62, the cam groove 335 of the worm wheel 311 comprises three cam profiles; namely, a first cam groove 335a extending from a start point F to an intermediate point G; a second cam groove 335b extending from the intermediate point G to another intermediate point H; and a third cam groove 335c extending from the intermediate point H to an end point I.

The first cam groove 335a corresponds to the reclining action of the backrest 62 within the range from the reclined state A to the reclined state B shown in FIG. 9. The second cam groove 335b corresponds to the reclining action of the backrest 62 within the range from the reclined state B to the reclined state C shown in FIG. 9. The third cam groove 335c corresponds to the reclining action of the backrest 62 from the reclined state C to the reclined state D shown in FIG. 9.

More specifically, the second cam groove 335b corresponds to the reclining action of the backrest 62 within the optimum working range E of the seat belt. The second cam groove 335b assumes a cam profile which gradually departs from a rotational center 336 of the worm wheel 311 in such a way that the sensor case 361 pivots in association with the rotation of the worm wheel 311. The first and third cam grooves 335a and 335c correspond to the reclining action of the backrest 62 outside the optimum working range E of the seat belt. Each of the two cam grooves 335a and 335c is formed into a circular arc which is spaced a given distance away from the rotational center 336 so as to prevent the sensor case 361 from pivoting in synchronization with the backrest 62.

Accordingly, in the transmission means 391 according to the third embodiment, when the backrest 62 is reclined beyond the optimum working range E of the seat belt, the first and third cam grooves 335a and 335c formed in the worm wheel 311 prevent the sensor case 361 from pivoting in synchronization with the reclining action of the backrest 62. Thus, in the vehicle body acceleration sensor 321 according to the third embodiment, the worm wheel 311 having the cam groove 335 formed therein acts as a synchronous movement cancelation mechanism 338 which prevents the sensor case 361 from pivoting in synchronization with the reclining action of the backrest 62.

In the vehicle body acceleration sensor 321 according to the third embodiment, the synchronous movement cancelation mechanism 338 is interposed between the sensor case 361 and the worm gear 331a that serves as the retractor-side joint section of the flexible shaft 331. Accordingly, there can be avoided a mechanism which is provided in line with the seat reclining pivot 71 of the backrest 62 and which transmits the reclining action of the backrest 62 to the reclining-pivot-side joint section of the flexible shaft 331. Therefore, in addition to the operation and working effect yielded by the vehicle body acceleration sensor 232 according to the second embodiment, the vehicle body acceleration sensor 321 according to the third embodiment yields an advantage of the ability to cope with a plurality of types of seats by minor modification of the retractor.

Figure 21:
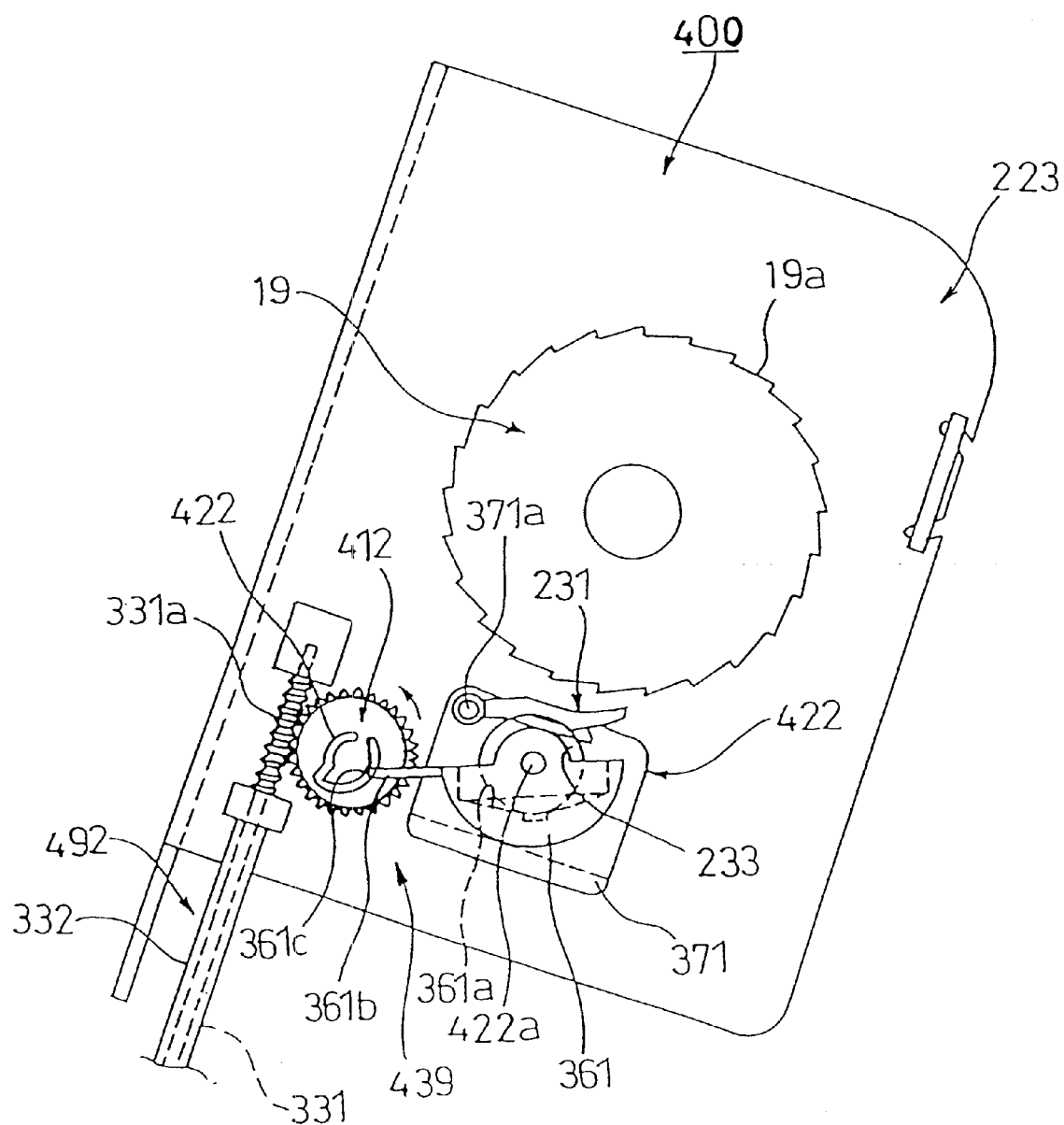
FIG. 21 is a side view showing a seat belt retractor equipped with a vehicle body acceleration sensor for use with a seat belt according to a fourth embodiment of the present invention.
Figure 22:
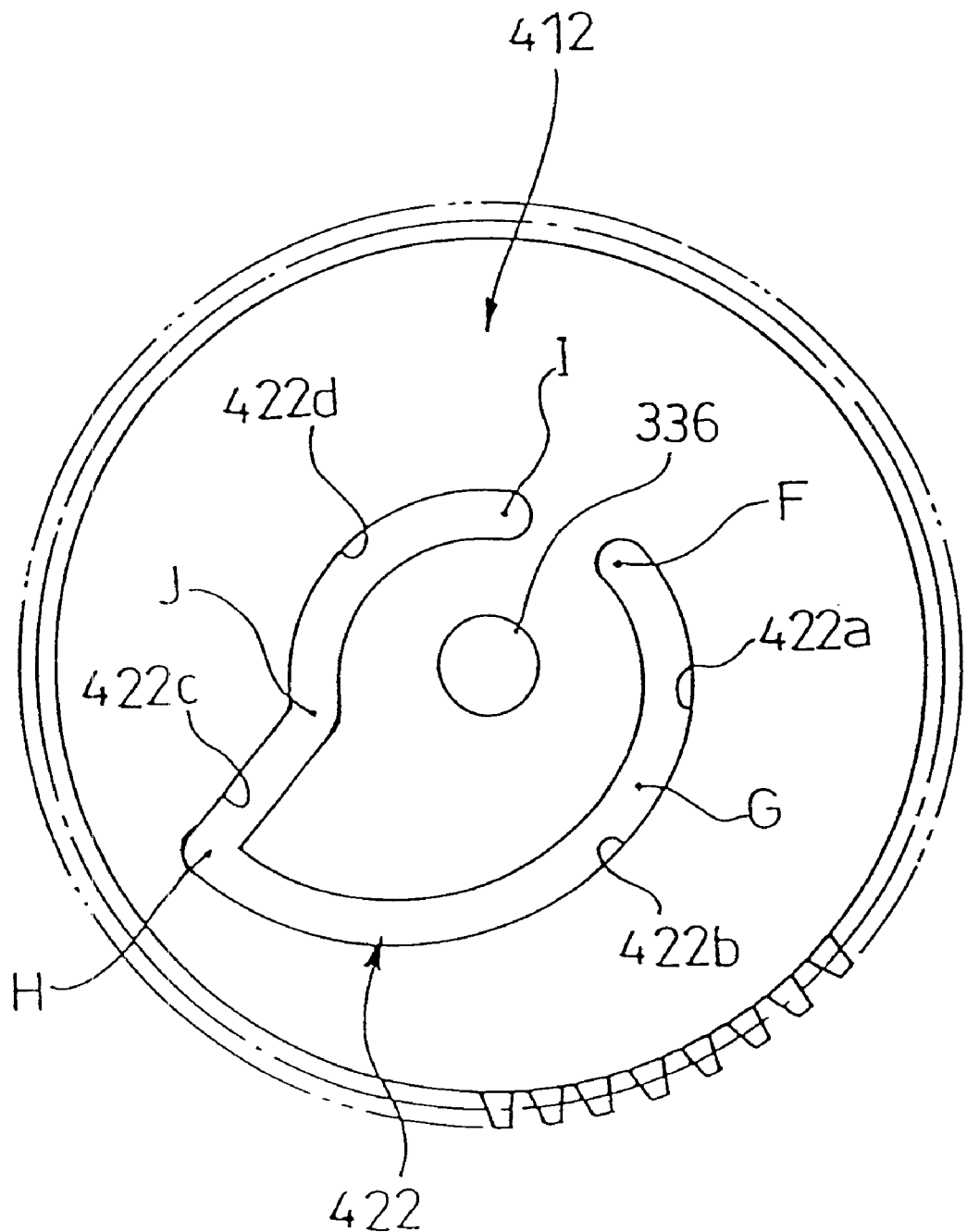
FIG. 22 is an enlarged front view of the worm wheel shown in FIG. 21.
Figure 23:
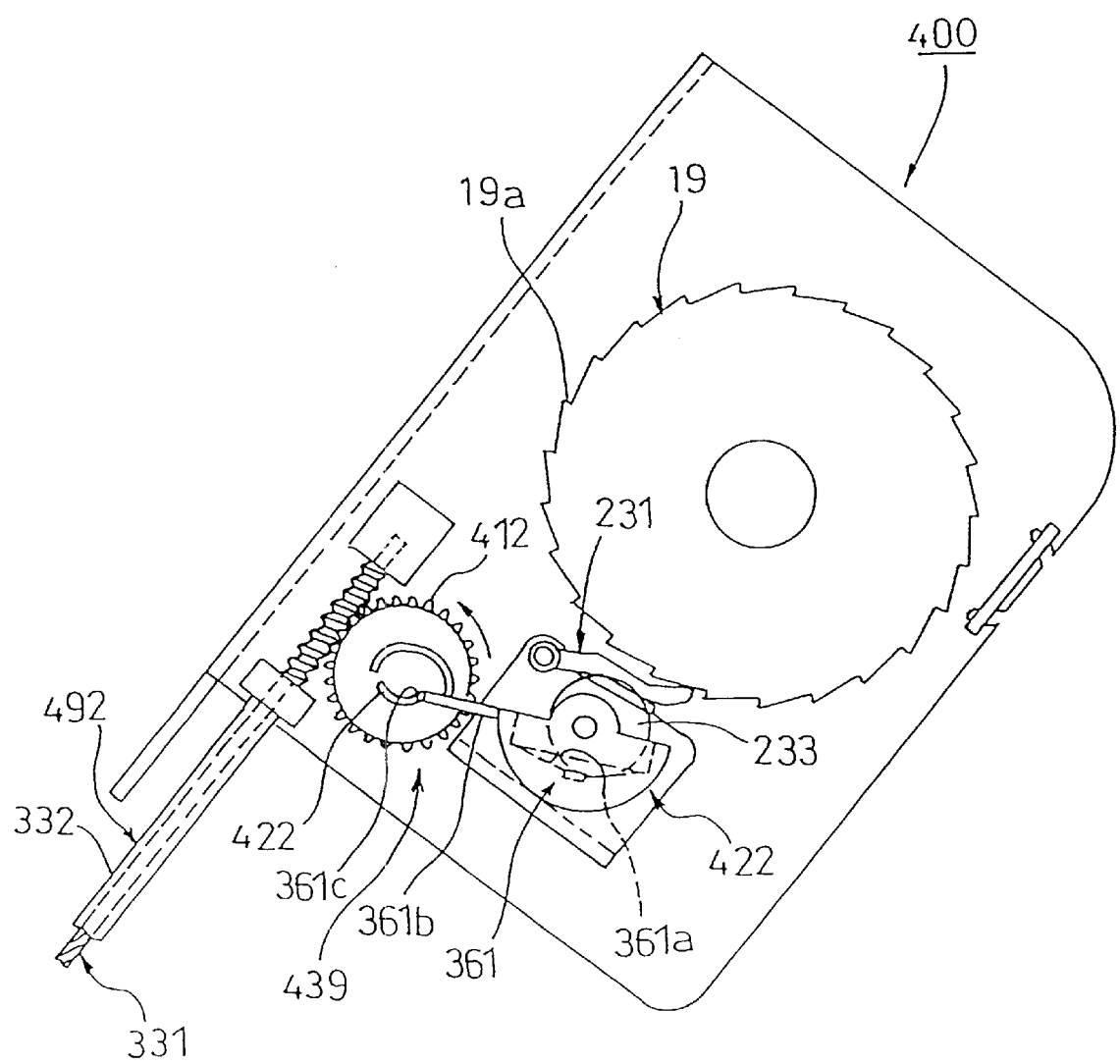
FIG. 23 is a side view of a retractor showing the vehicle body acceleration sensor shown in FIG. 21 when the sensor is pivoted beyond the most backwardly reclined position of the optimum working range of the seat belt.

FIGS. 21 through 23 show a seat belt retractor 400 equipped with a vehicle body acceleration sensor 422 according to a fourth embodiment of the present invention. The vehicle body acceleration sensor 422 according to the fourth embodiment is identical with in configuration the vehicle body acceleration sensor 321 according to the third embodiment, except for the configuration of a worm wheel 412 of transmission means 492 for controlling the tilt angle of the sensor case 361 in synchronization with the reclining action of the backrest 62. Hence, detailed descriptions of the other elements are omitted.

In transmission means 492 according to the fourth embodiment, the worm wheel 412—serving as a gear with a cam—has a cam groove 411 which serves as a cam for pivoting the sensor case 361 in association with the rotation of the worm wheel 412 and which differs from the cam groove 335 according to the third embodiment.

As shown in FIG. 22, the cam groove 422 comprises four cam profiles: namely, a first cam groove 422a extending from a starting point F to an intermediate point G; a second cam groove 422b extending from the intermediate point G to another intermediate point H; a third cam grove 422c extending from the intermediate point H to still another intermediate point; and a fourth cam groove 422d extending from the intermediate point J to an end point I.

The first cam groove 422a corresponds to the reclining action of the backrest 62 within the range from the reclined state A to the reclined state B shown in FIG. 9. The second cam groove 422b corresponds to the reclining action of the backrest 62 within the range from the reclined state B to the reclined state C shown in FIG. 9. The third cam groove 422c corresponds to the reclining action of the backrest 62 within a considerable narrow range beyond the reclined state C shown in FIG. 9. The fourth cam groove 422d corresponds to the reclining action of the backrest 62 within the range from the reclined state C to the reclined state D shown in FIG. 9.

More specifically, the second cam groove 422b corresponds to the reclining action of the backrest 62 within the optimum working range E of the seat belt. The second cam groove 442b assumes a cam profile which gradually departs from a rotational center 336 of the worm wheel 412 in such a way that the sensor case 361 pivots in association with the rotation of the worm wheel 412. The first and fourth cam grooves 422a and 422d correspond to the reclining action of the backrest 62 outside the optimum working range E of the seat belt. Either of the two cam grooves 422a and 422d is formed into a circular arc which is spaced a given distance away from the rotational center 336 so as to prevent the sensor case 361 from pivoting in synchronization with the backrest 62. Thus, the worm wheel 412 acts as a synchronous movement cancelation mechanism 439 which prevents the sensor case 361 from pivoting in synchronization with the reclining action of the backrest 62.

As shown in FIG. 23, when the backrest 62 is reclined beyond the backward reclining limit of the optimum working range E of the seat belt, the third cam groove 422c tilts the sensor case 361 to a tilt angle of the inertial body support surface 361a, thereby moving the inertial body 233. As a result, the sensor arm 231 engages the teeth 19a of the ratchet wheel 19.

More specifically, in the transmission means 429 according to the fourth embodiment, when the backrest 62 is reclined beyond the backward reclining limit of the optimum working range E of the seat belt, the sensor case 361 is pivoted a great amount by means of the third cam groove 422c, so that the emergency lock mechanism 300 is actuated to thereby hinder withdrawal of the webbing.

The inertial body support surface 361a of the sensor case 361 is formed into the shape of a fan having its center extending below the main portion of the fan. Even if the backrest 62 is reclined beyond the optimum working range E of the seat belt, the inertial body 233 is not immediately moved until the sensor case 361 is tilted to or beyond the tilt angle of the inertial body support surface 361a. If no third cam groove 422c is provided, the webbing 70 may not be locked immediately even when the backrest 62 is reclined to the backward reclining limit of the optimum working range E of the seat belt.

The inclination of the vehicle body, or the like, affects and changes the angle through which the backrest 62 is actually reclined from when angular adjustment of the sensor case 361 is interrupted as a result of the backrest 62 reaching the backward reclining limit of the optimum working range E of the seat belt until the sensor case 361 is tilted to or beyond the tilt angle of the inertial body support surface 361a.

Therefore, there exists a vague gray zone in which it is not clear whether or not withdrawal of the webbing 70 is prevented. When the backrest 62 is in the reclined position within the gray zone, the seat belt may be erroneously fastened.

According to the fourth embodiment, if the backrest 62 is reclined to the backward reclining limit of the optimum working range E of the seat belt, the third cam groove 422c immediately tilts the sensor case 361 to or beyond the tilt angle of the inertial body support surface 361a, thereby actuating the emergency lock mechanism 300 and eliminating the foregoing gray zone. As a result, when the backrest 62 is backwardly reclined beyond the optimum working range E of the seat belt, the withdrawal of the webbing is reliably prevented, thus preventing fastening of the seat belt.

Figure 24:
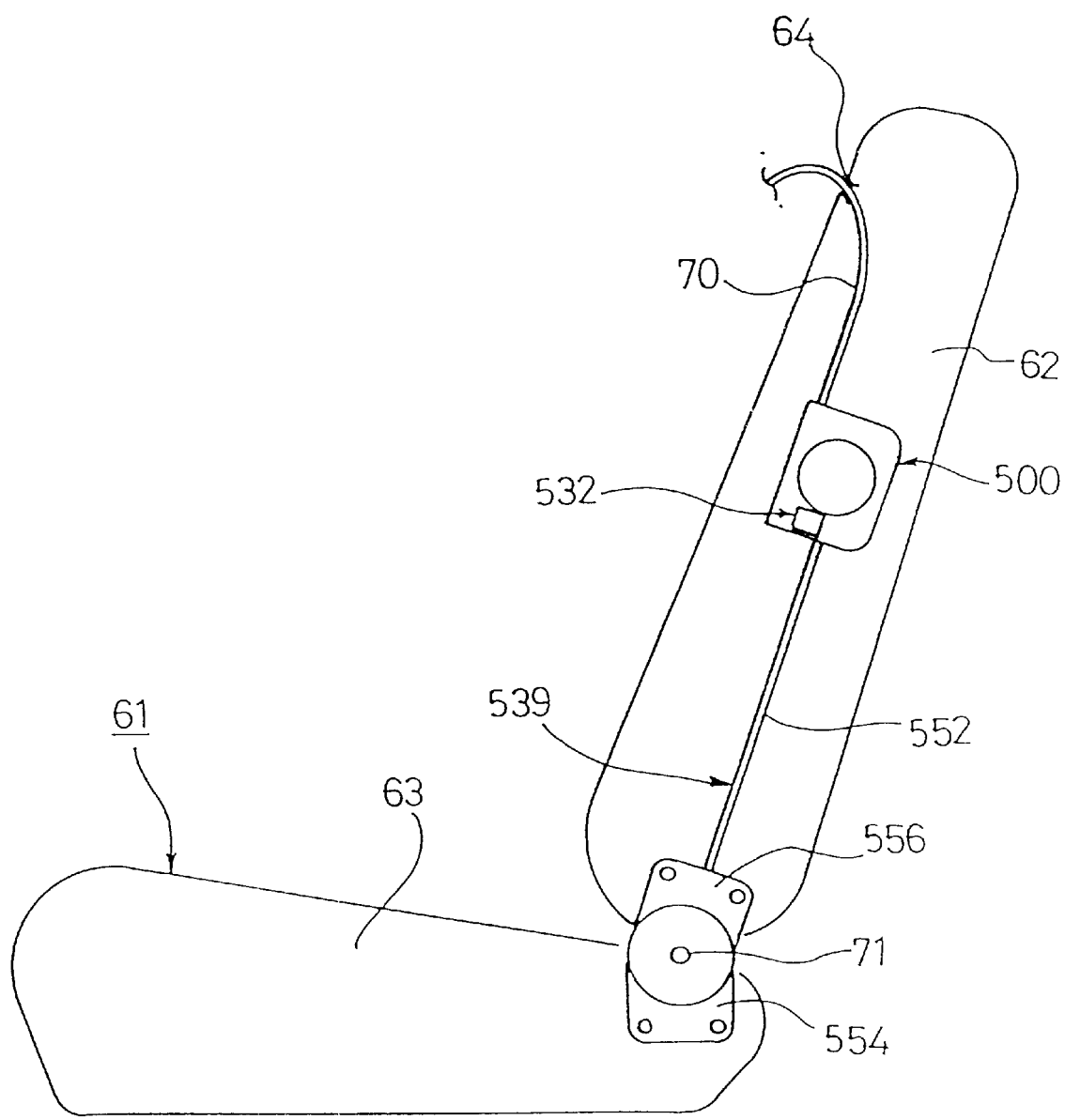
FIG. 24 is a schematic side view showing a reclining seat, wherein a seat belt retractor having a vehicle body acceleration sensor for use with a seat belt according to a fifth embodiment is incorporated in a backrest.

FIG. 24 is a schematic side view showing a reclining seat, in which a seat belt retractor 500 equipped with a vehicle body acceleration sensor 532 according to a fifth embodiment of the present invention is incorporated in the backrest. Those components which are the same as those used in the seat belt retractor 200 according to the second embodiment are assigned the same reference numerals, and repetition of their detailed explanations are omitted.

Figure 25:
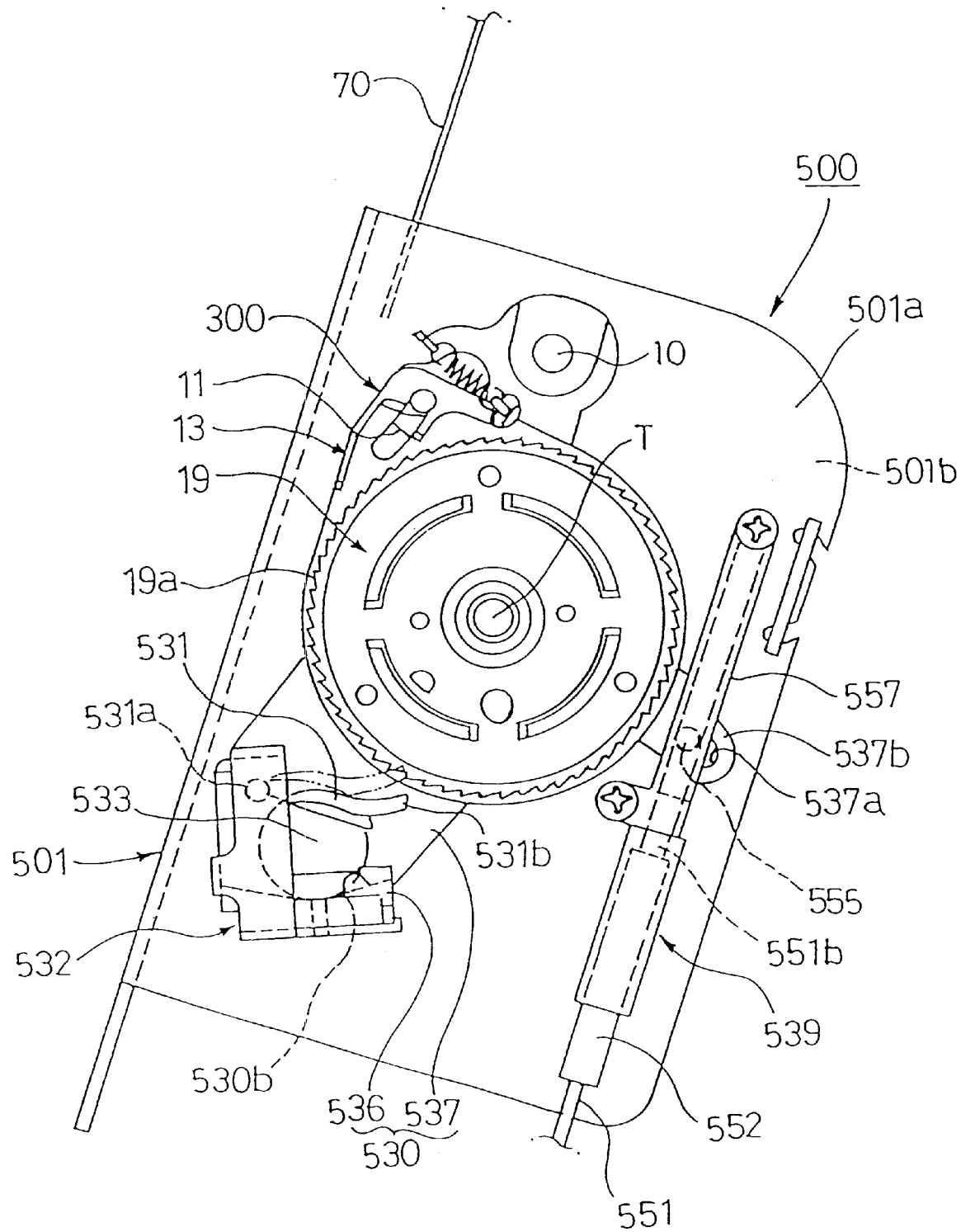
FIG. 25 is a side view showing the seat belt retractor shown in FIG. 24.
Figure 26:
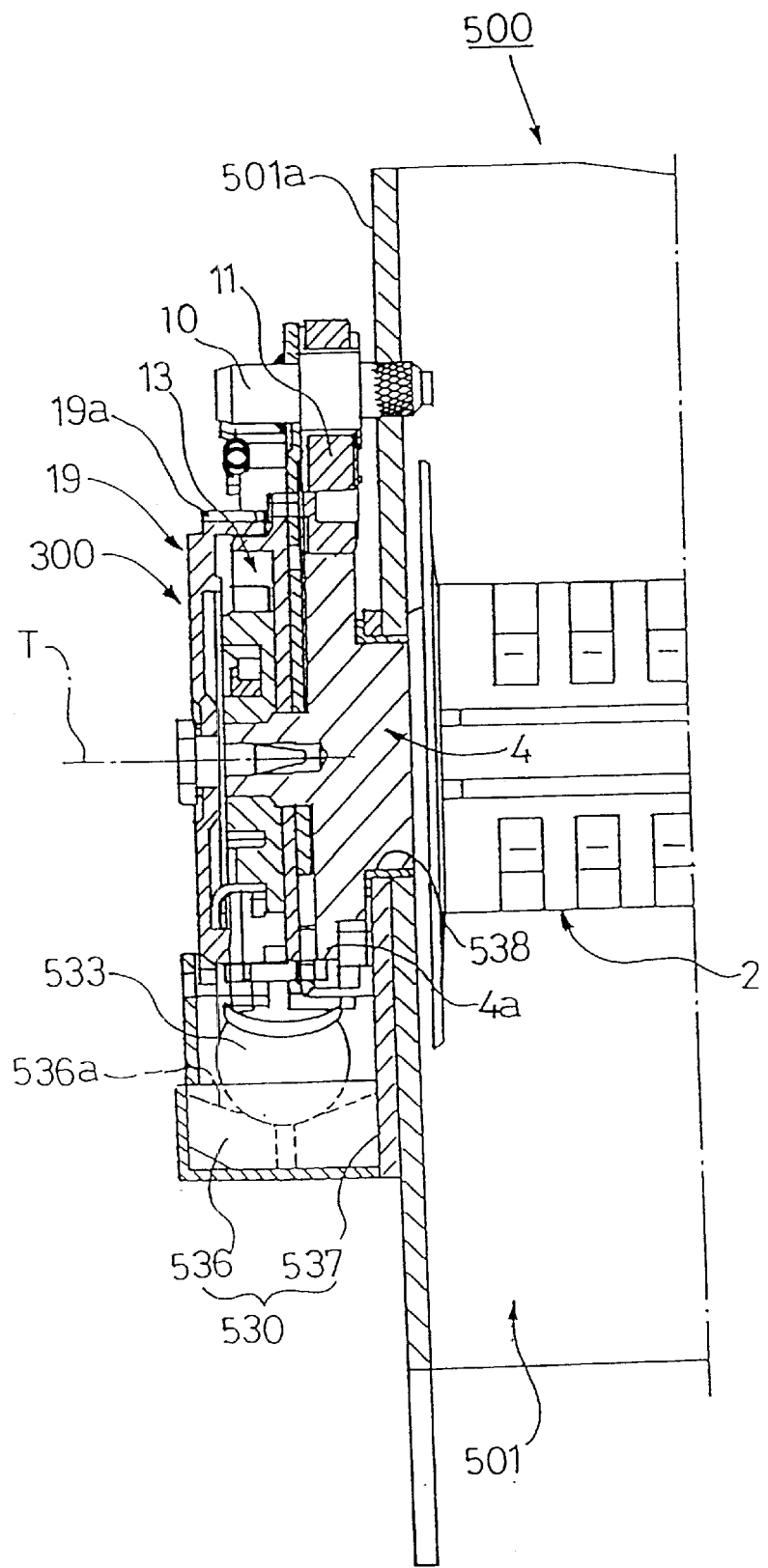
FIG. 26 is a fragmentary sectional view showing the seat belt retractor shown in FIG. 24.

As shown in FIGS. 25 and 26, the seat belt retractor 500 comprises a substantially cylindrical bobbin 2 around which the webbing 70 is wound; a take-up shaft 4 which is inserted into the bobbin 2, is rotatively supported by means of a retractor base 501, and has at one end thereof (i.e., on the right-hand side of the take-up shaft 4 shown in FIG. 26) the latch plate 4a formed from a ratchet wheel; and the emergency lock mechanism 300 which, in the event of an emergency, prevents rotation of the latch plate 4a in a direction in which the webbing 70 is drawn-out. The webbing 70 withdrawn from the retractor 500 by way of a slot 64 formed in the backrest 62 restraints the occupant.

The retractor base 501 mounted on a frame member (not shown) of the backrest 62 is formed from a metal plate through press molding such that the majority of the retractor base 501 assumes a substantially angular C-shaped cross section. The take-up shaft 4 fitted into the bobbin 2 is rotatable and sandwiched between both sides plates 501a and 501b of the retractor base 501. The end of the take-up shaft 4 that passes through the side plate 501b of the retractor base 1 is provided with a known take-up spring device (not shown). At all times, the take-up spring device urges the bobbin 2 in the direction in which the webbing 70 is taken up, by way of the take-up shaft 4.

In the seat belt retractor 500, the vehicle body acceleration sensor 532 according to the fifth embodiment is provided below the ratchet wheel 19 that constitutes the emergency lock mechanism 300.

As shown in FIGS. 25 and 26, the vehicle body acceleration sensor 532 comprises a sensor arm 531, a sensor case 530, an inertial body 533, and transmission means 539.

The sensor case 530 comprises a case body 536 having an inertial body support surface 536a on which the inertial body 533 is placed, and a hanger member 537 extending upward from one side surface of the case body 536. The upper end of the hanger member 537 is supported in a rotatable manner by a bearing bush 538 which supports the take-up shaft 4. More specifically, the pivot axis T of the sensor case 530 is in line with the rotational axis of the take-up shaft 4 that extends in parallel with the seat reclining pivot 71.

The inertial body support surface 536a of the case body 536 is formed into the shape of a fan having its center extending below the main portion of the fan. The case body 536 is removably attached at a predetermined location of the hanger member 537. Further, a tongue-shaped joint section 537b is formed so as to extend in a radially outward direction in a ring section of the hanger member 537 supported by the bearing bush 538, and an elongated hole 537a engaged with transmission means 539, which will be described later, is formed in the joint section 537b.

A pin section 531a provided at the base end of the sensor arm 531 is rotatively supported. While the sensor case 530 is attached to the retractor, the sensor arm 531 can be pivoted about the pin section 531a thereof and can switch between a first position—where a leading edge 531b of the sensor arm 531 engages the teeth 19a of the ratchet wheel 19 to thereby prevent the take-up shaft 4 from rotating in the direction in which the webbing is drawn-out—and a second position—where the leading edge 531b is disengaged from the teeth 19a to thereby prevent actuation of the lock means.

When the leading edge 531b of the sensor arm 531 engages the teeth 19a of the ratchet wheel 19, the ratchet wheel 19 rotates so as to lag behind the take-up shaft 4. As a result, the pole 11 engages the latch plate 4a by way of the latch cup 13, thereby preventing rotation of the take-up shaft 4 in the direction in which the webbing is drawn-out.

The inertial body 533 assumes a spherical shape and is placed on the inertial body support surface 536a. Upon receipt of a velocity change greater than a predetermined magnitude, the inertial body 533 moves in relation to the inertial body support surface 536a, thereby moving to the first position the sensor arm 531 that remains in contact with the outside of the inertial body 533.

The transmission means 539 pivots the sensor case 530 about its pivot axis T according to the reclining angle of the backrest 62 in such a way as to retain the inertial body support surface 536a in an appropriate orientation regardless of reclining angle of the backrest 62. The sensor case 530 joined to the transmission means 539 is prevented from pivoting about the pivot axis T by the inertial force which would be exerted in the event of collision.

The transmission means 539 comprises a cam plate 554 having a cam surface extending in the peripheral direction from the seat reclining pivot 71; a rod member 551 which serves as a transmission member, follows the cam surface of the cam plate 554, and pivots the sensor case 530 about the pivot axis within only the pivotable range of the sensor case 530 in synchronization with the reclining action of the backrest; and a guide tube 552 which houses the rod member 551 in a slidable fashion.

In place of the rod member 551 according to the fifth embodiment, there may be employed a wire which possesses appropriate flexibility for bending so as to fit a location where the wire is laid, such as the inside of the backrest 62, such that one end of the wire is connected to a follower that is joined to a side edge of the cam plate and is provided so as to be able to move back and forth toward the cam surface of the cam plate. The other end of the wire is joined to the sensor case, and the wire possesses appropriate strength for moving along the inside of the guide tube without buckling when receiving a longitudinal force.

Figure 27:
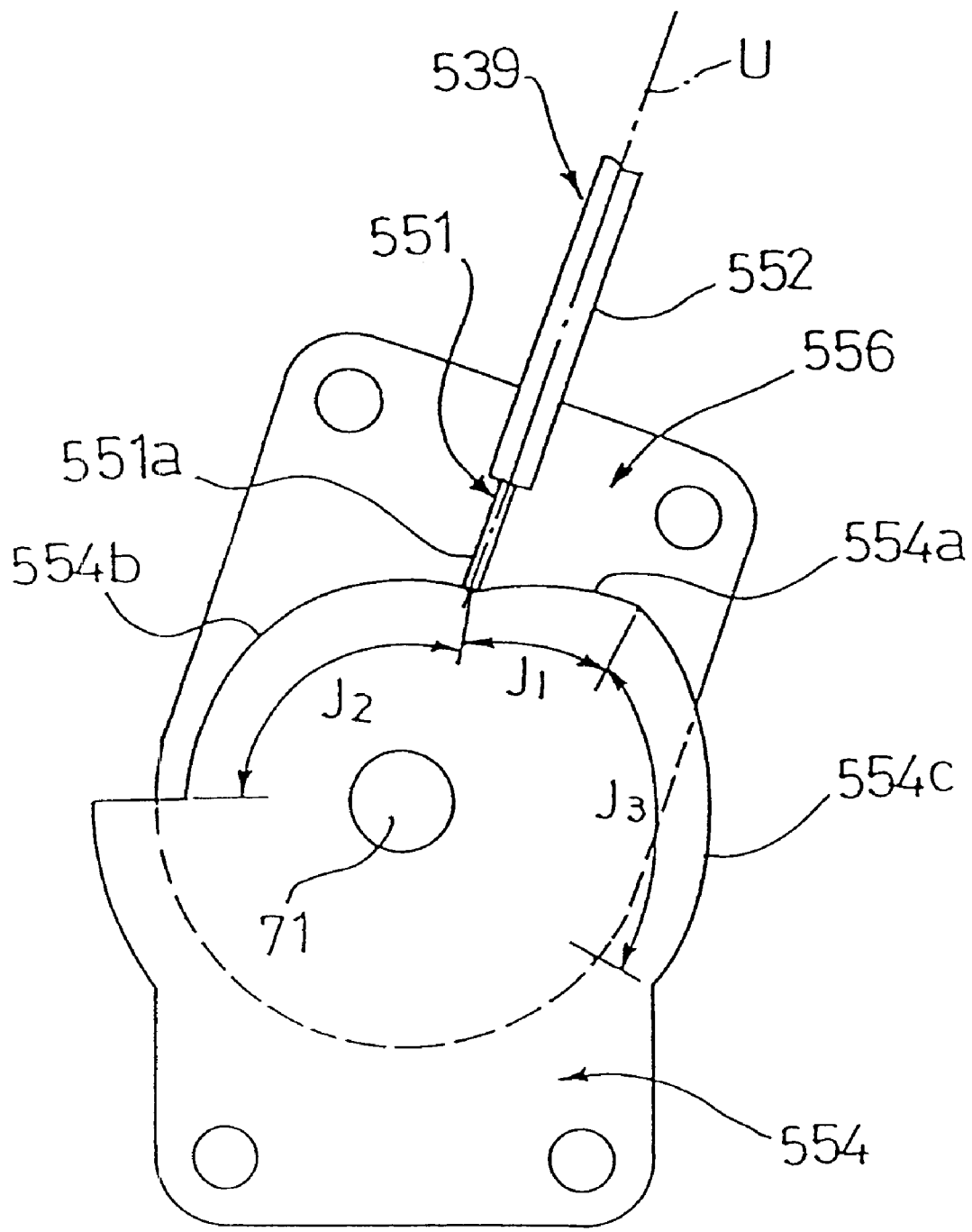
FIG. 27 is an enlarged view showing the principle elements of transmission means in the vehicle body acceleration sensor shown in FIG. 24.

As shown in FIG. 25, a retractor-side end section 552b of the guide tube 552 in which the rod member 551 is inserted is mounted on a side plate 501a of the retractor base 501 so that a retractor-side end section 551b of the rod member 551 passes through the vicinity of a joint section 537b of the hanger member 537. As shown in FIG. 27, a cam-plate-side end section 552a of a guide tube 552 is fixedly positioned on a support plate 556 fixed to the backrest 62 such that the cam-plate-side end section 551a of the rod member 551 protrudes toward the seat reclining pivot 71 of the backrest 62 (i.e., the cam-plate-side end section 551a of the rod member 551 is placed on a line U passing through the seat reclining pivot 71 of the backrest 62).

One end of the retractor-side end section 551b of the rod member 551 is connected to the hanger member 537 by way of a pin 555 which engages an elongated hole 537a of the joint section 537b. Further, the retractor-side end section 551b is urged toward the other end thereof by means of an unillustrated compressed coil spring provided in the guide member 557 attached to the retractor-side end section 552b of the guide tube 552. The cam-plate-side end section 551a of the rod member 551 serves as a follower which follows the cam surface of the cam plate 554, and is urged so as to remain in contact with the cam surface of the cam plate 554 by a restoration force of the compressed coil spring provided within the guide member 557.

The outer surface of the cam plate 554 mounted on the seat portion 63 serves as a cam surface. When the backrest 62 is reclined, the cam-plate-side end section 551a of the rod member 551 moves back and forth along the line U.

The cam surface of the cam plate 554 comprises three cam surface portions: namely, a synchronous movement cam surface portion 554a which serves as a synchronous movement region, in which the sensor case 530 is pivoted about its pivot axis T according to the reclining angle of the backrest 62; and cam surface portions 554b and 554c which continue from respective sides of the cam surface portion 554a and serve as non-synchronous movement regions, in which the sensor case 530 is not pivoted in synchronization with the reclining action of the backrest 62.

When the backrest 62 is reclined within the optimum working range of the seat belt in which the webbing 70 can appropriately restrain an occupant, the synchronous movement cam surface portion 554a controls the forward and backward movement of the cam-plate-side end section 551a of the rod member 551 in such a way that the inertial body support surface 536a of the case body 536 is retained in an appropriate orientation regardless of reclining angle of the backrest 62.

When the backrest 62 is in the maximum forwardly-reclined state (shown in FIG. 24) within the optimum working range of the seat belt, the cam-plate-side end section 551a of the rod member 551 is positioned at a portion of the synchronous movement cam surface portion 554a close to the non-synchronous movement cam surface portion 224b, as shown in FIG. 27. When the backrest 62 is backwardly reclined from this state, the cam-plate-side end section 551a of the rod member 551 moves in a clockwise direction in FIG. 27 about the seat reclining pivot 71 in conjunction with the reclining action of the backrest 62. The cam-plate-side end section 551a is pushed by the synchronous movement cam surface portion 554a. The rod member 551 that is pushed by the synchronous movement cam surface portion 554a when the backrest 62 is backwardly reclined pivots the hanger member 537 attached to the case body 536 about the take-up shaft 4 in a counterclockwise direction in FIG. 25, thereby retaining the inertial body support surface 536a of the case body 536 in an appropriate orientation.

Figure 28:
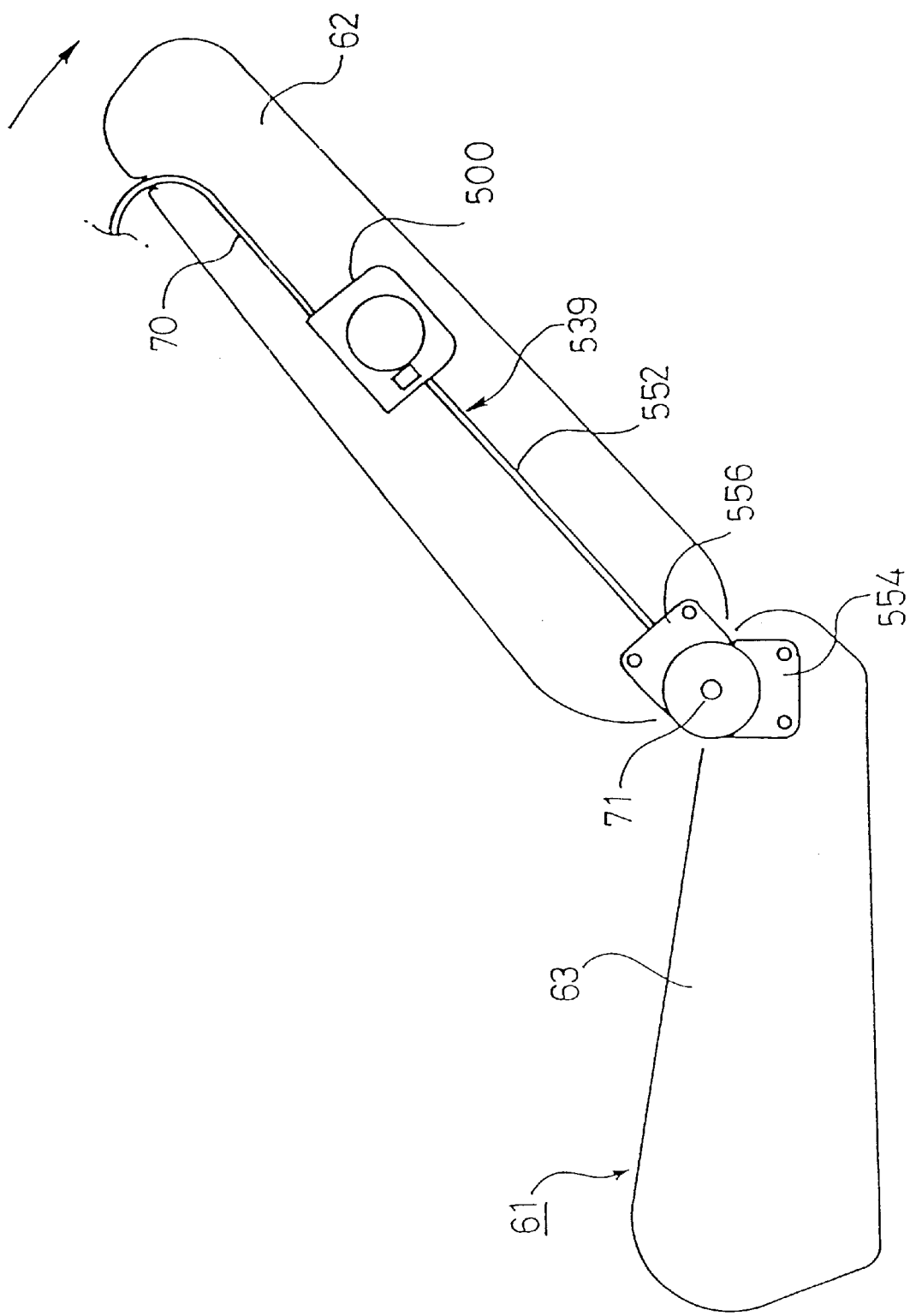
FIG. 28 is a side view of the reclining seat shown in FIG. 24 when the backrest of the reclining seat is reclined to the most backwardly reclined position within the working range of the seat belt.
Figure 29:
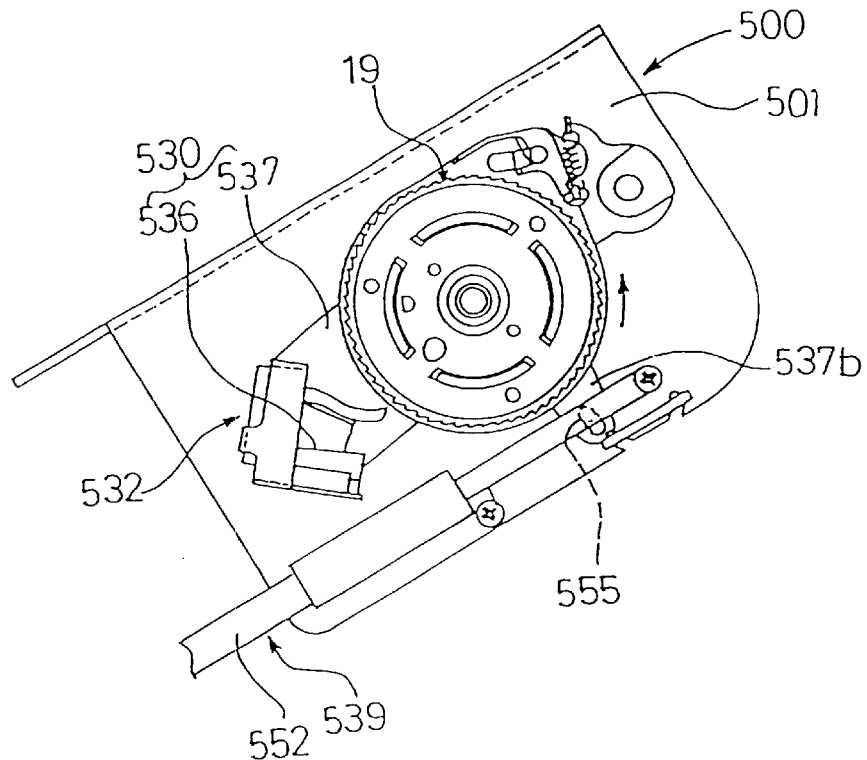
FIG. 29 is a side view of the seat belt retractor showing the vehicle body acceleration sensor when the backrest shown in FIG. 28 is reclined.
Figure 30:
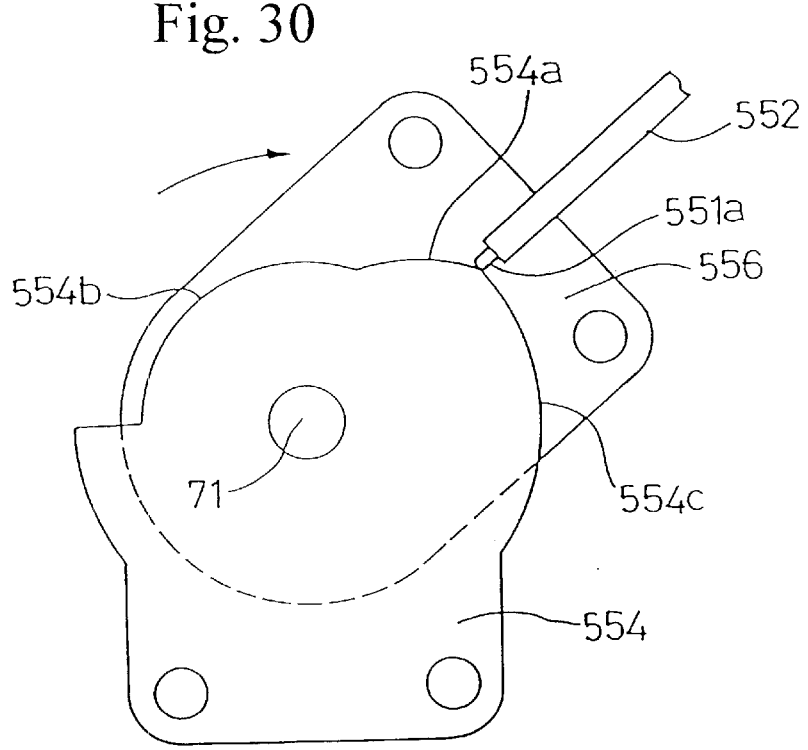
FIG. 30 is an enlarged view of the principle elements showing the state of transmission means of the vehicle body acceleration sensor when the backrest shown in FIG. 28 is reclined.

When the backrest 62 is in the maximum backwardly-reclined state (shown in FIG. 28) within the optimum working range of the seat belt, the cam-plate-side end section 551a of the rod member 551 is positioned at a portion of the synchronous movement cam surface portion 554a close to the non-synchronous movement cam surface portion 554c, as shown in FIG. 30, whereby the hanger member 537 attached to the case body 536 retains the inertial body support surface 536a of the case body 536 in an appropriate orientation, as shown in FIG. 29.

Accordingly, when the backrest 62 is reclined within the range from the reclined position shown in FIG. 24 to the reclined position shown in FIG. 28, the seat belt apparatus can appropriately restrain the occupant by use of the webbing 70. In short, the range corresponds to an optimum working range of the retractor 500.

As shown in FIG. 27, the length $J_1$ and curvature of the synchronous movement cam surface portion 554a are set so as to correspond to the optimum working range of the seat belt. The range in which the hanger member 537 is pivoted by means of the synchronous movement cam surface portion 554a by way of the rod member 551 corresponds to the pivotable range of the sensor case 530 (i.e., an operative angular range of the vehicle body acceleration sensor 532). Here, the pivotable range of the sensor case 530 is set so as to become slightly wider than the reclining range of the backrest 62 within the optimum working range of the seat belt, so as to prevent damage to the sensor case 530.

When the backrest 62 is reclined beyond the optimum working range of the retractor 500 in which the webbing 70 cannot appropriately restrain the occupant, the non-synchronous movement cam surface 554b or 554c limit the forward and backward movement of the cam-plate-side end section 551a of the rod member 551, thus serving as a synchronous movement cancelation mechanism for preventing the sensor case 530 from pivoting in synchronization with the backrest 62.

The non-synchronous movement cam surface portion 554b is intended to limit the forward and backward movement of the cam-plate-side end section 551a of the rod member 551 when the backrest 62 is reclined beyond the maximum forwardly reclined state (shown in FIG. 24) within the optimum working range of the seat belt. Hence, the non-synchronous cam surface portion 554b continues from one side of the synchronous movement cam surface portion 554a, as shown in FIG. 27.

The non-synchronous movement cam surface portion 554c is intended to limit the forward and backward movement of the cam-plate-side end section 551a of the rod member 551 when the backrest 62 is reclined beyond the maximum backwardly reclined state (shown in FIG. 28) within the optimum working range of the seat belt. Hence, the non-synchronous movement cam surface portion 554c continues from the other end of the synchronous movement cam surface portion 554a.

These non-synchronous movement cam surfaces 554b and 554c are formed into circular-arc shapes centered on the seat reclining pivot 71. The hanger member 537 is prevented from being actuated in synchronization with the reclining action of the backrest by maintaining constant the interval between the seat reclining pivot 71 of the backrest 62 and the cam-plate-side end section 551a of the rod member 551.

Figure 31:
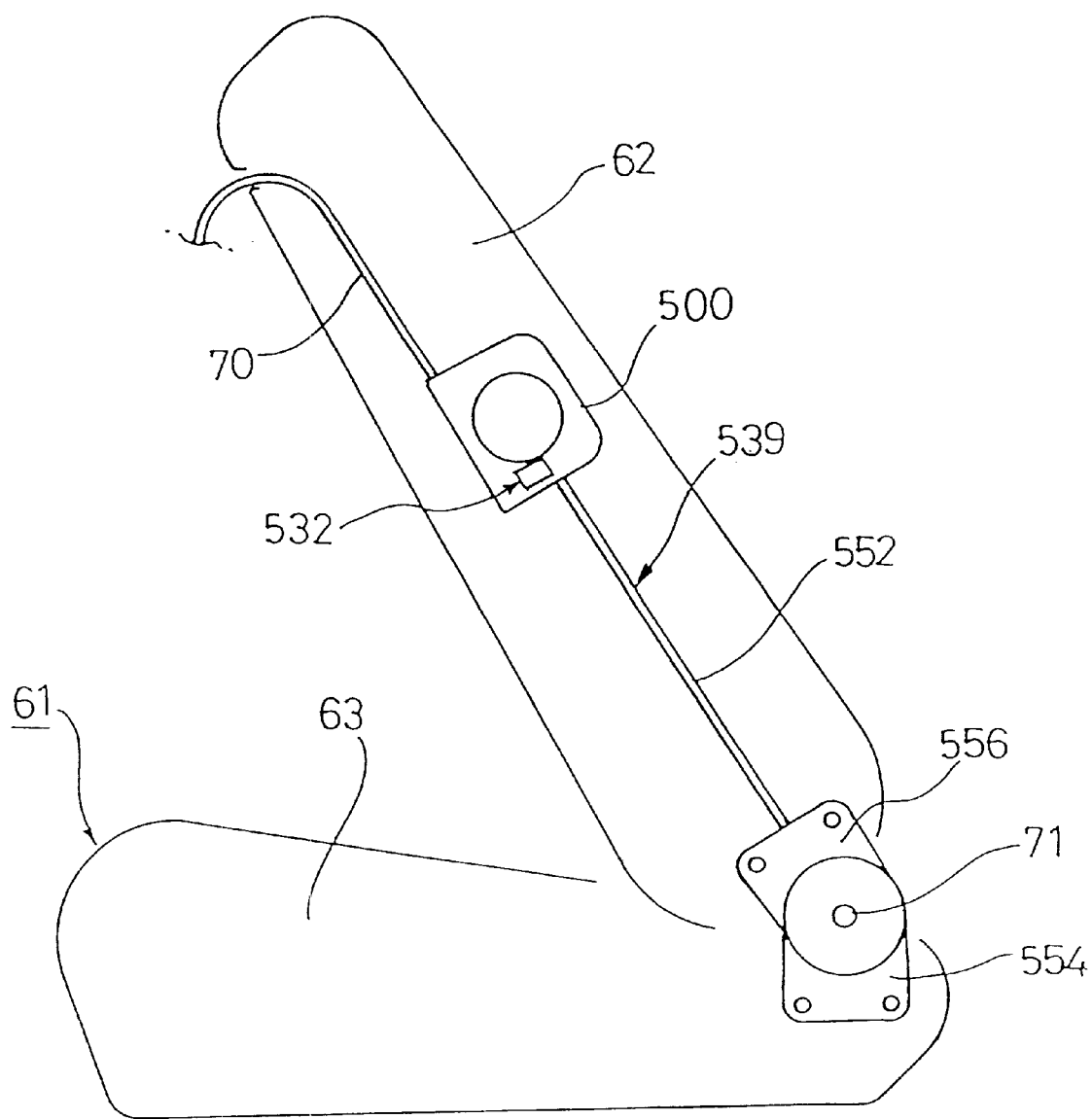
FIG. 31 is a side view of the reclining seat shown in FIG. 24 when the backrest of the reclining seat is reclined to the most forwardly reclined position within the working range of the seat belt.
Figure 32:
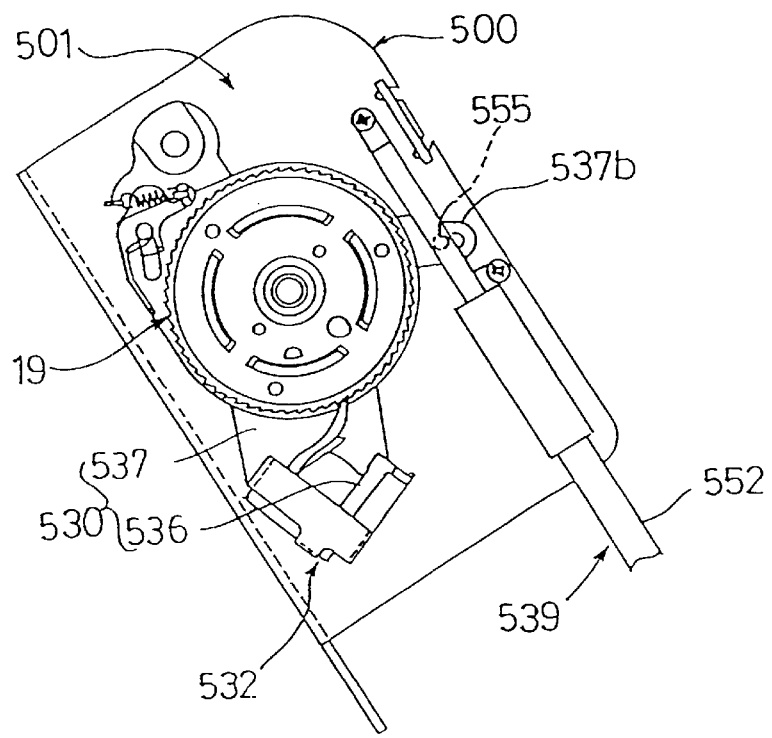
FIG. 32 is a side view of the seat belt retractor showing the state of the vehicle body acceleration sensor when the backrest shown in FIG. 31 is reclined.
Figure 33:
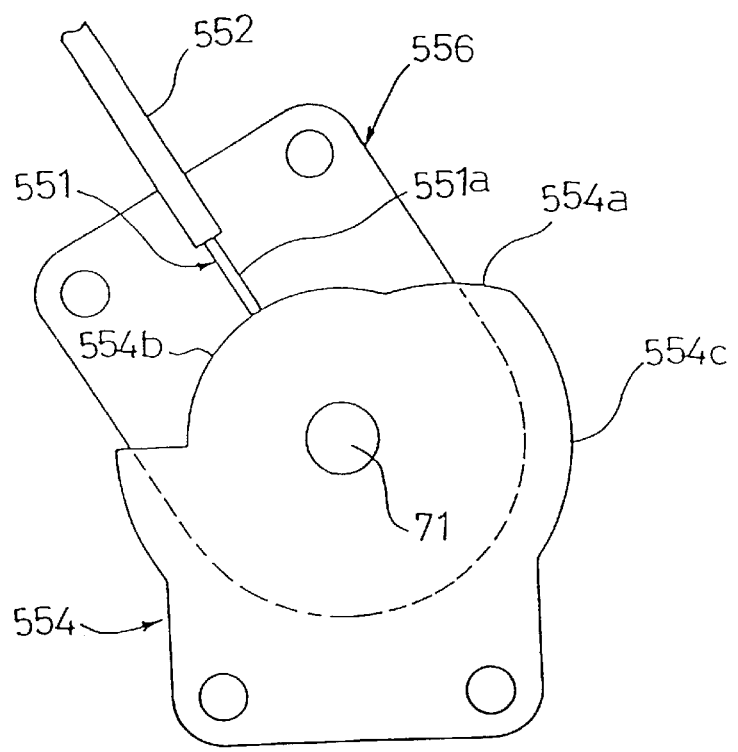
FIG. 33 is an enlarged view of the principle elements showing the state of transmission means of the vehicle body acceleration sensor when the backrest shown in FIG. 31 is reclined.

FIG. 31 shows the reclined state of the backrest 62 when the backrest 62 is reclined beyond the reclined state shown in FIG. 24; FIG. 32 shows the pivoted state of the hanger member 537; and FIG. 33 shows the position of the cam-plate-side end section 551a on the non-synchronous movement cam surface portion 554b. Even when there is a change in the reclined state of the backrest 62, the pivoting state of the hanger member 537 remains unchanged and the cam-plate-side end section 551a remains in contact with a portion of the synchronous movement cam surface portion 554a close to the non-synchronous movement cam surface portion 554b.

Figure 34:
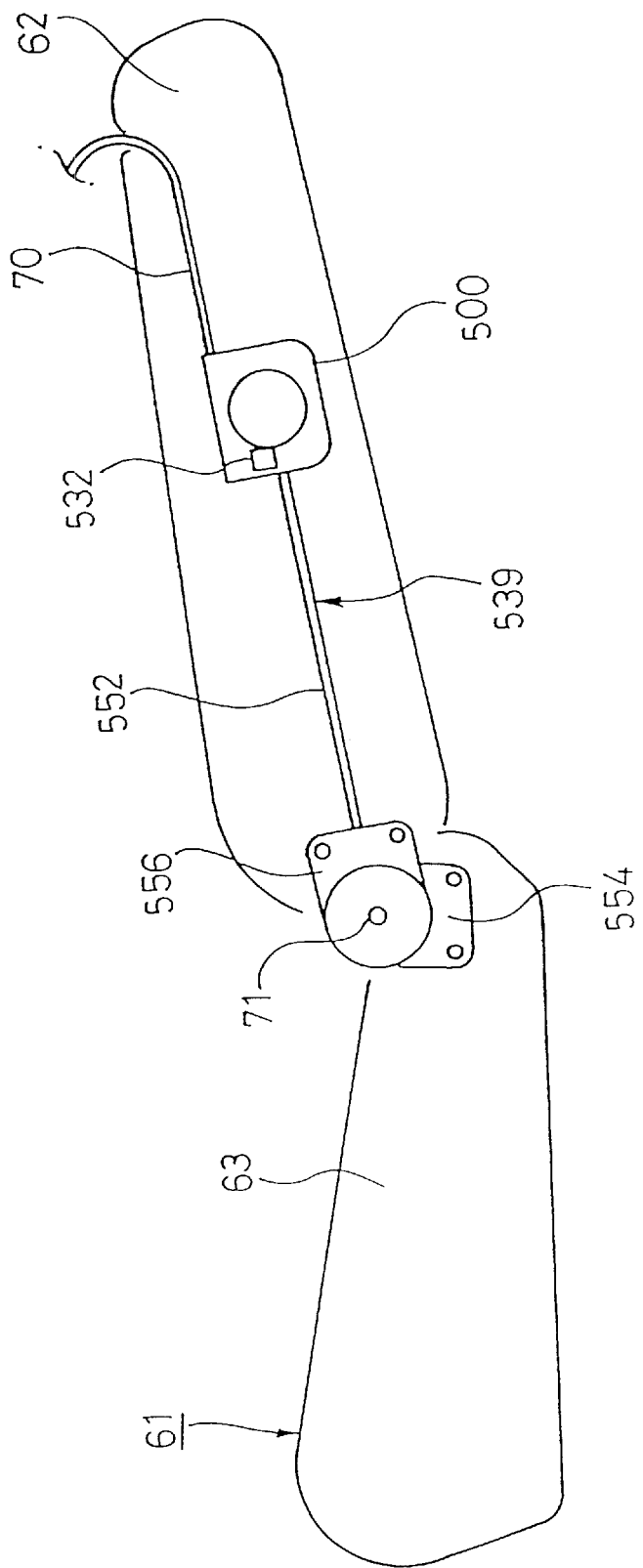
FIG. 34 is a side view of the reclining seat shown in FIG. 24 when the backrest of the reclining seat is reclined to the most backwardly reclined position within the working range of the seat belt.
Figure 35:
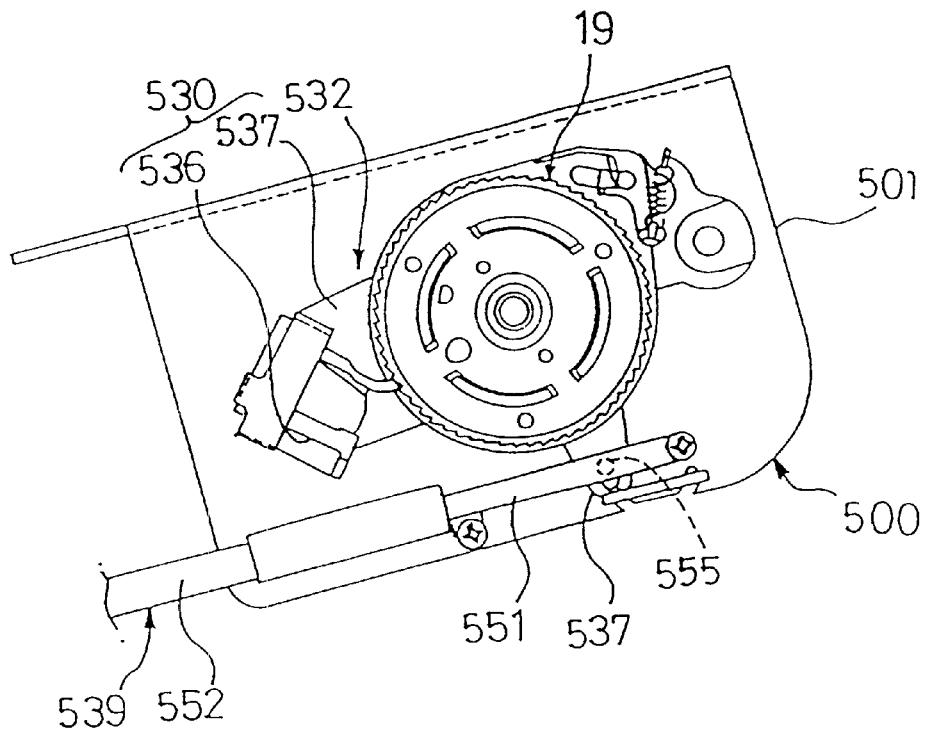
FIG. 35 is side view of a seat belt retractor showing the state of the vehicle body acceleration sensor when the backrest shown in FIG. 34 is reclined.
Figure 36:
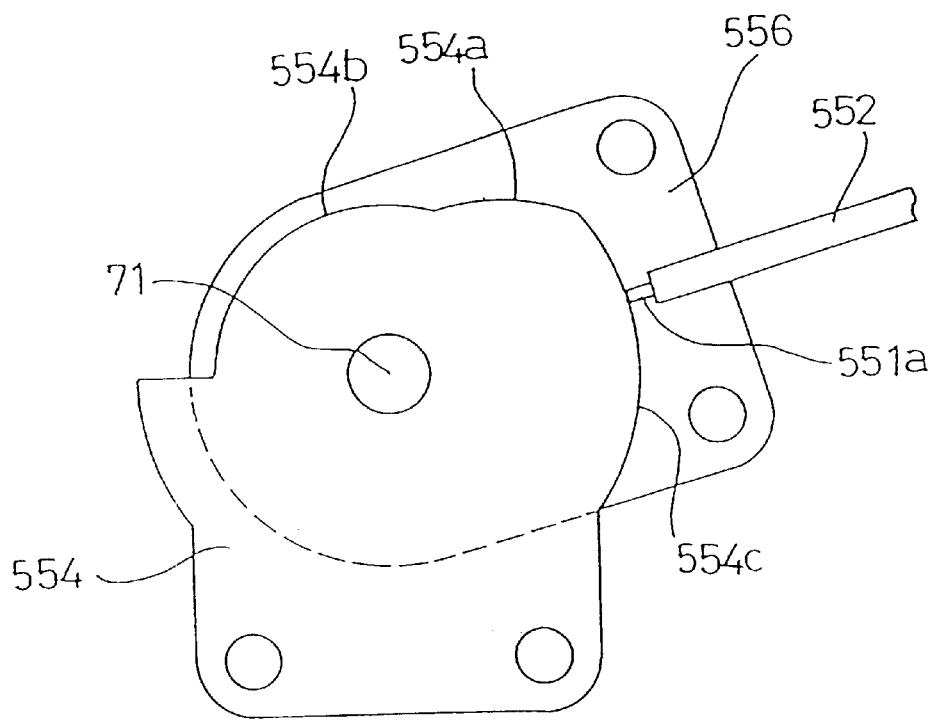
FIG. 36 is an enlarged view of the principle elements showing the state of transmission means of the vehicle body acceleration sensor when the backrest shown in FIG. 34 is reclined.

FIG. 34 shows the reclined state of the backrest 62 when the backrest 62 is reclined beyond the reclined state shown in FIG. 28; FIG. 35 shows the pivoted state of the hanger member 537; and FIG. 36 shows the position of the cam-plate-side end section 551a on the non-synchronous movement cam surface portion 554c. Even when there is a change in the reclined state of the backrest 62, the pivoting state of the hanger member 537 remains unchanged and the cam-plate-side end section 551a remains in contact with the portion of the synchronous movement cam surface portion 554a close to the non-synchronous movement cam surface portion 554c.

The length $J_2$ of the non-synchronous cam surface portion 554b and the length $J_3$ of the non-synchronous cam surface portion 554c are set so as to correspond to the required reclining angle of the backrest 62.

As mentioned above, in the vehicle body acceleration sensor 532 according to the fifth embodiment, so long as the backrest 62 is reclined within the optimum working range of the seat belt (i.e., a range which is slightly narrower than the pivotable range of the sensor case 530), the rod member 551 of the transmission means 539 follows the synchronous movement cam surface portion 554a, thereby pivoting the sensor case 530 in synchronization with the reclining action of the backrest 62. Consequently, the inertial body support surface 536a is retained in an appropriate orientation.

Therefore, even when the reclined position of the backrest 62 is changed, the sensor case 530 is retained in an appropriate position. Hence, the inertial body 533 placed on the sensor case 30 is moved by the inertial force which would arise from physical shock in the event of an emergency. Therefore, the sensitivity of the sensor is prevented from becoming deteriorated, thereby enabling the sensor to reliably and stably sense the acceleration of the vehicle body.

Further, even if the backrest 62 is reclined beyond the optimum working range of the seat belt, the rod member 551 follows the non-synchronous movement cam surface portions 554b and 554c, thereby canceling the movement of the sensor case 530 that is synchronous with the reclining action of the backrest 62. Hence, there does not arise such inconvenience as to limit the reclining angle of the backrest 62 within the pivotable range of the sensor case 530. Further, there is no need to ensure a large space for movement of the sensor case 530 in order to increase the pivotable range thereof in accordance with the reclining angle of the backrest, as would have been practiced conventionally, thereby preventing the retractor 500 from becoming bulky.

While the backrest 62 is held in a backwardly reclined position beyond the optimum working range of the seat belt, the sensor case 530 is brought into a canceled state, in which the sensor case 530 does not pivot in synchronization with the reclining action of the backrest 62. Therefore, the seat belt retractor 500 causes the pole 11 to engage the latch plate 4a, thereby preventing rotation of the take-up shaft 4 in the direction in which the webbing 70 is withdrawn. Therefore, when the backrest 62 is held in a backwardly reclined state beyond the optimum working range of the seat belt, there is prevented withdrawal of the seat belt, which is likely to result in a so-called submarine phenomenon in which the body of the occupant squeezes through the space below the webbing in the event of collision and bursts out in a forward direction.

The transmission means 539 that retains the inertial body support surface 536a in an appropriate orientation in synchronization with the reclining action of the backrest 62 is made up of a simple mechanism such as that formed from the rod member 551 of simple shape, and the cam plate 54 which can be inexpensively and simply mass-produced by press working of a plate material and does not require an expensive component, such as a motor. Accordingly, manufacturing costs can be prevented from increasing.

By provision of cam plates having different cam profiles, there may be produced a vehicle body acceleration sensor of superior versatility which can be used with a plurality of types of reclining seats and seat belt retractors through selection of an appropriate one of the cam plates.

In the fifth embodiment, the cam-plate-side end section 551a of the rod member 551 that serves as a transmission member is fixed in the backrest 62 by means of the support plate 556 mounted on the backrest 62. Alternatively, there my be used a flexible transmission member such as a wire. In this case, a follower joined to the cam-plate-side end section of the wire may be fixed on the seat portion 63 so as to be able to move back and forth toward the cam surface of the cam plate. Since the wire is bent every time the backrest 62 is reclined, the wire must have sufficient durability.

In the fifth embodiment, the cam-plate-side end section 551a of the rod member 551 is fixedly positioned so as to protrude toward the seat reclining pivot 71 of the backrest 62. If there is made a contrivance to the cam profile of the cam surface formed on the cam plate 554, the direction in which the cam-plate-side end section 551a protrudes may be changed.

So long as the cam-plate-side end section 551a of the rod member 551 is fixedly positioned in such a manner as previously described with reference to the fifth embodiment, the transmission means 539 that pivots the sensor case 530 about its pivot axis T according to the reclining angle of the backrest 62 may render the cam profile of the cam plate 554 comparatively simple and facilitate positional adjustment of the cam plate 554 and the rod member 551.

Figure 37:
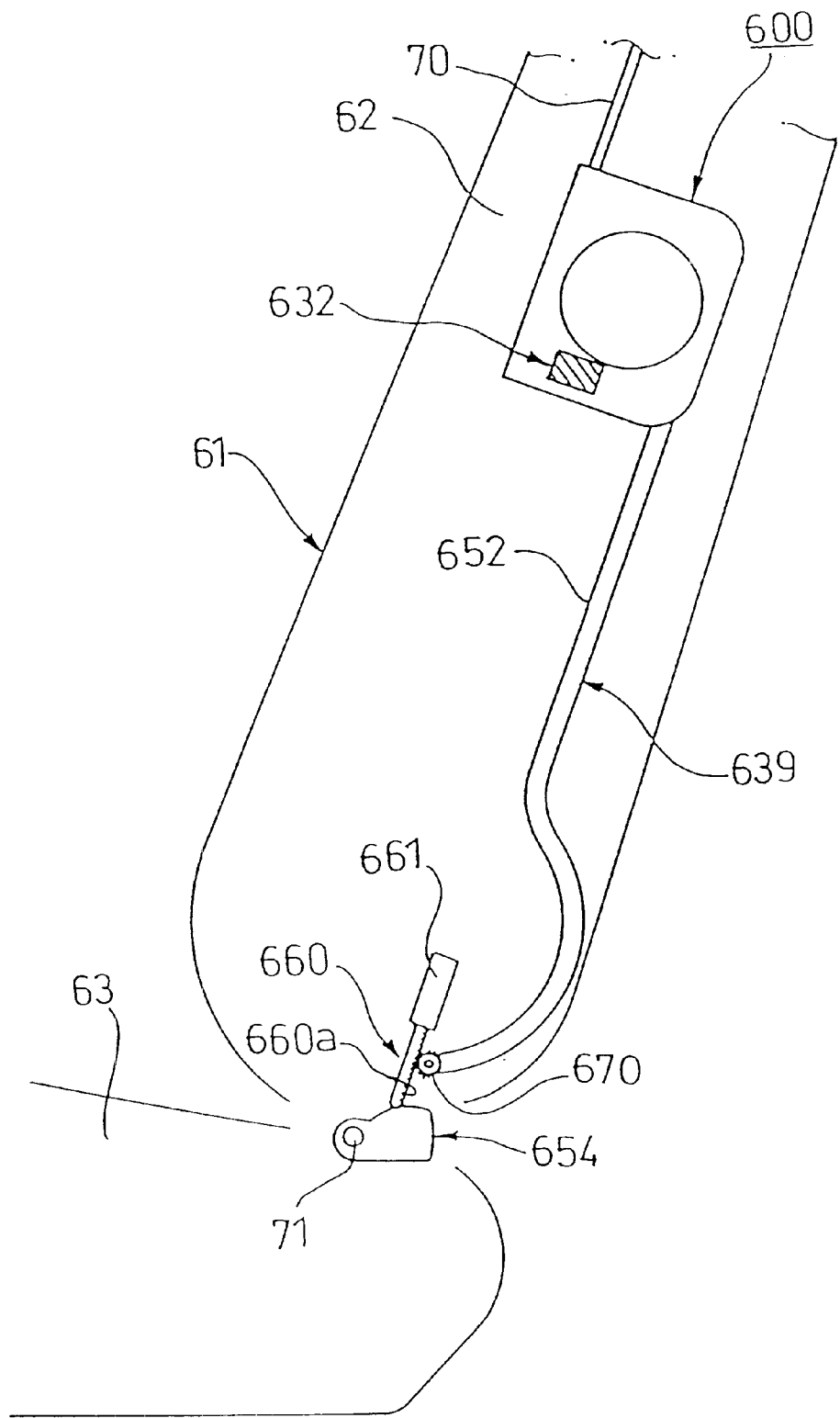
FIG. 37 is a schematic side view showing a reclining seat, wherein a seat belt retractor having a vehicle body acceleration sensor for use with a seat belt according to a sixth embodiment is incorporated in a backrest.

FIG. 37 is a schematic side view showing a reclining seat, in which a seat belt retractor 600 equipped with a vehicle body acceleration sensor 632 according to a sixth embodiment of the present invention is incorporated into the backrest. Those components which are the same as those used in the seat belt retractor 500 having the vehicle body acceleration sensor 532 according to the fifth embodiment are assigned the same reference numerals, and repetition of their explanations is omitted.

Figure 38:
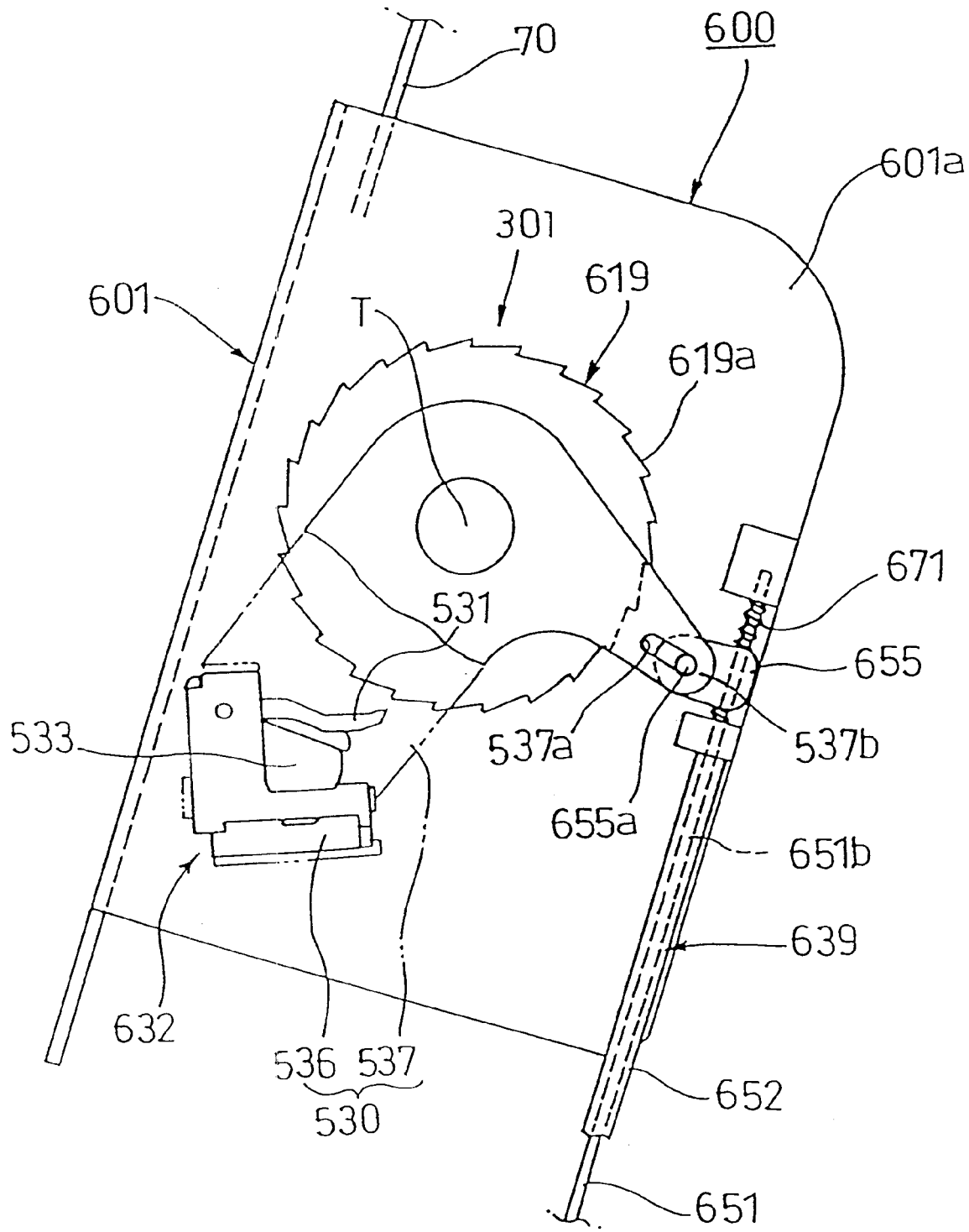
FIG. 38 is a side view showing the seat belt retractor shown in FIG. 37.

Although not shown in detail, the seat belt retractor 600 comprises a substantially cylindrical take-up shaft around which the webbing 70 is wound and which is rotatably supported by a retractor base 601; and an emergency lock mechanism 301 which, in the event of an emergency, prevents rotation of the take-up shaft in the direction in which the webbing is drawn-out. More specifically, as shown in FIG. 38, the emergency lock mechanism 301 is slightly different in structure from the emergency lock mechanism 300. A ratchet wheel 619—which serves as lock activation means—rotates so as to lag behind the take-up shaft, thereby causing a pole (not shown) which is supported as lock means at one end of the take-up shaft to engage a section-to-be-engaged of the retractor base 601. Accordingly, rotation of the take-up shaft in the direction in which the webbing is drawn-out is prevented.

The vehicle body acceleration sensor 632 according to the sixth embodiment is provided below the ratchet wheel 619 and comprises the sensor arm 531, the sensor case 530, the inertial body 533, and transmission means 639.

The transmission means 639 comprises a cam plate 654 which is fixed to the seat portion 63 and has a cam surface extending in the peripheral direction from the seat reclining pivot 71; a follower 660 which is fixed in the area of the backrest 62 in the vicinity of the cam plate 654 so as to be able to move back and forth toward the cam surface of the cam plate 654 and which has a rack 660a formed thereon and extending in the direction in which the follower 660 moves back and forth; a pinion gear 670 which is provided so as to be able to mesh with the rack 660a of the follower 660 and to rotate; a wire 651 which has a cam-plate-side end section 651a joined to the pinion gear 670 and a retractor-side end section 651b joined to the sensor case 530 through a joint member 655 and which transmits the rotation of the pinion gear 670 to the sensor case 530; and a guide tube 652 housing the wire 651.

The joint member 655 is connected to a feed screw 671 joined to the retractor-side end section 651b of the wire 651 through screw engagement and moves along the feed screw 671 in accordance with the amount of torsional rotation of the wire 651. Further, the joint member 655 is joined to the hanger member 537 by way of a lock pin 655a which engages the elongated hole 537a of the joint section 537b.

Figure 39:
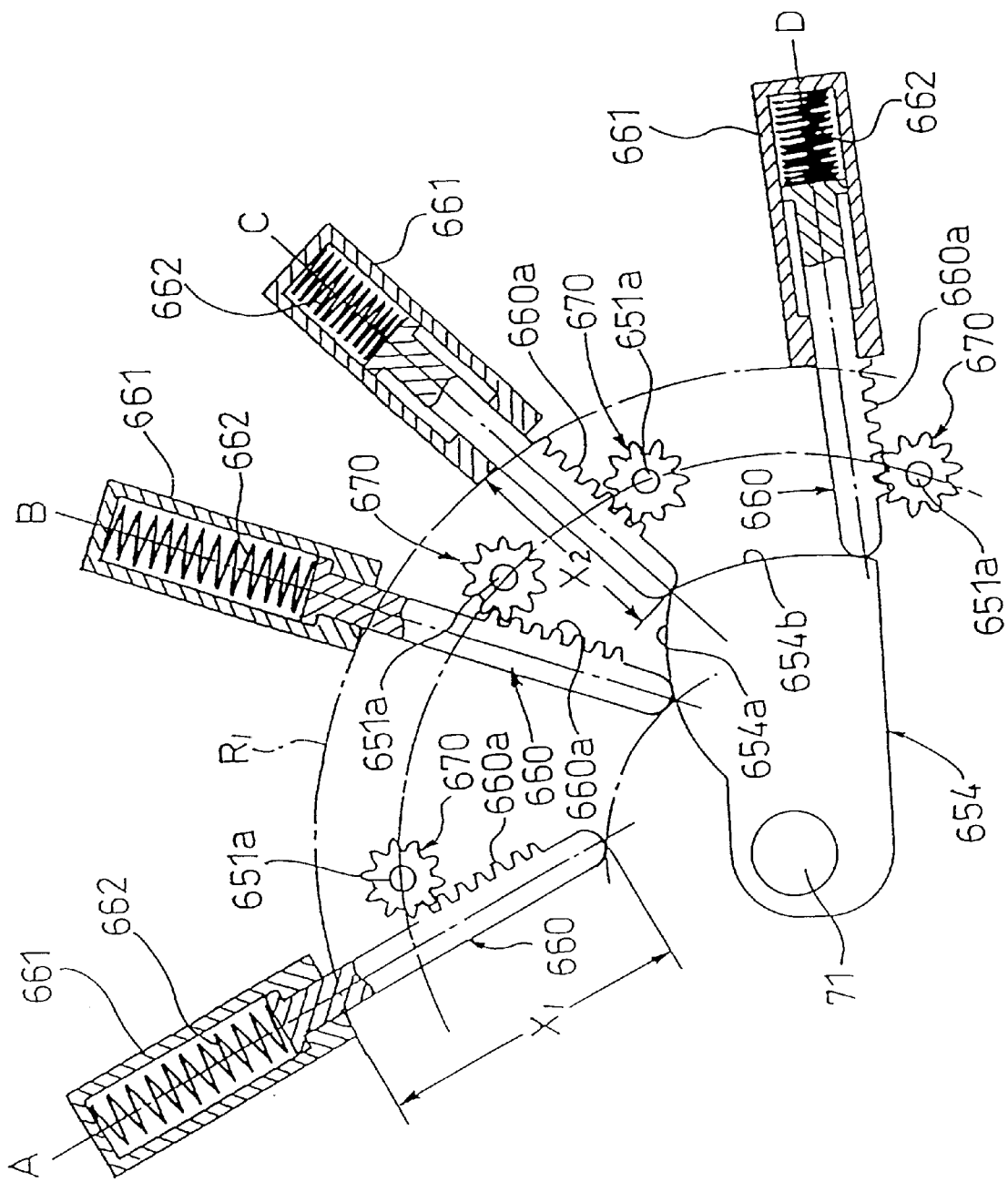
FIG. 39 is an enlarged view of the principle elements showing the transmission means shown in FIG. 37.

The follower 660 is fitted, in a slidable manner, into a cylindrical member 661 fixed on the backrest 62 and is urged so as to remain in contact with the cam surface of the cam plate 654 by a restoration force of a compressed coil spring 662 provided within the cylindrical member 661. The cylindrical member 661 is mounted on the backrest 62 at a position a given distance away from the seat reclining pivot 71. As shown in FIG. 39, when the backrest 62 is reclined, the cylindrical member 661 travels over a circular arc $R_1$ spaced a given radial distance away from the seat reclining pivot 71, together with the backrest 62. In FIG. 39, a position A of the cylindrical member 661 corresponds to the backrest 62 when it is forwardly reclined as shown in FIG. 31. Similarly, a position B of the cylindrical member 661 corresponds to the backrest 62 when it is reclined to the start position of the optimum working range of the seat belt, as shown in FIG. 24. Similarly, a position C of the cylindrical member 661 corresponds to the backrest 62 when it is reclined to the end position of the optimum working range of the seat belt, as shown in FIG. 28. Similarly, a position D of the cylindrical member 661 corresponds to the backrest 62 when it is forwardly reclined as shown in FIG. 34.

The follower 660 is urged by means of the compressed coil spring 662 so as to protrude from an open end of the cylindrical member 661 by a given length $X_1$ toward the seat reclining pivot 71.

The cam plate 654 comprises an angle adjustment cam surface 654a which imparts displacement to the follower 660 when the backrest 62 is reclined within the optimum working range of the seat belt; and a limit cam surface 654b which hinders displacement of the follower 660 when the backrest 62 is reclined backward beyond the optimum working range of the seat belt.

When the backrest 62 is reclined within the optimum working range of the seat belt from its start to end positions, the leading edge of the follower 660 comes into contact with the angle adjustment cam surface 654a. The angle adjustment cam surface 654a is formed into such a profile as to displace the follower 660 in its axial direction according to the reclining angle of the backrest 62. When the angle adjustment cam surface 654a imparts displacement to the follower 660, the pinion gear 670 meshing with the rack 660a of the follower 660 is rotated. The wire 651 whose cam-plate-side-end section 651a is joined to the pinion gear 670 is torsionally actuated, thereby displacing the joint member 655 in a longitudinal direction by an amount corresponding to the amount of torsional movement of the wire 651. As a result, the sensor case 530 is pivoted.

Accordingly, the vehicle body acceleration sensor 632 according to the sixth embodiment yields the same operations and working effects as those yielded by the vehicle body acceleration sensor 532 according to the fifth embodiment. The vehicle body acceleration sensor can sense the acceleration of the vehicle body stably without fail. There can be provided an inexpensive vehicle body acceleration sensor for use with a seat belt which does not raise such inconvenience as to limit the reclining angle of the backrest 62 within the pivotable range of the sensor case 530.

Figure 40:
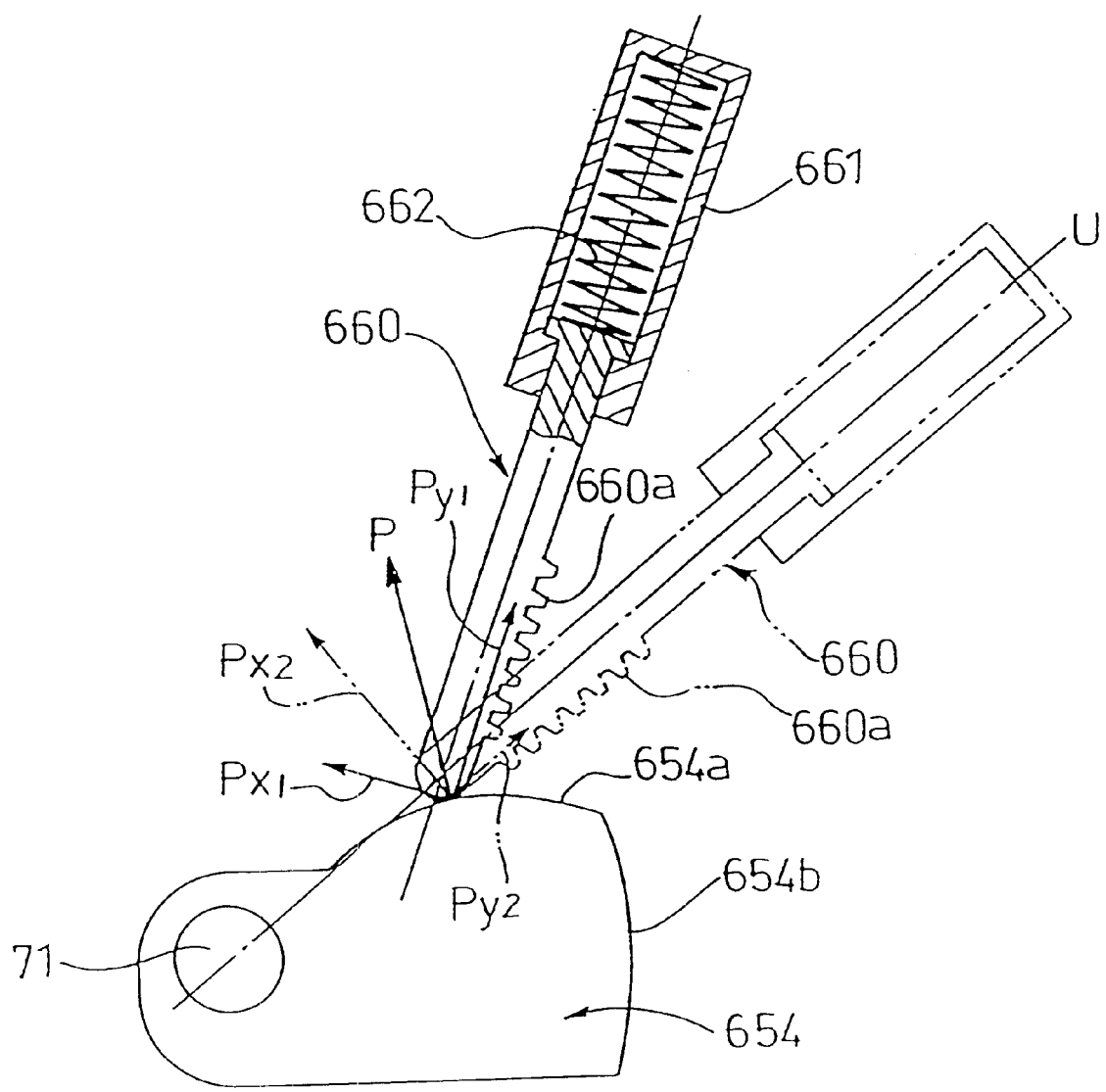
FIG. 40 is an enlarged view of the principle elements showing the follower shown in FIG. 39.

As shown in FIG. 40, the follower 660 according to the sixth embodiment is fixedly positioned so as not to extend toward the seat reclining pivot 71 of the backrest 62 (that is, as indicated by an imaginary line in the drawing, the center axis of the cylindrical member 661 is not disposed on a line U which passes through the seat reclining pivot 71 of the backrest 62), as well as to raise in an upright direction.

More specifically, a cam contact portion of the spherically-or-cylindrically formed follower 660 which comes into contact with the cam receives a force P from the cam surface. This force P corresponds to a force in the direction normal to the cam surface and can be divided into a component force $P_{Y1}$ acting in the direction in which the follower 660 moves and a component force $P_{Y2}$ acting in a direction perpendicular to the direction of movement of the follower 660. As designated by the phantom line shown in FIG. 40, if the follower 660 protrudes toward the seat reclining pivot 71, the force P exerted on the leading edge of the follower 660 can be divided into a component force $P_{Y2}$ acting in the direction in which the follower 660 moves and a component force $P_{X2}$ acting in a direction perpendicular to the direction of movement of the follower 660.

In a case where the follower 660 is arranged so as to protrude toward the seat reclining pivot 71, the component force $P_{X2}$ acting in the direction perpendicular to the direction of movement of the follower 660 becomes great, and may twist or strain the follower 660, which is fitted into the cylindrical member 661 in a slidable manner.

Accordingly, the direction in which the follower 660 advances or recedes is preferably set such that the cam contact portion of the follower 660 which advances or recedes in the direction toward the cam surface imparts an optimum pressing force to the entire area of the cam surface with which the cam contact section makes slidable contact (i.e., the angle adjustment cam surface 654a and the limit cam surface 654b).

Figure 41:
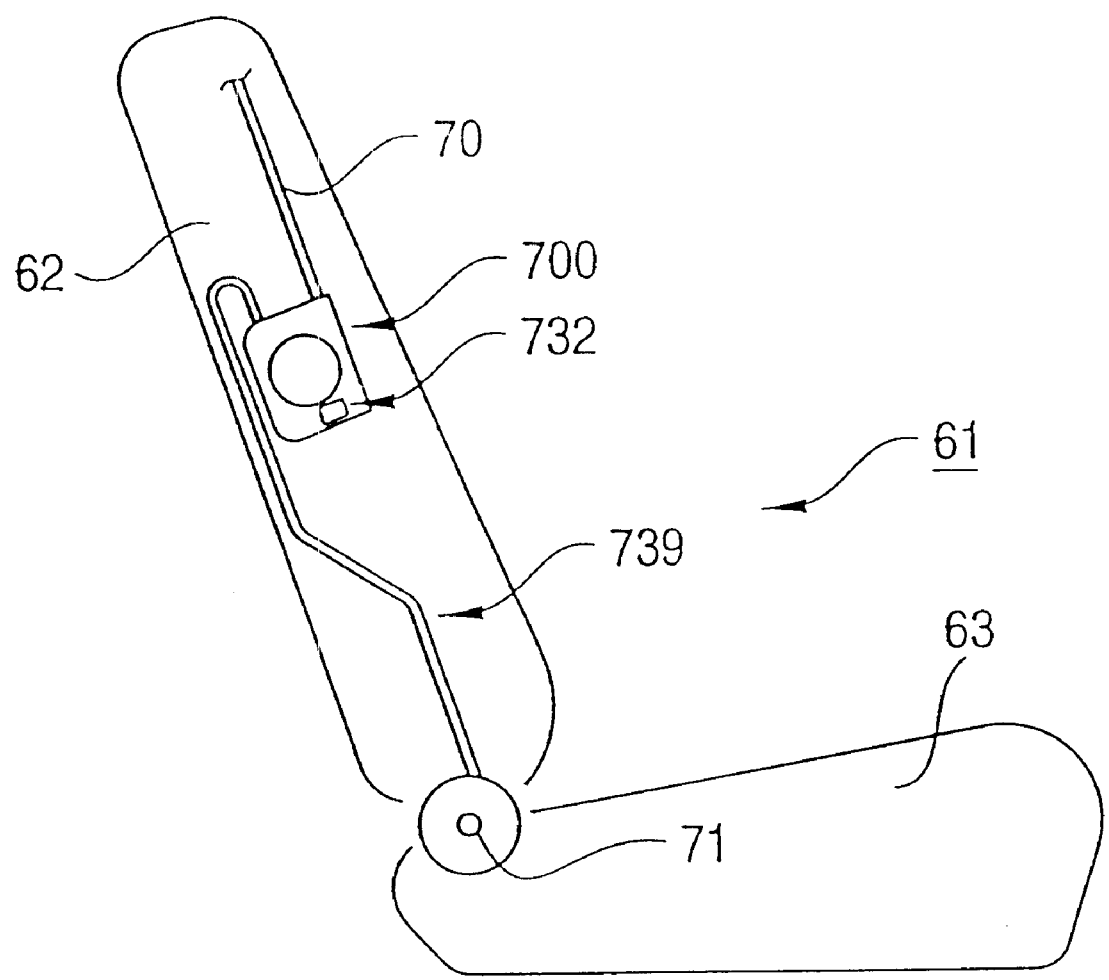
FIG. 41 is a schematic side view showing a reclining seat, wherein a seat belt retractor having a vehicle body acceleration sensor for use with a seat belt according to a seventh embodiment is incorporated in a backrest.

FIG. 41 is a schematic side view showing a reclining seat, in which a seat belt retractor 700 equipped with a vehicle body acceleration sensor 732 according to a seventh embodiment of the present invention is incorporated into the backrest.

Figure 42:
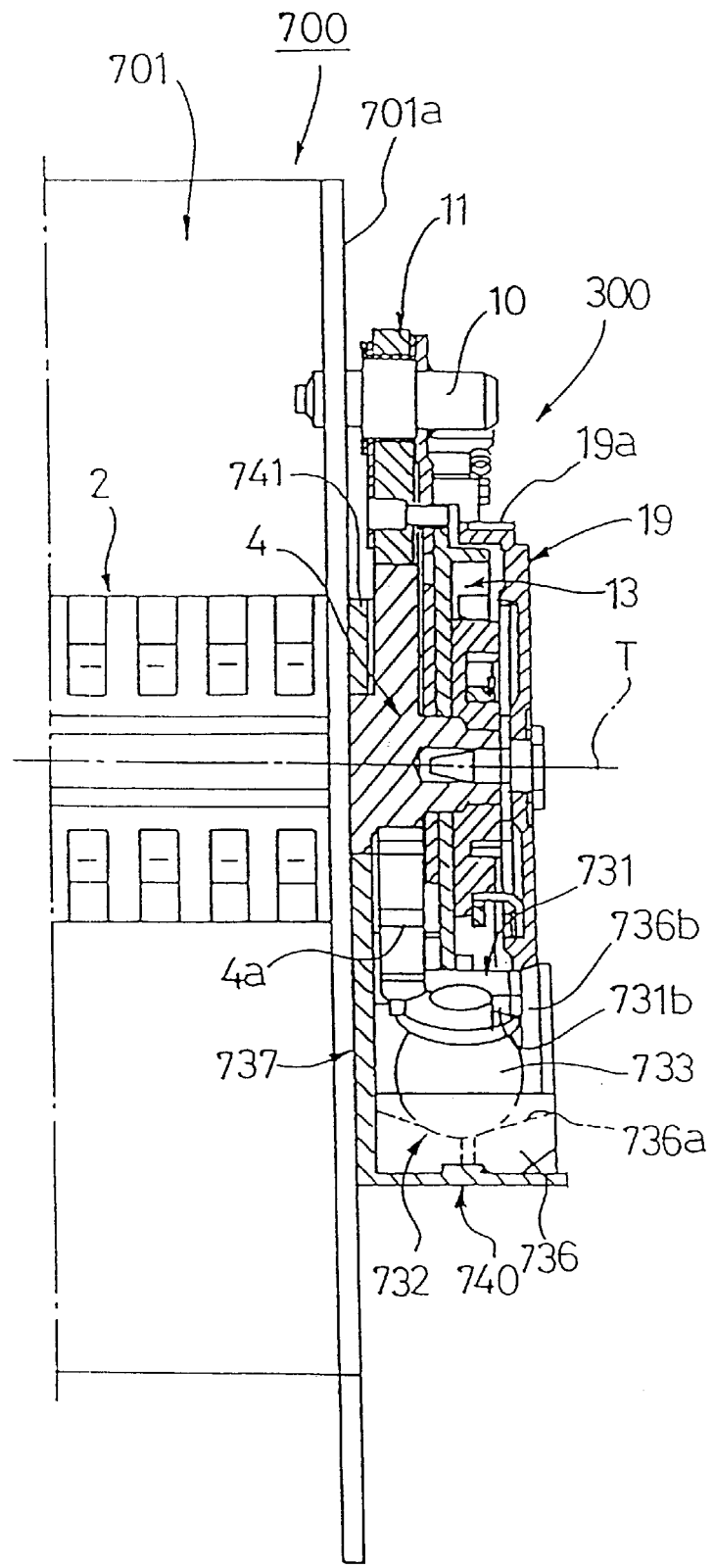
FIG. 42 is a fragmentary sectional view showing the seat belt retractor shown in FIG. 41.
Figure 43:
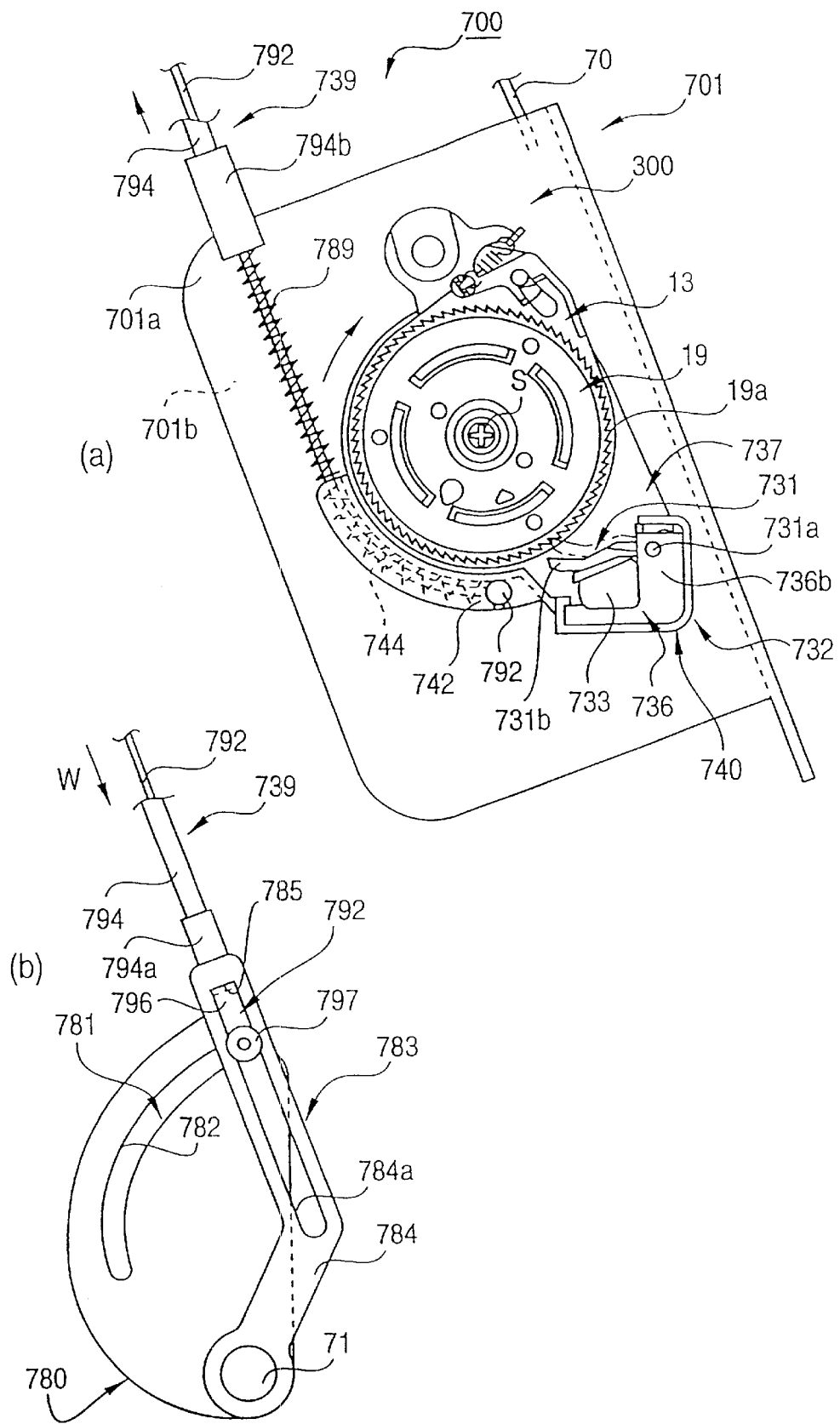
FIG. 43A is a side view showing the seat belt retractor shown in FIG. 41.
FIG. 43B is an enlarged view of the principle elements showing the transmission means of the vehicle body acceleration sensor shown in FIG. 41.

As shown in FIGS. 42 and 43A, the seat belt retractor 700 comprises the substantially cylindrical bobbin 2 around which the webbing 70 is wound; the take-up shaft 4 which is inserted into the bobbin 2, is rotatively supported by means of a retractor base 701, and has at one end thereof (i.e., on the right-hand side of the take-up shaft 4 shown in FIG. 42) the latch plate 4a formed from a ratchet wheel; and the emergency lock mechanism 300, all of which are identical to those described with the preceding embodiments. The webbing 70 withdrawn from the retractor 700 by way of a slot (not shown) formed in the backrest 62 restraints the occupant.

The retractor base 701 mounted on a frame member (not shown) of the backrest 62 is formed from a metal plate through press molding such that the majority of the retractor base 1 assumes a substantially angular C-shaped cross section. The take-up shaft 4 fitted into the bobbin 2 is rotatable and sandwiched between both sides plates 701a and 701b of the retractor base 701. The end of the take-up shaft 4 that passes through the side plate 701b of the retractor base 701 is provided with a known take-up spring device (not shown). At all times, the take-up spring device urges the bobbin 2 in the direction in which the webbing 70 is taken up, by way of the take-up shaft 4.

In the seat belt retractor 700, the vehicle body acceleration sensor 732 according to the seventh embodiment is provided below the ratchet wheel 19 that constitutes the emergency lock mechanism 300.

As shown in FIGS. 42, 43A, and 43B, the vehicle body acceleration sensor 732 comprises a sensor arm 731, a sensor case 736, an inertial body 733, a case support member 737, and transmission means 739.

The sensor case 736 comprises an inertial body support surface 736a on which the inertial body 733 is placed, and an arm support member 736b which supports the sensor arm 731 in a rotatable manner. The inertial body support surface 736a of the case body 736 is formed into the shape of a fan having its center extending below the main portion of the fan. As shown in FIGS. 43A and 43B, the case support member 737 comprises a case support section 740 into which the sensor case 736 is removably fitted; a pivot support section 741 which extends upward from one side surface of the case support section 740 and is supported by the retractor base 701 in a rotatable manner; and a joint section 742 joined to transmission means 739 to be described later. Further, a take-up surface 744 continues from the joint section 742 and is positioned concentrically and in line with the take-up shaft 4.

The pivot support section 741 of the case support member 737 is supported so as to be able to pivot about the pivot axis T of the take-up shaft 4. When the backrest 62 is reclined, the transmission means 739 joined to the joint section 742 pivots the case support member 737 in synchronization with the reclining action of the backrest 62, thereby adjusting the sensor case 736 to an appropriate orientation by way of the case support member 737.

As shown in FIGS. 42 and 43A, a pin section 731a provided at the base end of the sensor arm 731 is rotatively supported by the sensor case 736. While the sensor case 736 is attached to the retractor 701, the sensor arm 731 can be pivoted about the pin section 731a thereof and can switch between a first position—where a leading edge 731b engages the teeth 19a of the ratchet wheel 19 to thereby prevent the take-up shaft 4 from rotating in the direction in which the webbing is drawn-out—and a second position—where the leading edge 731b is disengaged from the teeth 19a to thereby prevent actuation of the lock means.

When the leading edge 731b of the sensor arm 731 engages the teeth 19a of the ratchet wheel 19, the ratchet wheel 19 rotates so as to lag behind the take-up shaft 4. As a result, the pole 11 engages the latch plate 4a by way of the latch cup 13, thereby preventing rotation of the take-up shaft 4 in the direction in which the webbing is drawn-out.

The inertial body 733 is placed on the inertial body support surface 736a. Upon receipt of a velocity change greater than a predetermined magnitude, the inertial body 733 moves in relation to the inertial body support surface 736a, thereby moving to the first position the sensor arm 731 that remains in contact with the outside of the inertial body 733.

The transmission means 739 pivots the sensor case 736 about its pivot axis T according to the reclining angle of the backrest 62 in such a way as to retain the inertial body support surface 736a in an appropriate orientation regardless of the reclining angle of the backrest 62. The sensor case 736 joined to the transmission means 739 by way of the case support member 737 is prevented from pivoting about the pivot axis T by the inertial force which would be exerted in the event of collision.

As shown in FIGS. 43A and 43B, the transmission means 739 comprises a cam plate 780 which is fixed on the seat portion 63 and has an inner peripheral cam surface 782 extending in a circumferential direction about the seat reclining pivot 71; a follower 790 (not labeled in FIGS. 43A and 43B) provided so as to be able to advance or recede along the inner peripheral cam surface 782 of the cam plate 780; an inner cable 792 which has a cam-plate-side end section connected to the follower 790 and a retractor-side end section joined to the sensor case 736 by way of the case support member 737 and which transmits the forward and backward movement of the follower 790 to the sensor case 736; an outer tube 794 housing the inner cable 792 in a slidable manner; and a spring 789 which is formed from a compressed coil spring serving as an urging member and is capable of urging the follower 790 toward the inner peripheral cam surface 782 by way of the inner cable 792. Although in the seventh embodiment the flexible inner cable 792 is used as transmission means, there may also be used a rod member capable of transmitting the advance or receding movement of the follower to the sensor case.

As shown in FIG. 43A, a retractor-side end section 794b of the outer tube 794 in which the inner cable 792 is inserted is mounted on a side plate 701a of the retractor base 701. As shown in FIG. 43B, a cam-plate-side end section 794a of the outer tube 794 is fixed on an arm 783—which is pivotable about the seat reclining pivot 71 in association with the backrest 62—such that the follower 790, which will be described later, is able to move back and forth along the inner peripheral cam surface 782 of the cam plate 780.

Figure 44:
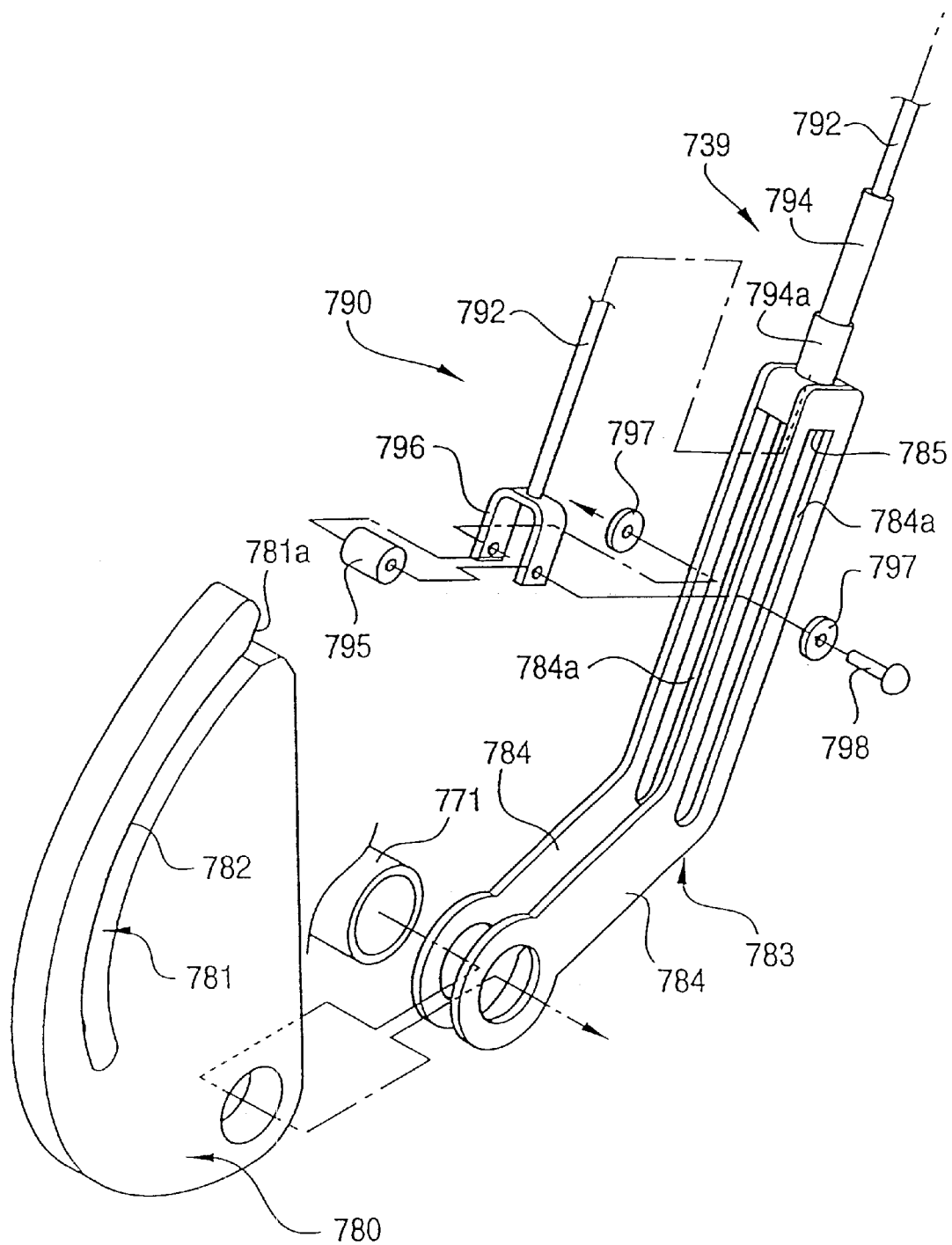
FIG. 44 is an exploded perspective view showing the transmission means of the vehicle body acceleration sensor shown in FIG. 41.
Figure 45:
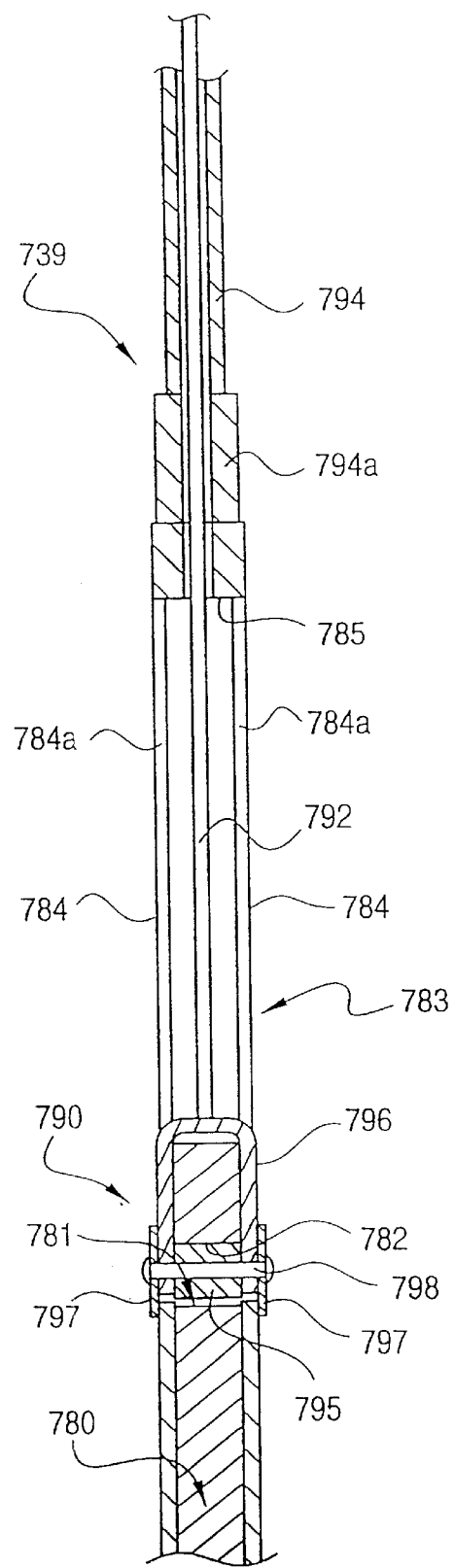
FIG. 45 is a fragmentary sectional view showing the transmission means shown in FIG. 44.

As shown in FIGS. 44 and 45, the arm 783 has a pair of arm plates 784, 784 for holding the cam plate 780 therebetween. A guide groove 784a is formed in each of the arm plates 784, 784 for guiding a roller holder 796 of the follower 790, which will be described later, in a slidable manner.

One end of the retractor-side end section of the inner cable 792 is connected to the joint section 742 of the case support member 737 by way of the terminal member 792 of the inner cable 792 and is moved along the take-up surface 744 concentric with the take-up shaft 4. Further, a spring 789 to be interposed between the retractor-side end section 794b and the joint section 742 is wrapped around the retractor-side end section of the inner cable 792.

As shown in FIGS. 44 and 45, the follower 790 joined to the cam-plate-side end section of the inner cable 792 comprises the roller holder 796 that is joined to the cam-plate-side end section of the inner cable 792 and is slidably guided along the guide grooves 784a, 784a; and a roller 795 which is rotatably supported on the roller holder 796 by the support pin 798 and is rotatable over the inner peripheral cam surface 782 of the cam plate 780. The roller holder 796 attached to the arm 783 is prevented from becoming dislodged from the guide grooves 784a by means of washers 797 having a diameter greater than the width of the guide groove 784a.

The follower 790 is constantly urged toward the retractor by the restoration force of the spring 789 by way of the inner cable 792, thereby enabling urging of the roller 795 toward the inner peripheral cam surface 782.

In the seventh embodiment, the outer surface of the slit 781 extending from the center of the seat reclining pivot 71 from the forward direction of the seat in the circumferential direction also serves as the inner peripheral cam surface 782 which causes the follower 790 to move back and forth along the guide grooves 784a of the arms 783 when the backrest 62 is reclined. The roller 795 of the follower 790 engages with only the outer surface of the slit 781, i.e., the inner peripheral cam surface 782, and hence the inner surface of the slit 781 is not required to be formed in parallel with the outer surface of the same. For this reason, the inner peripheral cam surface formed in the cam plate can also be realized by means of an opening having a desired inner peripheral cam surface.

The inner peripheral cam surface 782 of the cam plate 780 has only a synchronous movement area, wherein the sensor case 736 is pivoted about the pivot axis T according to the reclining angle of the back rest 62 in synchronization with the reclining action thereof, within only the range of the backrest in which the occupant can use the seat.

When the backrest 62 is reclined from the most forwardly reclined position to the most backwardly reclined position (i.e., a full-flat state) within the range in which the occupant can use the seat, the inner peripheral cam surface 782 controls the forward and backward movement of the follower 790 by way of the inner cable 792 such that the inertial body support surface 736a is held in an appropriate orientation regardless of the reclining angle of the backrest 62.

When the backrest 62 is in the most forwardly reclined position within the range in which the occupant can use the seat (i.e., the position shown in FIG. 41), the follower 790 is situated at an opening end of the slit 781 which serves as the front end of the inner peripheral cam surface 782, as shown in FIG. 43B. In this position, the base end of the roller 796 is in contact with the upper ends 785 of the guide grooves 784a, and the spring 789 is in a compressed state.

When the backrest 62 is reclined backward from this position, the arm 783 pivots about the seat reclining pivot 71 in a counterclockwise direction in FIG. 43B together with the backrest 62 in accordance with the reclining angle of the backrest 62.

The roller holder 796 of the follower 790 is pressed down along the inner peripheral cam surface 782 by way of the roller 795. The inner cable 792 joined to the roller holder 796 that is pressed down along the inner peripheral cam surface 782 when the backrest 62 is reclined backward is withdrawn in the direction of arrow W shown in FIG. 43B against the restoration force of the spring 789. The inner cable 792 whose other end is connected to the joint section 742 of the case support member 737 pivots, about the take-up shaft 4, the case support member 737 attached to the sensor case 736 in a clockwise direction shown in FIG. 43A, thereby retaining the inertial body support surface 736a of the sensor case 736 in an appropriate orientation.

The cam profile of the inner peripheral cam surface 782 is set such that the follower 790 slides over a given distance downwardly according to the reclining angle of the backrest 62 and that the inner cable 792 is withdrawn in the direction of arrow W by an amount corresponding to the reclining angle of the backrest 62. Further, the retractor-side end section of the inner cable 792 that is withdrawn in the direction of arrow W is wrapped around the take-up surface 744 of the case support member 737. Hence, the case support member 737 is pivoted through a predetermined angle corresponding to the distance over which the inner cable 792 is moved. Accordingly, the sensor case 736 attached to the case support member 737 is pivoted through an angle corresponding to the reclining angle of the backrest 62.

For this reason, even if the reclining angle of the backrest 62 is changed, the sensor case 736 is retained in an appropriate orientation, and the inertial body 733 placed on the sensor case 736 is moved only by the inertial force which would arise from physical shock in the event of an emergency. Therefore, the sensitivity of the sensor is prevented from becoming deteriorated, thereby enabling the sensor to reliably and stably sense the acceleration of the vehicle body.

Figure 46:
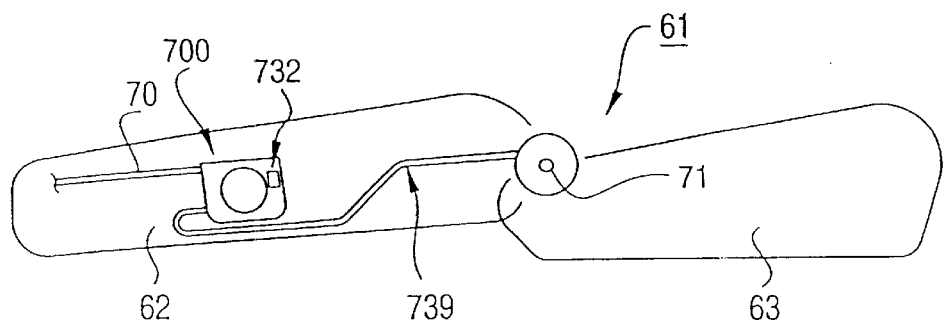
FIG. 46 is a side view showing the state of the reclining seat shown in FIG. 41 when the backrest of the reclining seat is reclined to the most backwardly reclined position.
Figure 47:
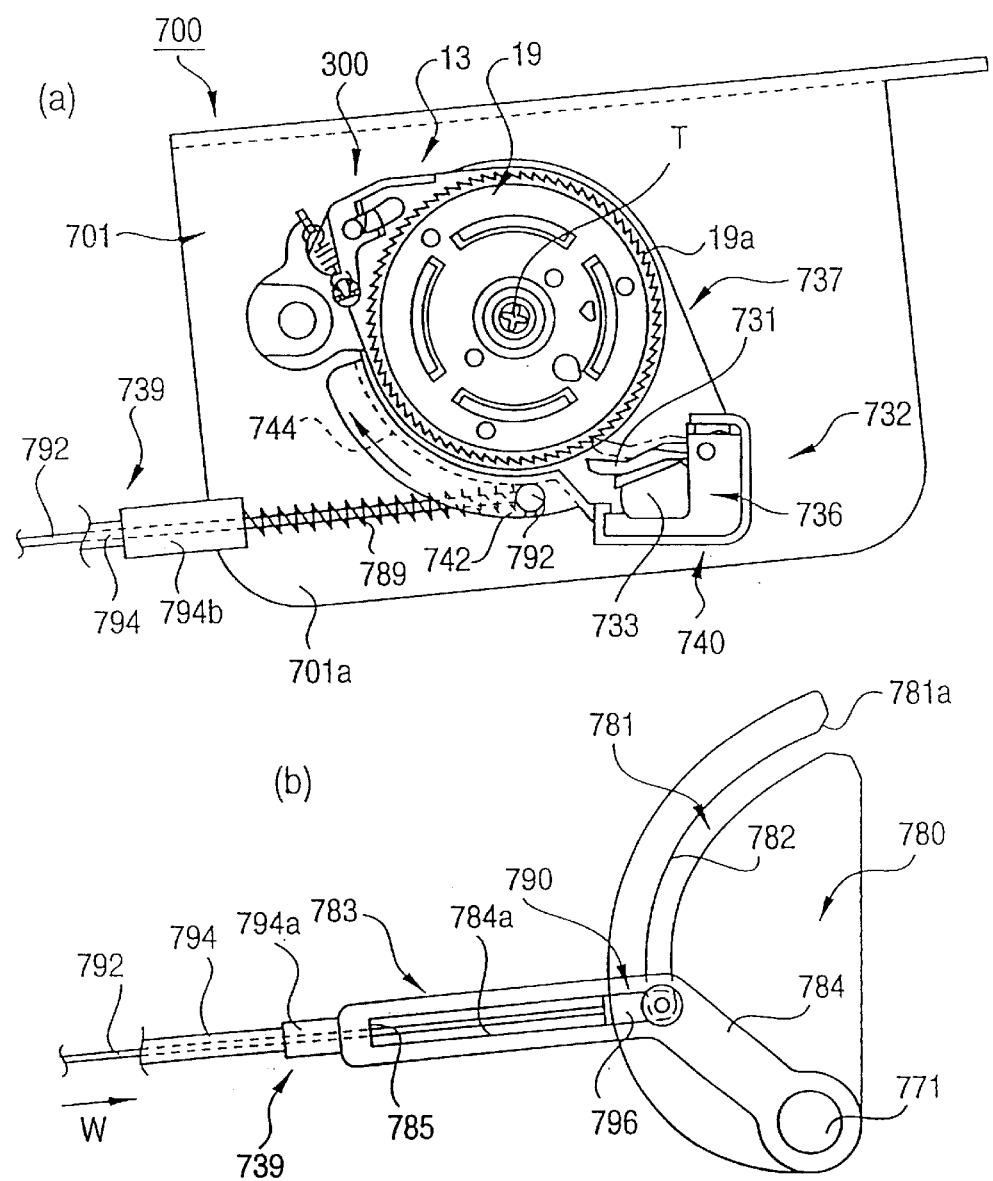
FIG. 47A is a side view illustrating the seat belt retractor of the backrest shown in FIG. 46.
FIG. 47B is an enlarged view of the principle elements showing the transmission means when the backrest is reclined as shown in FIG. 46.

Until, as shown in FIG. 46, the backrest 62 is reclined to the most backwardly reclined position (i.e., a full-flat state), the follower 790 follows the inner peripheral cam surface 782, as shown in FIG. 47B, and is moved in such a direction as to approach the seat reclining pivot 71 along the guide groove 784a of the arm 783. The inner cable 792 is withdrawn in the direction of arrow W by means of the follower 790. The sensor case 736 is pivoted in a clockwise direction about the pivot axis T by an amount corresponding to the distance of movement of the inner case 792, by way of the case support member 737 and against the restoration force of the spring 789, as shown in FIG. 47A.

In contrast, the follower 790 follows the inner peripheral cam surface 782 and is moved in such a direction as to depart from the seat reclining pivot 71 along the guide grooves 784a of the arm 783, and the inner cable 792 on which the restoration force of the spring 789 is exerted is withdrawn in the direction opposite to the direction of arrow W. The sensor case 736 is pivoted in a counterclockwise direction about the pivot axis T by an amount corresponding to the distance of movement of the inner case 792, by way of the case support member 737.

The length and profile of the inner peripheral cam surface 782 are determined so as to correspond to the working range of the retractor 700. The range over which the case support member 737 is pivoted by the inner peripheral cam surface 782 by way of the follower 790 corresponds to the pivotable range of the sensor case 736. Here, the pivotable range of the sensor case 736 is set so as to be slightly wider than the reclining range of the backrest 62 within the optimum working range of the seat belt, so as to prevent damage to the sensor case 736.

Figure 48:
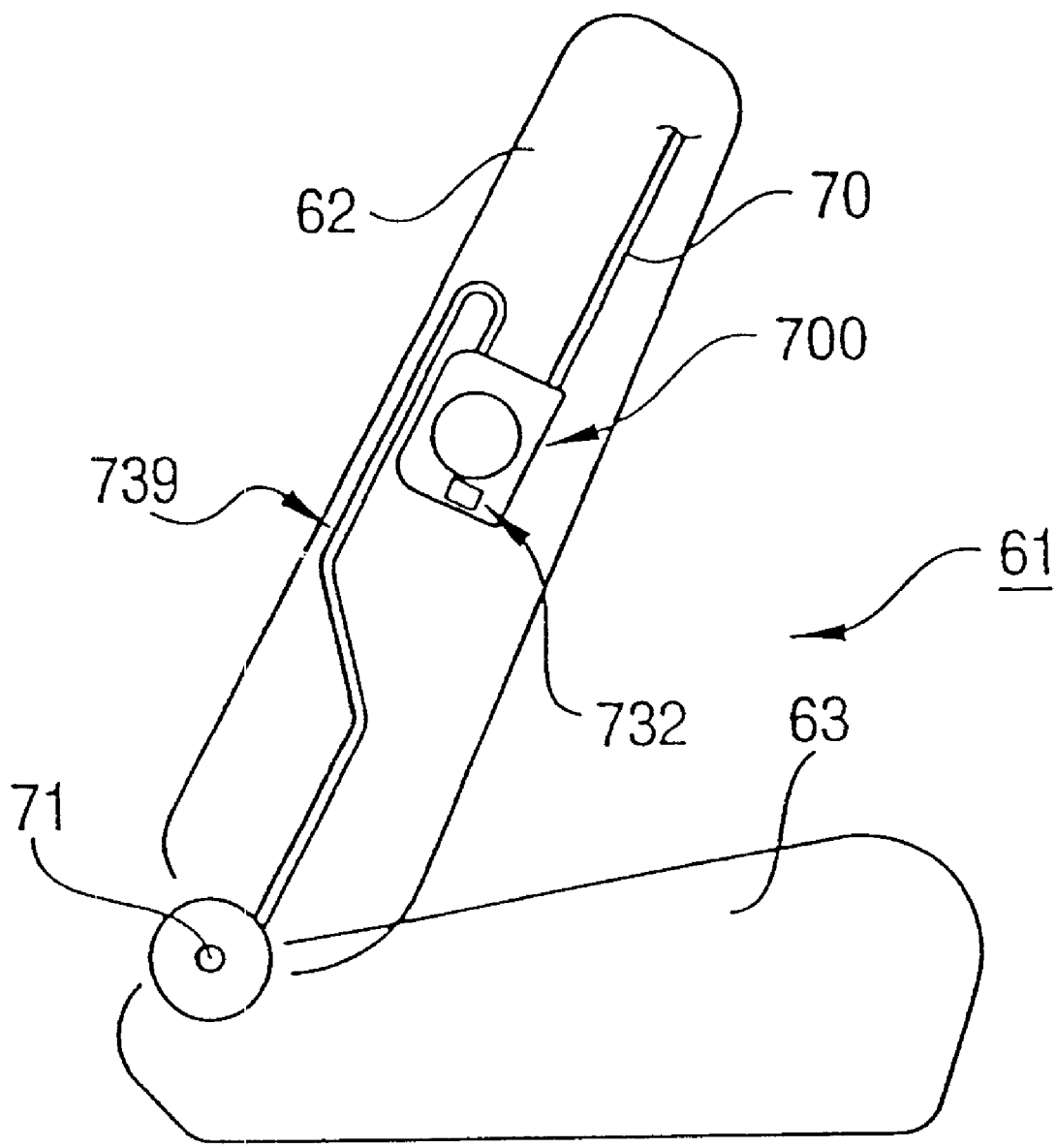
FIG. 48 is a side view of the reclining seat shown in FIG. 41 when the backrest of the reclining seat is reclined forwardly in excess of a range of reclining action of the backrest in which the occupant can use the seat.
Figure 49:
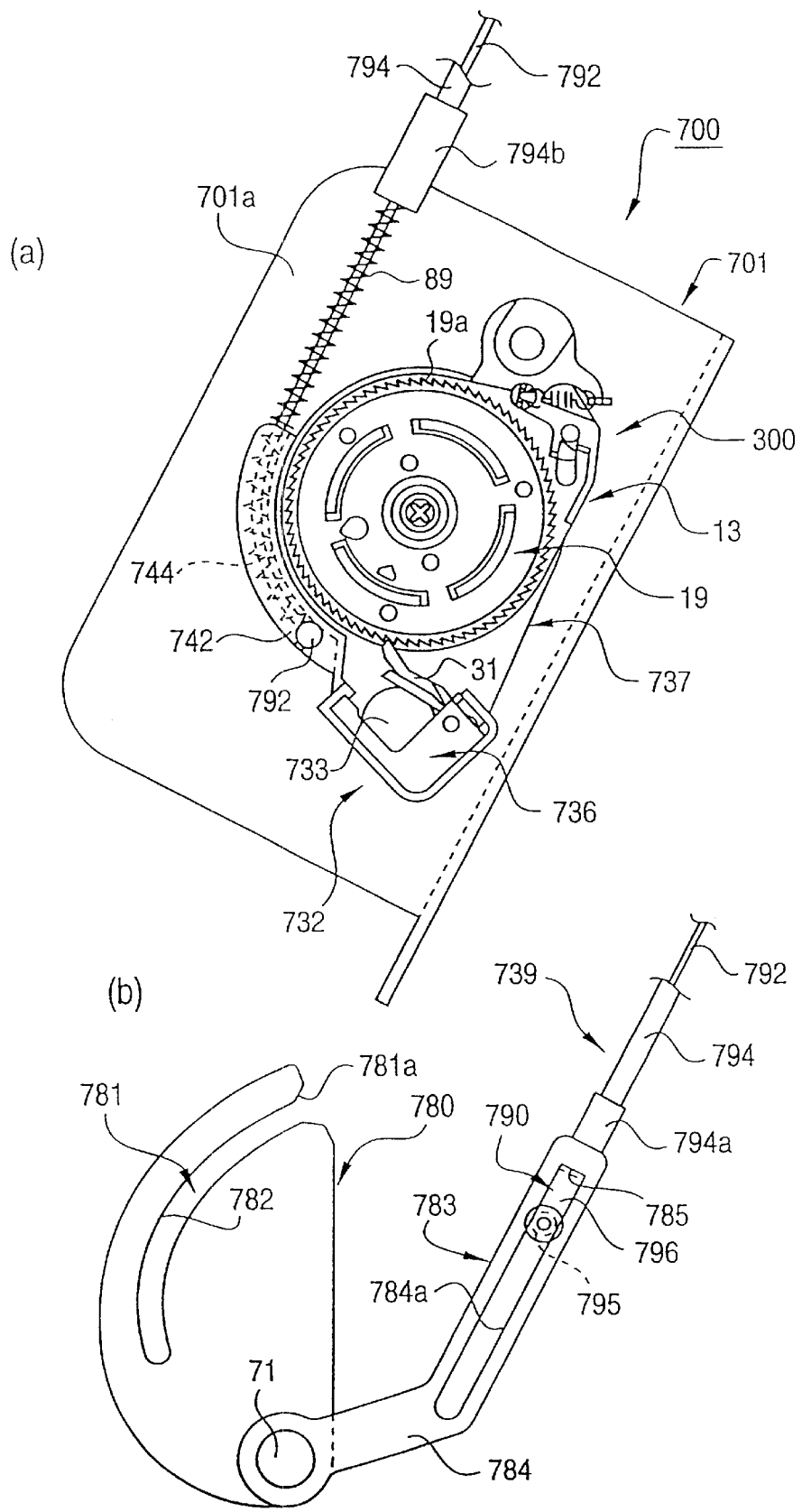
FIG. 49A is a side view showing the seat belt retractor when the backrest is reclined as shown in FIG. 48.
FIG. 49B is an enlarged view of the principle elements showing the transmission means when the backrest is reclined as shown in FIG. 48.

As shown in FIG. 48, the backrest 62 may be reclined beyond the range in which the occupant can use the seat from the position shown in FIG. 41. As a result, as shown in FIG. 49B, the follower 790 is disengaged from the slit 781, and the roller 795 becomes disengaged from the inner peripheral cam surface 782. Since the base end of the roller 796 comes into contact with the upper ends 785 of the guide grooves 784a, and the follower 790 does not travel along the guide grooves 784a of the arms 783. Accordingly, the inner cable 792 remains stationary and does not project or recede. By means of a tapered portion 781a formed in the opening section of the slit 781, the roller 795 of the follower 790 can enter the slit 781 without fail.

Within a range in which the occupant cannot use the seat, the inner cable 792 neither projects nor becomes withdrawn, there is no change in a relative position between the sensor case 736 and the retractor 700, as shown in FIG. 49A. As a result, the sensor case 736 is brought into a synchronous movement cancelation state in which the sensor case 736 is not pivoted in synchronization with the reclining action of the backrest 62.

Therefore, the reclining angle of the backrest 62 is prevented from being limited by the pivotable range of the sensor case 736. Further, the sensor case 736 is prevented from being unnecessarily rotated in synchronization with the reclining action of the backrest 62, thereby preventing the retractor 700 from becoming bulky.

The transmission means 739 that retains the inertial body support surface 736a in an appropriate orientation in synchronization with the reclining action of the backrest 62 is made up of a simple mechanism such as that formed from the follower 790 and the inner cable 792, both of which have simple configurations, and the cam plate 780 which can be inexpensively and simply mass-produced by press working of a plate material, and does not require an expensive component, such as a motor. Accordingly, manufacturing costs can be prevented from increasing.

By provision of cam plates having different cam profiles, there may be produced a vehicle body acceleration sensor of superior versatility which can be used with a plurality of types of reclining seats and seat belt retractors through selection of an appropriate one of the cam plates.

Figure 50:
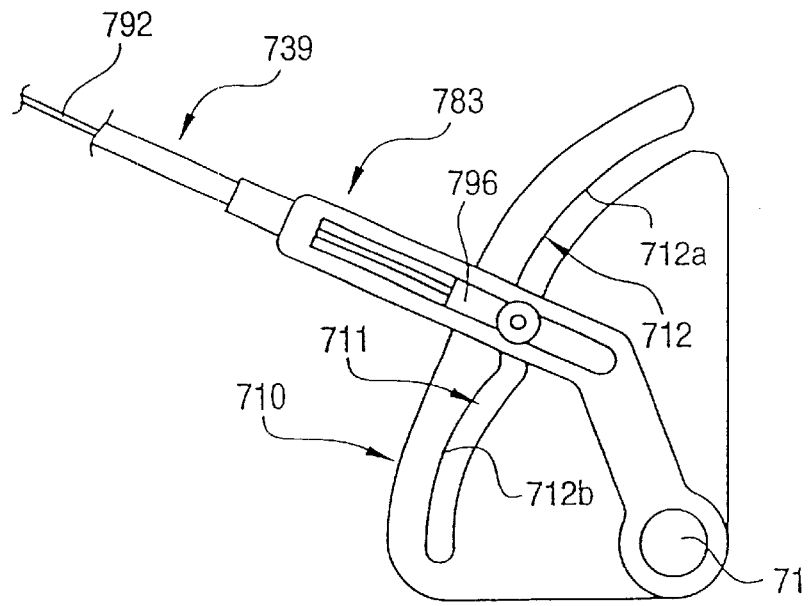
FIG. 50 is an enlarged view of the principle elements showing a modification of the cam plate.
Figure 51:
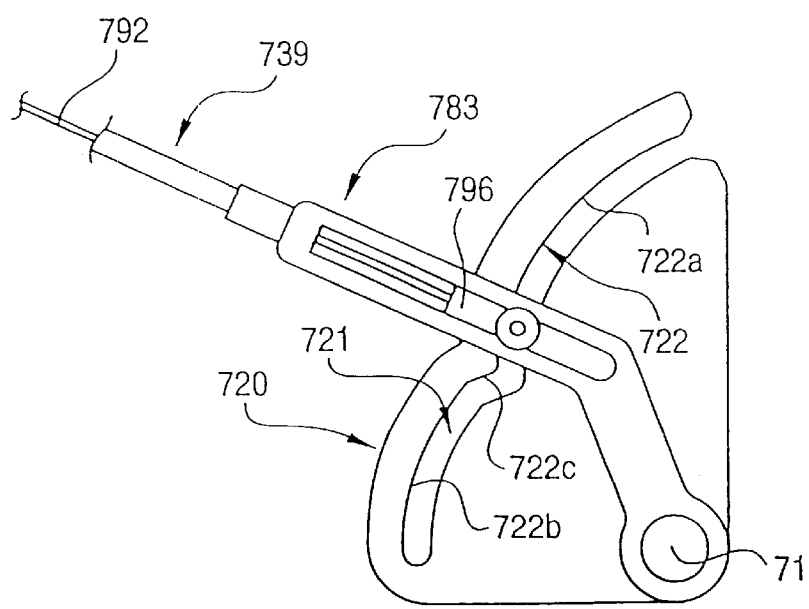
FIG. 51 is an enlarged view of the principle elements showing a modification of the cam plate.

FIGS. 50 and 51 show a modification of the cam plate according to the seventh embodiment.

An inner peripheral cam surface 712 formed along the outer surface of a slit 711 of a cam plate 710 comprises an inner peripheral cam surface 712a for synchronous movement purpose in which the sensor case 736 is pivoted only within the optimum working range of the seat belt in synchronization with the reclining action of the backrest 62, and an inner peripheral cam surface 712b for non-synchronous movement purpose in which the sensor case 736 is not pivoted in synchronization with the reclining action of the backrest 62.

When the backrest 62 is reclined within the range in which the occupant can use the seat as well as within the optimum working range of the retractor 700 in which the occupant can be appropriately restrained by means of the webbing 70, the inner peripheral cam surface 712a controls the forward and backward movement of the follower 790 such that the inertial body support surface 736a of the sensor case 736 is retained in an appropriate orientation (i.e., in an upright direction) regardless of reclining angle of the backrest 62. As in the case with the inner peripheral cam surface 782, the inner peripheral cam surface 712a assumes a curved cam profile which gradually approaches the seat reclining pivot 71 in response to the reclining action of the backrest 62.

In contrast, when the backrest 62 is reclined within the range in which the occupant can use the seat as well as beyond the optimum working range of the retractor 700 in which the occupant cannot be appropriately restrained by means of the webbing 70, the inner peripheral cam surface 712b acts as a synchronous movement cancelation mechanism which controls the forward and backward movement of the follower 790 to thereby prevent the sensor case 736 from pivoting in synchronization with the reclining action of the backrest 62. To this end, the inner peripheral cam surface 712b assumes a circular-arc cam profile centered on the seat reclining pivot 71 and prevents the case support member 737 from pivoting in synchronization with the reclining action of the backrest 62, by maintaining a constant distance between the seat reclining pivot 71 of the backrest 62 and the follower 790.

When the backrest 62 is reclined backward beyond the optimum working range of the seat belt, the sensor case 736 is brought into a canceled state in which the sensor case 736 is not pivoted in synchronization with the reclining action of the backrest 62. As a result, the inertial body support surface 736a is tilted in conjunction with the backrest 62, thereby actuating the lock means of the emergency lock mechanism 300. The emergency lock mechanism 300 causes the pole 11 to engage with the latch plate 4a, thereby preventing rotation, in the direction in which the webbing is drawn-out, of the take-up shaft 4, thus hindering withdrawal of the webbing 70.

An inner peripheral cam surface 722 formed on the outer surface of the slit 721 of the cam plate 720 comprises an inner peripheral cam surface 722a for synchronous movement purpose in which the sensor case 736 is pivoted only within the optimum working range of the seat belt in synchronization with the reclining action of the backrest 62; an inner peripheral cam surface 722b for non-synchronous movement purpose in which the sensor case 736 is not pivoted in synchronization with the reclining action of the backrest 62; and an inner peripheral cam surface 722c for forceful actuation purpose which is formed between the inner peripheral cam surface 722a and the inner peripheral cam surface 722b and which serves as a forceful actuation region in which the inertial body 733 is moved by pivoting the sensor case 736 by an angle greater than the reclining angle of the inertial body support surface 736a.

As in the case with the inner peripheral cam surface 721a for synchronous movement purpose of the cam plate 710, the inner peripheral cam surface 722a for synchronous movement purpose controls the forward and backward movement of the follower 790 such that the inertial body support surface 736a is retained in an appropriate orientation regardless of reclining angle of the backrest 62, and hence assumes a cam profile equal to that of the inner peripheral cam surface 721a for synchronous movement purpose. As in the case with the inner peripheral cam surface 712b for non-synchronous movement purpose of the cam plate 710, the inner peripheral cam surface 722b for non-synchronous movement purpose acts as a synchronous movement cancelation mechanism which prevents the sensor case 736 from pivoting in synchronization with the reclining action of the backrest 62, and hence assumes a cam profile equal to that of the inner peripheral cam surface 721b for non-synchronous movement purpose.

When the backrest 62 is reclined beyond the backward limit angle of the optimum working range of the seat belt, the inner peripheral cam surface 722c for forceful actuation purpose controls the forward and backward movement of the follower 790 such that the sensor case 736 is tilted at an angle sufficiently greater than the reclining angle of the inertial body support surface 736a, thereby forcefully moving the inertial body 733. The inner peripheral cam surface 722c assumes a linear cam profile which departs from the seat reclining pivot 71 according to the backward reclining action of the backrest 62.

More specifically, when the reclining angle of the backrest 62 exceeds the backward limit angle of the optimum working range of the seat belt, the follower 790 which follows the inner peripheral cam surface 722c pivots the sensor case 736 to a great extent, thereby activating the emergency lock mechanism 300 and preventing withdrawal of the webbing 70.

The inertial body support surface 736a of the sensor case 736 is formed into the shape of a fan having its center extending below the main portion of the fan. By virtue of the shape of the inertial body support surface 736a, even when the backrest 62 is reclined beyond the optimum working range of the seat belt, the inertial body 733 does not move until the sensor case 736 pivots to an angle greater than the reclining angle of the inertial body support surface 736a. In a case where there is no inner peripheral cam surface 722c for forceful actuation purpose, the withdrawal of the webbing 70 may not be locked immediately even when the backrest 62 is reclined to the backward limit angle of the optimum working range of the seat belt.

More specifically, the inclination of the vehicle body or the like affects and changes the angle through which the backrest 62 is actually reclined, from the time when angular adjustment of the sensor case 736 is interrupted as a result of the backrest 62 reaching the backward reclining limit of the optimum working range of the seat belt until the time the sensor case 736 is tilted to or beyond the tilt angle of the inertial body support surface 736a.

Therefore, there exists a vague gray zone in which it is not clear whether or not withdrawal of the webbing 70 is prevented. When the backrest 62 is in the reclined position within the gray zone, the seat belt may be erroneously fastened.

In the vehicle body acceleration sensor for seat belt employing the cam plate 720, even if the backrest 62 is reclined to the backward reclining limit of the optimum working range of the seat belt, the inner peripheral cam surface 722c for forceful actuation purpose immediately tilts the sensor case 736 to or beyond the tilt angle of the inertial body support surface 736a, thereby actuating the emergency lock mechanism 300 and eliminating the foregoing gray zone. As a result, when the backrest 62 is backwardly reclined beyond the optimum working range of the seat belt, withdrawal of the webbing is reliably prevented, thus preventing fastening of the seat belt.

Figure 52:
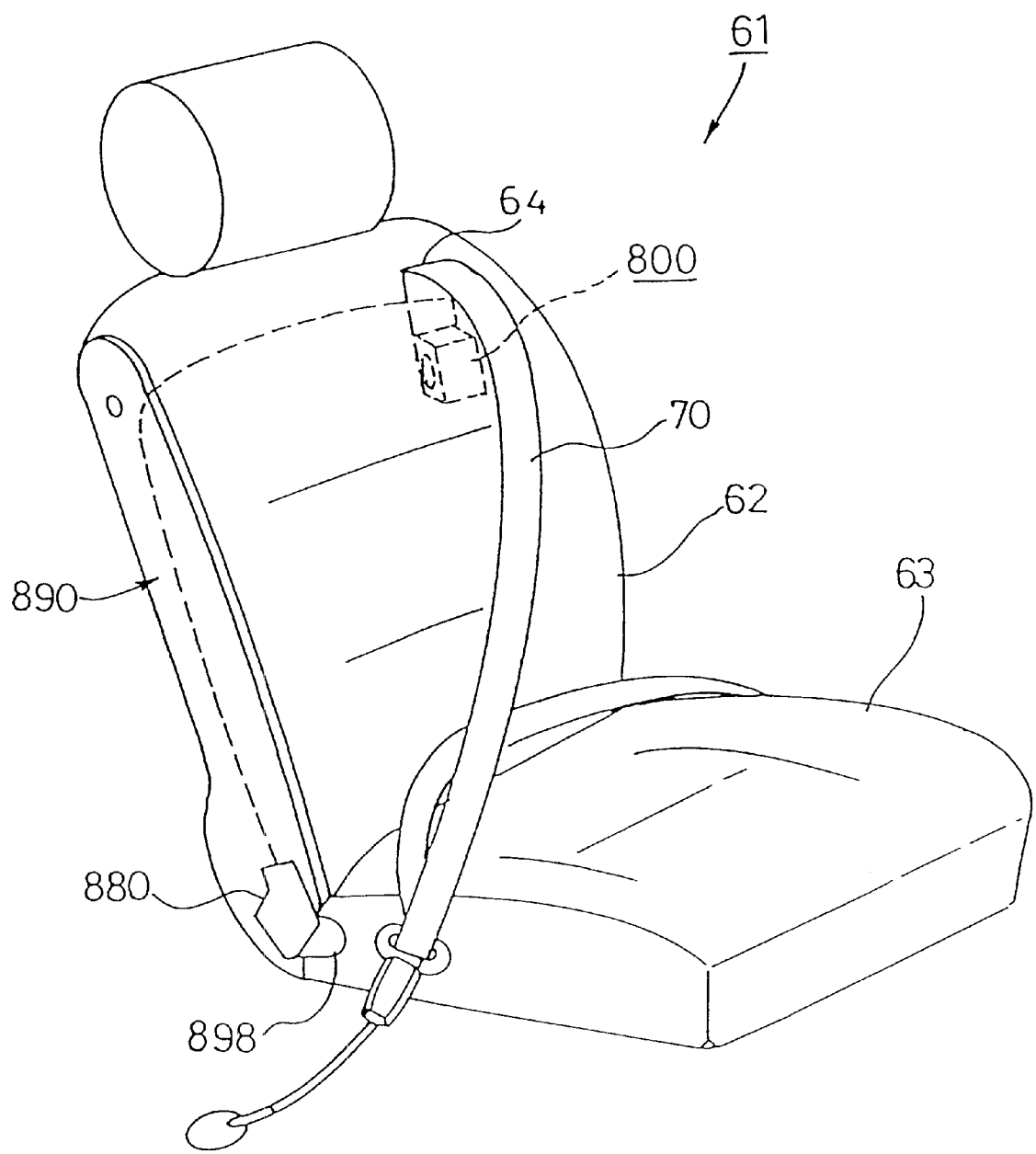
FIG. 52 is a schematic side view showing a reclining seat, wherein a seat belt retractor having a vehicle body acceleration sensor for use with a seat belt according to an eighth embodiment is incorporated in a backrest.

FIG. 52 is a schematic perspective view showing a reclining seat having a seat belt retractor 800 which is equipped with a vehicle body acceleration sensor 832 according to an eighth embodiment of the present invention.

The seat belt retractor 800 is built into the backrest 62 of the reclining seat 61 mounted on a vehicle body. The backrest 62 is connected to the seat portion 63 so as to be pivotal about a seat reclining pivot extending in the widthwise direction of the vehicle body. The inclination of the backrest 62 is adjusted according to the physique of an occupant. A take-up member 880 is disposed in line with the seat reclining pivot by way of a first plate 897 to be described later with reference to FIG. 54.

Figure 53:
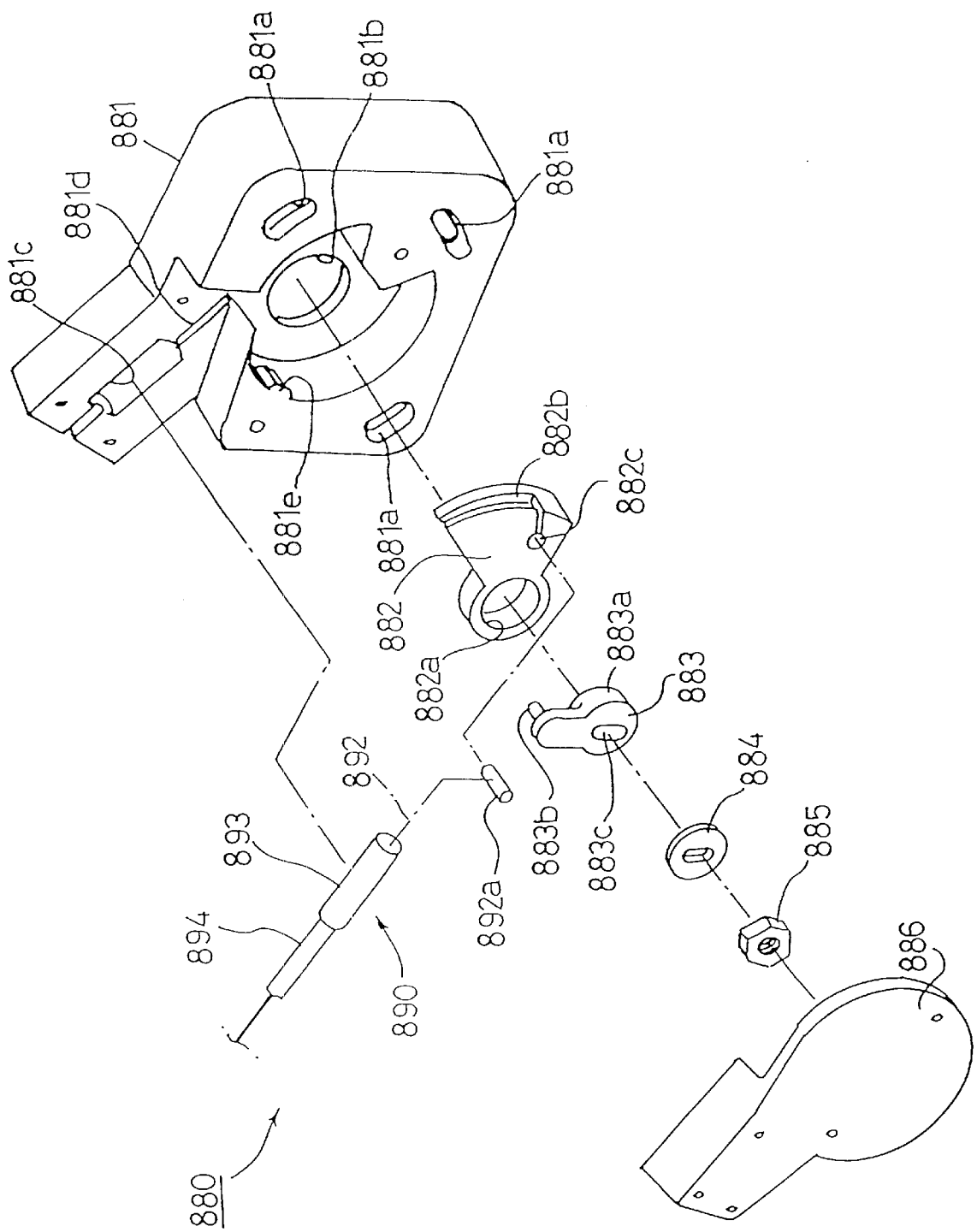
FIG. 53 is an exploded perspective view showing a take-up member shown in FIG. 52.

FIG. 53 is an exploded perspective view showing the take-up member 880. As shown in FIG. 53, the take-up member 880 constituting transmission means 890 comprises a case 881 fixed to a first plate 897 to be described later; a fan-shaped slider 882 around which is wrapped a inner cable 892 serving as a transmission member of the transmission means 890; a lever 883 which limits pivotal movement of the slider 882 by means of a protuberance 832b and has a cylindrical section 883a serving as a pivot of the slider 882; a washer 884; a nut 885 capable of fastening the lever 883 to a bolt 898b of a second plate 898 to be described later, by way of the washer 884; and a cover 886 to be attached to the case 881.

The take-up member 880 constitutes angle sensing means for sensing the reclining angle of the backrest 62 by detection of a relative rotation between the case 881 which is disposed on the backrest and pivots together with the backrest 62 and the slider 882 which is disposed on the seat portion.

The case 881 comprises a mount hole 881a which permits fastening of the case 881 to the first plate 897 through use of a bolt (not shown); a hole 881b which permits insertion of the cylindrical portion 883a of the lever 883; a groove 881c for receiving a large diametrical portion 893 of an outer tube 894 in which the inner cable 892 is inserted; a passageway 881d which is in communication with the groove 881c and receives the inner cable 892 inserted into the outer tube 894; and a rib 881e for limiting pivotal movement of the slider 882.

The slider 882 comprises a cylindrical portion 882a which is fitted around the cylindrical portion 883a of the lever 883 in a rotatable manner; a circular-arc guide groove 882b around which the inner cable 892 is coiled; and a hole section 882c on which is fixed the terminal member 892a of the inner cable 892.

Figure 54:
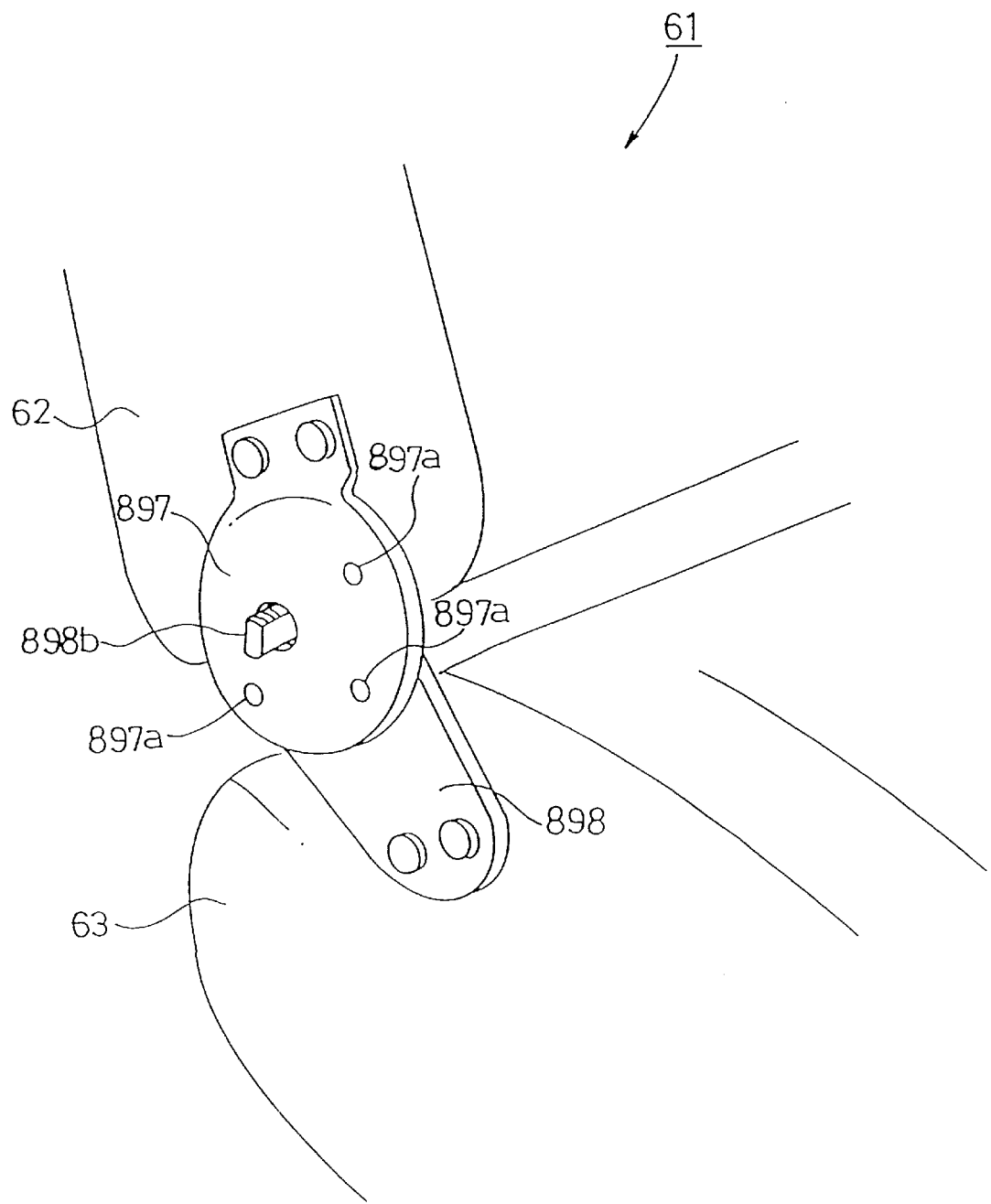
FIG. 54 is a schematic perspective view showing the area of the reclining seat where the take-up member is attached.

FIG. 54 is a schematic perspective view showing the area of the reclining seat 61 on which the take-up member 880 is fixed. As shown in FIG. 54, the first plate 897 is attached to the backrest 62, and the second plate 898 is attached to the seat portion 63. Through use of an unillustrated bolt, the case 881 of the take-up member 880 is secured to the mount hole 897a of the first plate 897 through the mount hole 881a. In this case, the mount hole 881a of the case 881 is formed into the shape of an elongated hole, and hence the case 881 can be secured even if there is an offset between the mount hole 897 of the first plate 897 to which the case 881 is secured and the mount hole 881a. Accordingly, the case 881 can allow offset of the pitch at which the case 881 is secured to the backrest 62. Therefore, formation of a mount hole does not require a high degree of dimensional precision, thereby enabling a reduction in manufacturing costs.

A bolt 898b having a width defined by two flat surfaces is used for the second plate 898. In response to the width defined by two flat surfaces of the bolt 898b, as shown in FIG. 53, the lever 883 is provided with an elongated hole 883c. The lever 883 is secured to the bolt 898b in a stationary manner by means of the nut 885.

Figure 55:
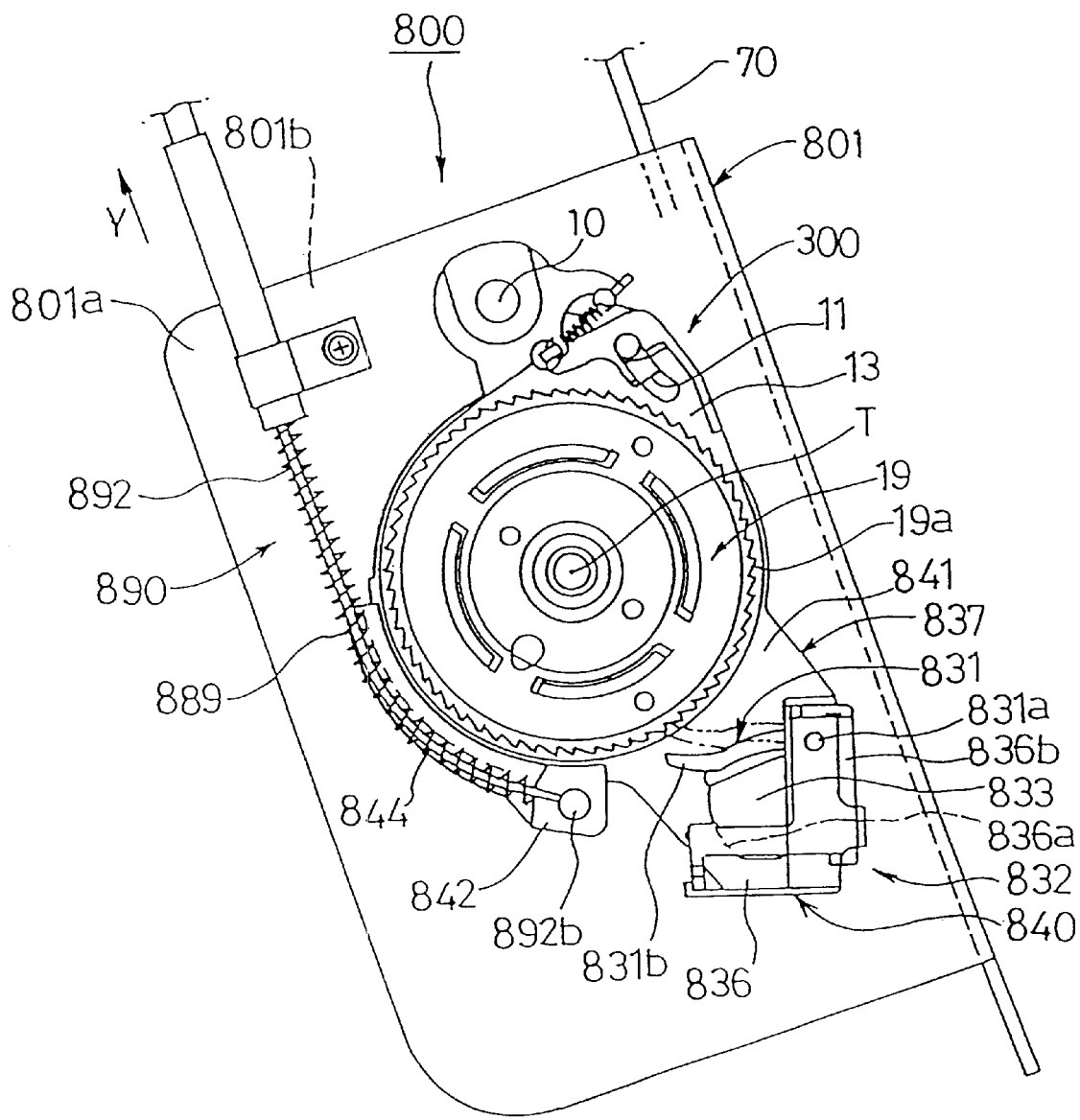
FIG. 55 is a side view showing the seat belt retractor shown in FIG. 52.
Figure 56:
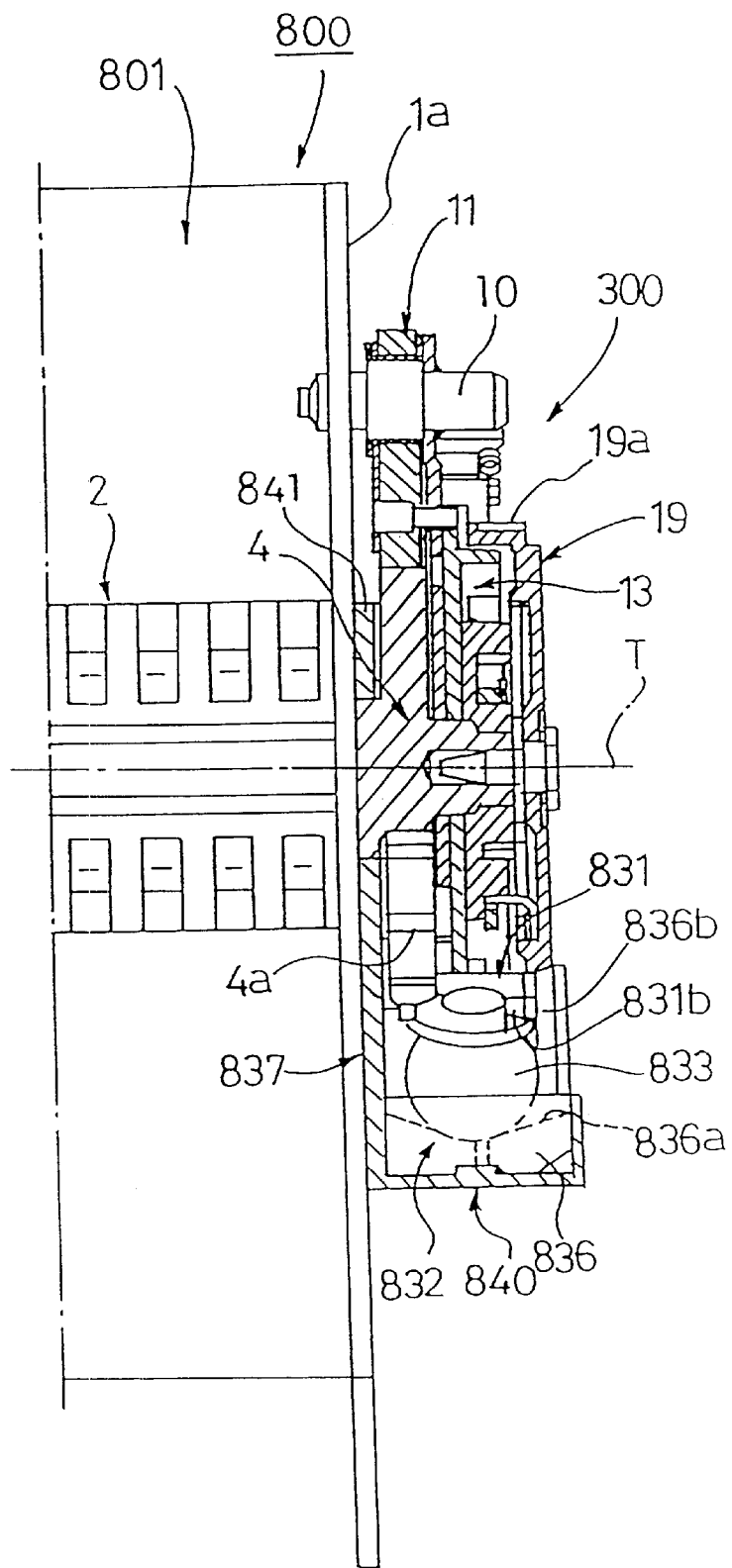
FIG. 56 is a cross-sectional view showing the seat belt retractor shown in FIG. 52.

As shown in FIGS. 55 and 56, the seat belt retractor 800 comprises the substantially cylindrical bobbin 2, around which a webbing 70 is wound; the take-up shaft 4 which is inserted into the bobbin 2, is rotatively supported by means of the retractor base 801, and has at one end thereof (i.e., on the right-side of the take-up shaft 4 shown in FIG. 56) the latch plate 4a formed from a ratchet wheel; and the emergency lock mechanism 300, all of which are identical to those described with reference to the preceding embodiments. The webbing 70 withdrawn from the retractor 800 by way of the slot 64 formed in the backrest 62 restraints the occupant.

The retractor base 801 mounted on a frame member (not shown) of the backrest 62 is formed from a metal plate through press molding such that the majority of the retractor base 801 assumes a substantially angular C-shaped cross section. The take-up shaft 4 fitted into the bobbin 2 is rotatable and sandwiched between the sides plates 801a and 801b of the retractor base 801. The end of the take-up shaft 4 that passes through the side plate 1b of the retractor base 801 is provided with a known take-up device (not shown). At all times, the take-up device urges the bobbin 2, in the direction in which the webbing 70 is taken up, by way of the take-up shaft 4.

The vehicle body acceleration sensor 232 according to the second embodiment is provided below the ratchet wheel 19 constituting the emergency lock mechanism 300.

As shown in FIGS. 55 and 56, the vehicle body acceleration sensor 832 according to the eighth embodiment comprises a sensor arm 831, a sensor case 836, an inertial body 833, a case support member 837, and transmission means 839.

The sensor case 836 comprises an inertial body support surface 836a on which the inertial body 833 is placed, and an arm support section 836b that rotatively supports the sensor arm 831. The inertial body support surface 836a of the sensor case 836 is formed into the shape of a fan having its center extending below the main portion of the fan. As shown in FIG. 55, the case support member 837 comprises a case support section 840 into which the sensor case 836 is removably fitted; a pivot section 841 which extends upward from one side of the case support section 840 and is rotatably supported by the retractor base 801; and a joint section 842 to be connected to the terminal member 892b of the inner cable 892. Further, the case support member 837 has a take-up surface 844 which continues from the joint section 842 and is positioned concentrically and in line with the take-up shaft 4.

The pivot section 841 of the case support member 837 is supported so as to be able to pivot about the pivot axis T of the take-up shaft 4. When the backrest 62 is reclined by means of the transmission means 890 connected to the joint section 842, the case support member 837 is pivoted in synchronization with the reclining action of the backrest 62, thereby adjusting the sensor case 836 of the vehicle body acceleration sensor 832 to an appropriate orientation.

As shown in FIG. 55, a pin section 831a provided at the base end of the sensor arm 831 is rotatively supported by the sensor case 836. While the sensor case 836 is attached to the retractor 801, the sensor arm 831 can be pivoted about the pin section 831a thereof and can switch between a first position—where a leading edge 831b engages the teeth 19a of the ratchet wheel 19 to thereby prevent the take-up shaft 4 from rotating in the direction in which the webbing is drawn-out—and a second position—where the leading edge 831b is disengaged from the teeth 19a to thereby prevent actuation of the lock means.

When the leading edge 831b of the sensor arm 831 engages the teeth 19a of the ratchet wheel 19, the ratchet wheel 19 rotates so as to lag behind the take-up shaft 4. As a result, the pole 11 engages the latch plate 4a by way of the latch cup 13, thereby preventing rotation of the take-up shaft 4 in the direction in which the webbing is drawn-out. Further, the inertial body 833 is placed on the inertial body support surface 836a. Upon receipt of a velocity change greater than a predetermined magnitude, the inertial body 833 moves in relation to the inertial body support surface 836a, thereby moving to the first position the sensor arm 831 that remains in contact with the outside of the inertial body 833.

FIG. 57A shows the backrest 62 when set to the most forwardly reclined position within the range of reclining action of the backrest in which an occupant can use the seat. FIG. 57B is a side view showing the take-up member 880 from which a cover 886 is removed when the backrest 62 is in the position shown in FIG. 57A. FIG. 57C is a side view showing the retractor 800 when the backrest 62 is in the position shown in FIG. 57A.

When the backrest 62 shown in FIG. 57A is reclined backward from the most forwardly reclined position within the range of reclining action of the backrest in which an occupant can use the seat, the slider 882 is pulled by the inner cable 892 and attempts to pivot in a counterclockwise direction. However, the slider 882 is pressed by the protuberance 883b and remains stationary.

As shown in FIG. 57B, as the backrest 62 is reclined, the case 881 pivots in a counterclockwise direction in conjunction with the backrest 62. The large diametrical section 893 of the outer tube 894 housed in the groove section 881c of the case 881 pivots in a counterclockwise direction, whereby the slider-side end of the inner cable 892 protrudes from the outer tube 894 in the direction of Y1 and is coiled around the guide groove 882b of the slider 882.

As shown in FIG. 57C, the retractor-side end section of the inner cable 892 is pulled in the direction of Y. Since the retractor-side end section of the inner cable 892 is connected to the case support member 837 and the inner cable 892 is also moved along the take-up surface 894 concentric with the take-up shaft 4, the sensor case 836 retained by the case support member 837 also pivots in a clockwise direction about the take-up shaft 4.

If the radius of the inner cable 898 coiled around the guide groove 882b of the slider 882 is set equal to the radius of the inner cable 892 coiled around the take-up surface 844 by way of a spring 889, the retractor-side end section of the inner cable 892 is also moved by a distance corresponding to the length of the inner cable 892 coiled around the slider 882, as a result of reclining of the backrest 62. Therefore, the sensor case 836 is pivoted to an angle corresponding to the reclining angle of the backrest 62.

Accordingly, since the sensor case 836 is retained in an appropriate orientation regardless of the reclining angle of the backrest 62, the vehicle body acceleration sensor can sense the acceleration of the vehicle body without fail.

Figure 58:
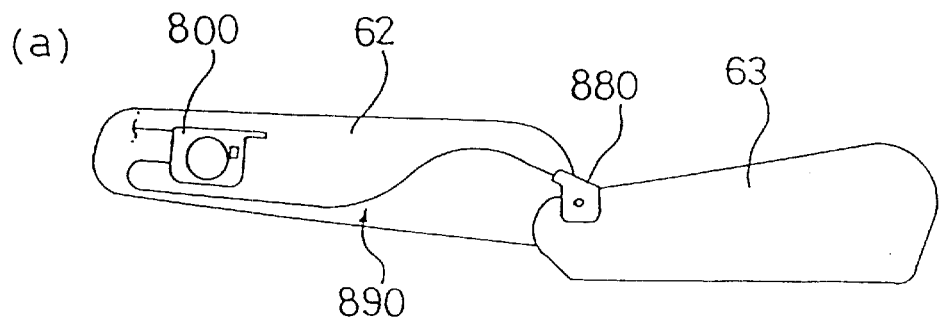
FIG. 58A is a side view showing a reclining seat when a backrest is reclined to the most backwardly reclined position (i.e., a full-flat position)
FIG. 58B is a side view showing a take-up member from which a cover is removed when the backrest is in the full-flat position.
FIG. 58C is a side view showing a retractor when the backrest is in the full-flat position.
Figure 58:
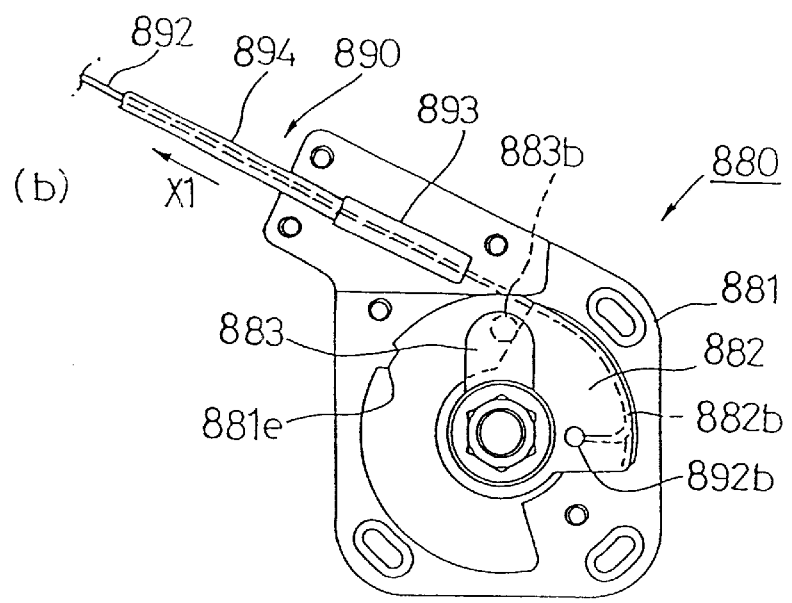
Figure 58:
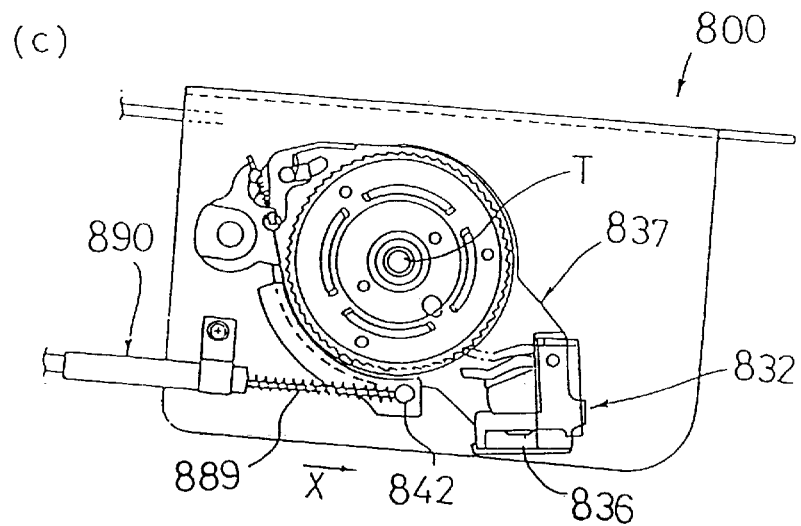

FIG. 58A is a side view showing a reclining seat when the backrest is 62 reclined to the most backwardly reclined position (i.e., a full-flat position); FIG. 58B is a side view showing the take-up member 880 from which the cover 886 is removed when the backrest 62 is in the full-flat position; and FIG. 58C is a side view showing the retractor 800 when the backrest 62 is in the full-flat position.

As shown in FIG. 58B, the slider-side end section of the inner cable 892 is coiled around the guide groove 882b of the slider 882 until the backrest 62 becomes fully flat. As a result, as shown in FIG. 58C, the sensor case 836 pivots about the pivot axis T by way of the case support member 837 by the amount corresponding to the amount of the inner cable 892 being coiled. Further, the spring 889 is coiled around the retractor-side end section of the inner cable 892 and is held in a compressed state at this time.

Consequently, the restoration force of the spring 889 acts on the case support member 837 in a counterclockwise direction, thereby also acting on the inner cable 892 in direction X, as shown in FIG. 58C. The slider-side end section of the inner cable 892 is joined to the slider 882, and, as shown in FIG. 58B, the inner cable 892 is subjected to a tensile force in the direction of X1. However, since the slider 882 is pressed by the protuberance 883b of the lever 883, the case support member 837 is not rotated in a counterclockwise direction any further, thereby limiting the pivotable range of the sensor case 836.

Figure 57:
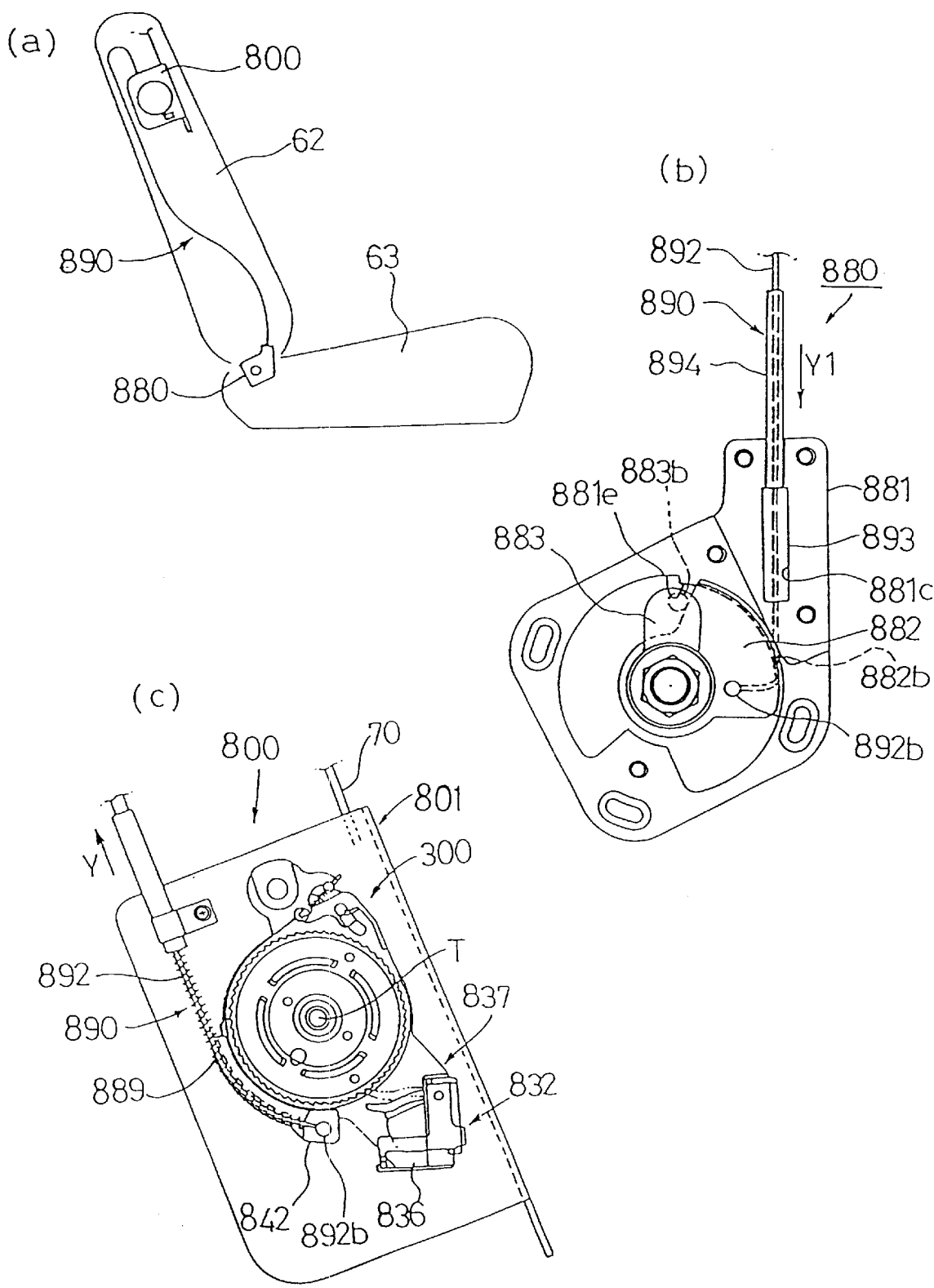
FIG. 57A is a side view showing a reclining seat when a backrest is set to the most forwardly reclined position within the range of reclining action of the backrest in which an occupant can take the seat.
FIG. 57B is a side view showing the take-up member from which a cover is removed when the backrest is in the position shown in FIG. 57A.
FIG. 57C is a side view showing a retractor when the backrest is in the position shown in FIG. 57A.

If the backrest 62 is forwardly reclined beyond the range in which the occupant can use the seat from the position shown in FIG. 57, the case 881 is arranged so as to pivot together with the slider 882 while the protuberance 881e remains in contact with the slider 882.

Figure 59:
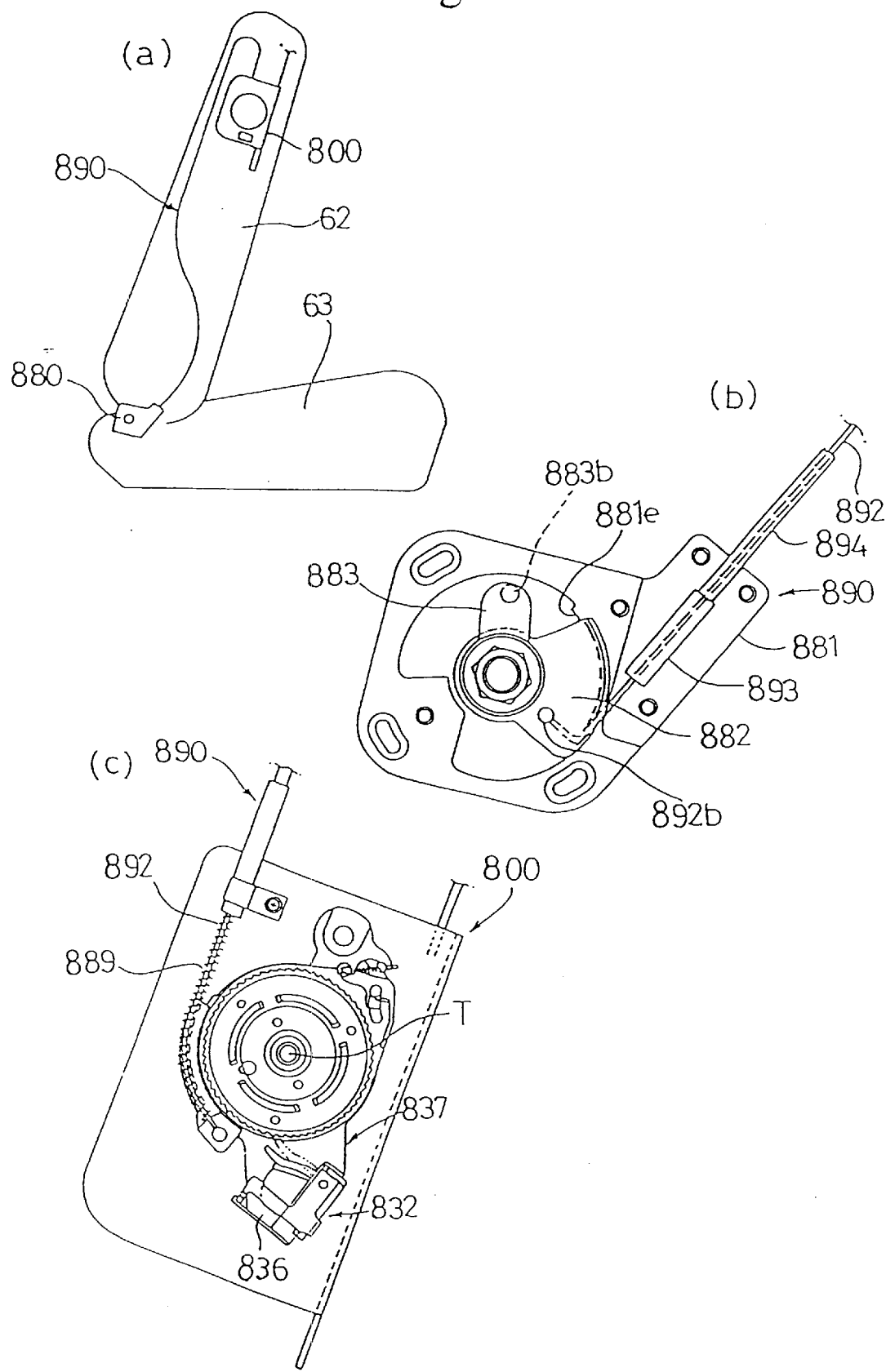
FIG. 59A is a side view showing a reclining seat when a backrest is reclined to a forward position beyond a range of reclining angle of the backrest in which an occupant can take the seat.
FIG. 59B is a side view showing a take-up member from which a cover is removed when the backrest is reclined as shown in FIG. 59A.
FIG. 59C is a side view showing a retractor when the backrest is reclined as shown in FIG. 59A.

FIG. 59A is a side view showing the reclining seat when a backrest is reclined to a forward position beyond a range of reclining angle of the backrest in which an occupant can use the seat; FIG. 59B is a side view showing the take-up member 880 from which the cover 886 is removed when the backrest is reclined as shown in FIG. 59A; and FIG. 59C is a side view showing the retractor 800 when the backrest is reclined as shown in FIG. 59A.

As shown in FIG. 59B, when the backrest 62 is reclined forward, the slider 882 remains in contact with the protuberance 881e of the case 881, and hence pivots in a clockwise direction together with the case 881. Since there is no change in a relative position between the slider 882 joined to the slider-side end section of the inner cable 892 and the case 881, the inner cable 892 neither projects nor is withdrawn.

Since the inner cable 892 neither projects nor is withdrawn, as shown in FIG. 59C there is no change in relative position between the retractor 800 and the case support member 837 for retaining the sensor case 836. Consequently, within the range in which the occupant cannot use the seat, the emergency lock mechanism 300 is activated as a result of reclining action of the backrest 62. However, since no occupant uses the seat in this range, no problems arise. Further, since the case member 837 is not pivoted meaninglessly, the needless movable range of the sensor case 836 can be eliminated, thereby rendering the retractor 800 compact.

Figure 60:
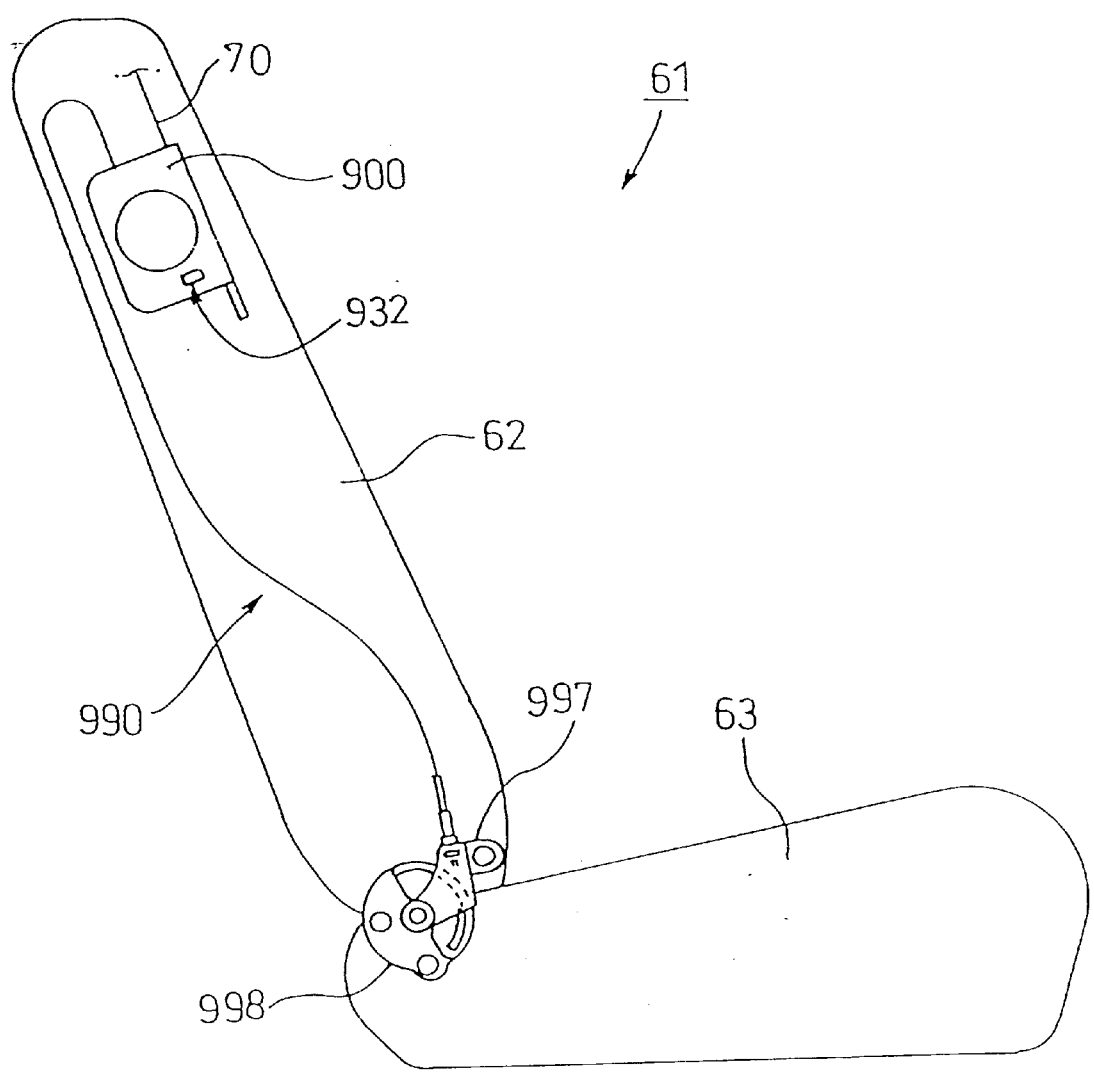
FIG. 60 is a schematic side view showing a reclining seat, wherein a seat belt retractor having a vehicle body acceleration sensor for use with a seat belt according to an ninth embodiment is incorporated in a backrest.

FIG. 60 is a schematic side view showing a reclining seat, wherein a seat belt retractor 900 having a vehicle body acceleration sensor 932 for use with a seat belt according to an ninth embodiment is incorporated in a backrest.

The seat belt retractor 900 is built in the backrest 62 of the reclining seat 61 mounted on a vehicle body. The backrest 62 is connected to the seat portion 63 so as to be pivotal about a seat reclining pivot extending in the widthwise direction of the vehicle body. According to the physique of an occupant, the inclination of the backrest 62 is adjusted. A wire lever take-up member 997 constituting a take-up member of transmission means 990 is secured to the backrest 62, and a wire take-up member 998 constituting the take-up member of the transmission means 990 is secured to the seat portion 63.

The take-up member 990 constitutes angle sensing means for sensing the reclining angle of the backrest 62 by detection of a relative rotation between the wire lever 997 which is disposed on the backrest and pivots together with the backrest 62 and the wire take-up member 998 which is disposed on the seat portion.

Figure 61:
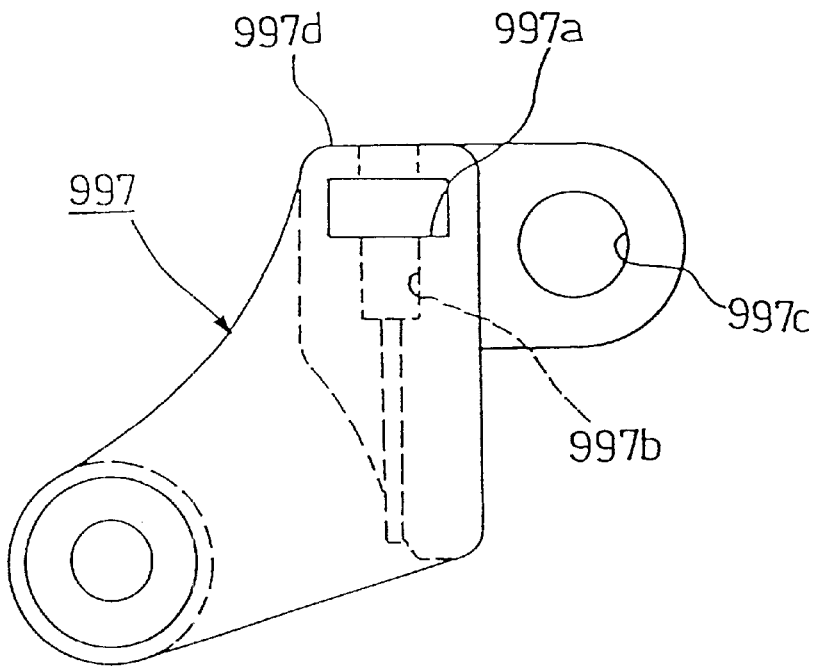
FIG. 61 is a side view showing a wire lever shown in FIG. 60.
Figure 62:
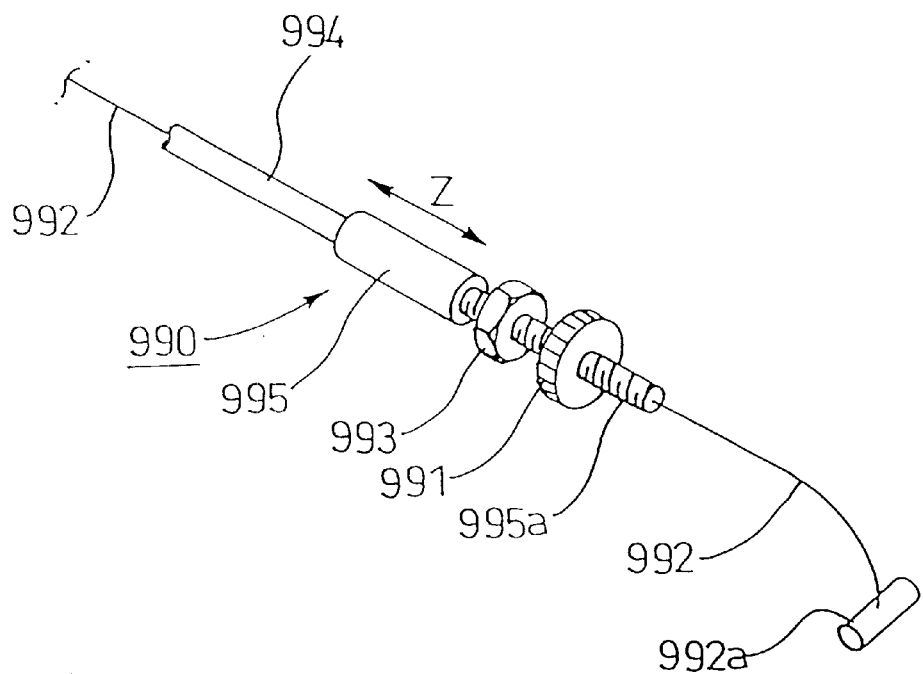
FIG. 62 is an enlarged perspective view showing the principle elements of transmission means shown in FIG. 60.

As shown in FIG. 61, the wire lever 997 comprises a trench 997b for housing a threaded portion 995a of a joint 995 formed on a lever-side end section of an outer tuber 994 constituting the transmission means 990; a screw receive hole 997a for housing an adjustment screw 991 which is screw-engaged with the threaded portion 995a; and a mount hole 997c used for securing the wire lever 997 to the backrest 62 (see FIG. 62).

Figure 63:
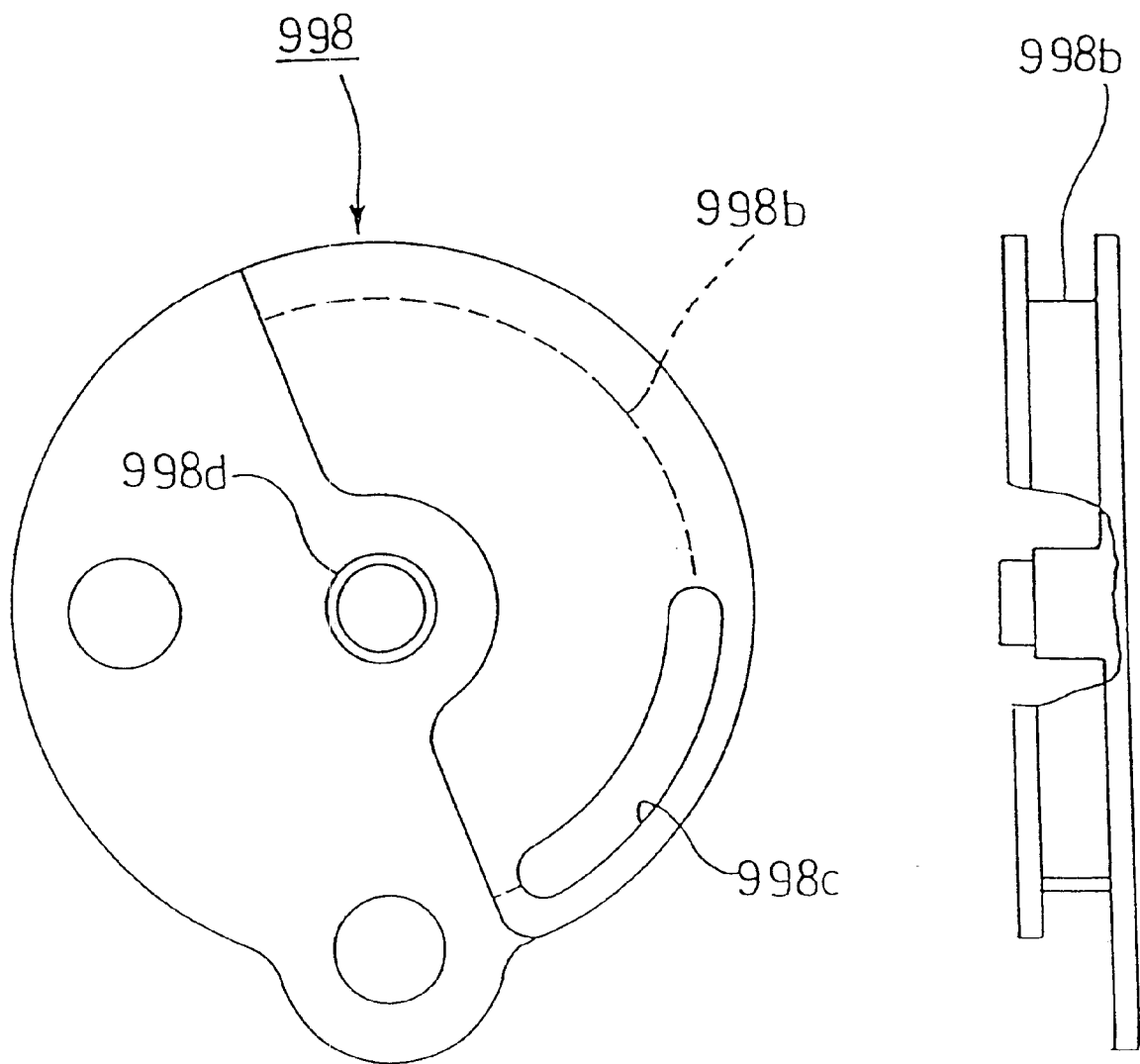
FIG. 63 provides a front view and a side view, both of which show a wire take-up member shown in FIG. 60.

As shown in FIG. 63, the wire take-up member 998 comprises a guide groove 998b around which is coiled a wire 992 serving as a transmission member of the transmission means 990; and a groove 998c for housing a terminal member 992a of the wire 992 in a movable fashion. The guide groove 998b and the groove 998c are formed into the shape of circular-arc grooves which take as a center of curvature a center axis 998d serving as the pivot of the wire lever 997.

As shown in FIG. 62, the adjustment screw 991 is attached to the threaded portion 995a of the joint 995 that is formed on the lever-side end section of the outer tuber 994 in which the wire 992 is inserted. Through adjustment of the adjustment screw 991 housed in the screw housing hole 997a of the wire lever 997 and a nut 993 provided so as to remain in contact with an end 997d of the wire lever 997, as required, the joint 995 whose threaded portion 995a is housed in the trench 997b of the wire lever 997 is actuated in direction of Z, thereby enabling control of length of the portion of wire 92 which projects from the lever-side end section of the outer tuber 994. Through fastening of the nut 993 after adjustment of length of the projection, the lever-side end section of the outer tuber 994 is secured to the wire lever 997.

Figure 64:
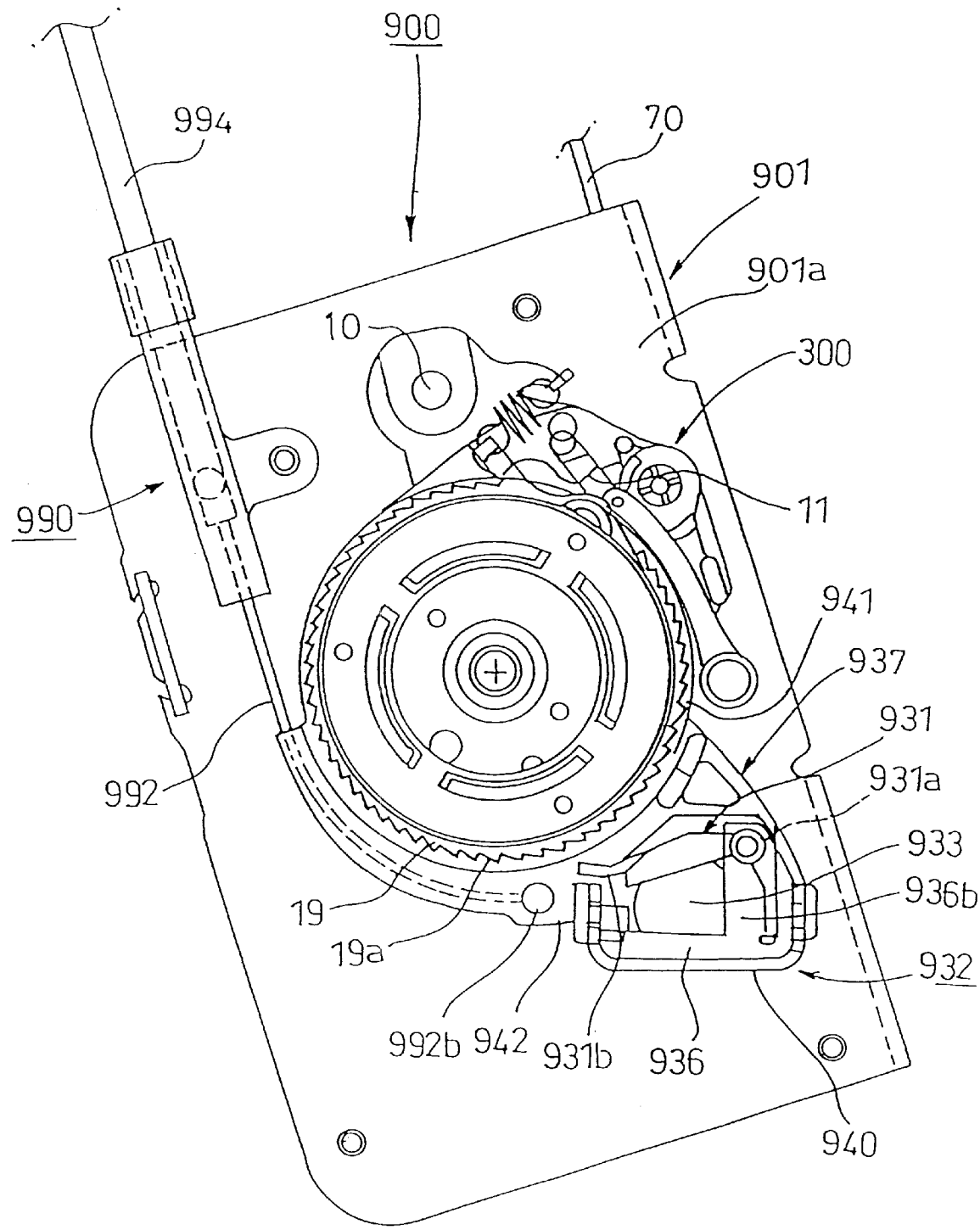
FIG. 64 is a side view showing a retractor shown in FIG. 60.
Figure 65:
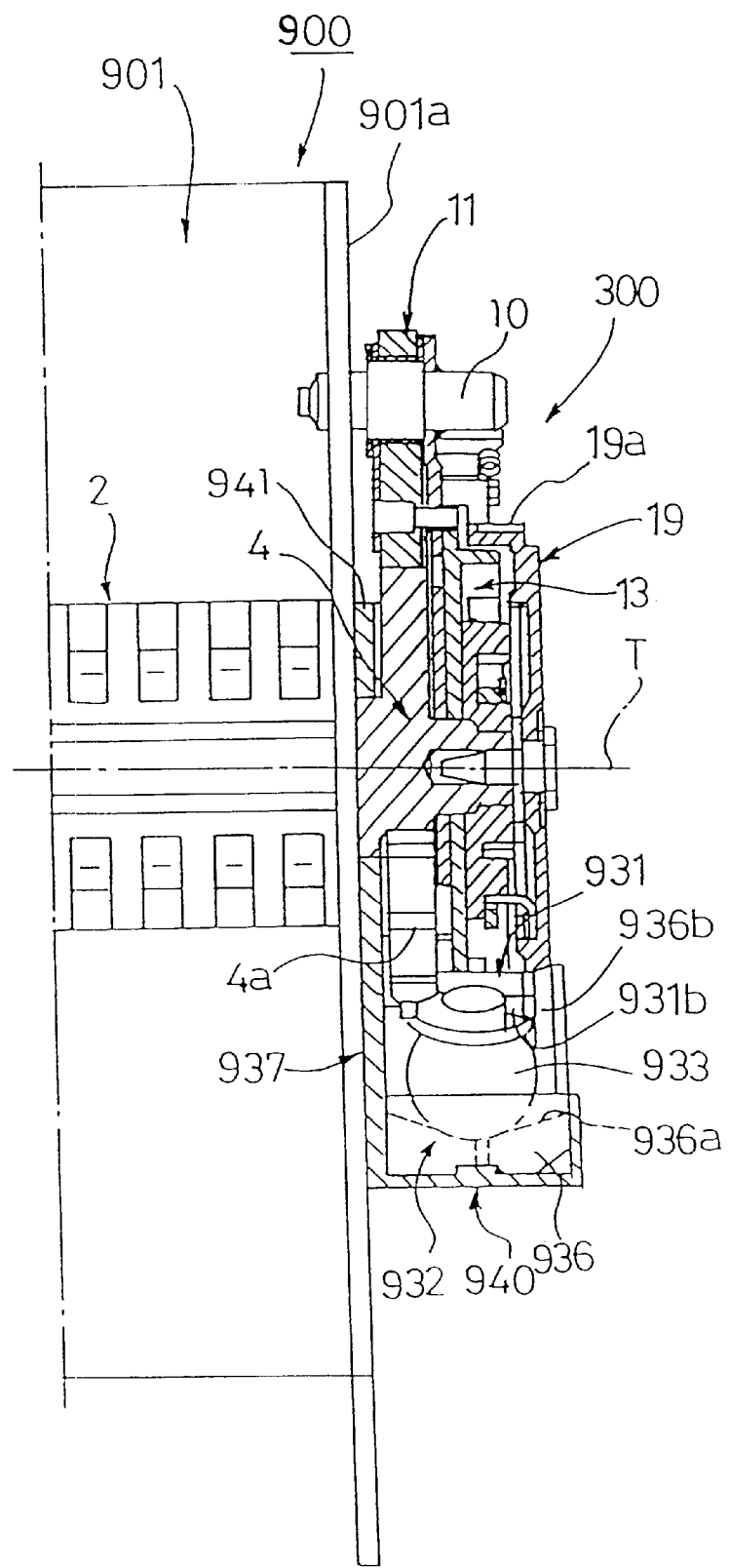
FIG. 65 is a cross-sectional view showing the retractor shown in FIG. 60.

As shown in FIGS. 64 and 65, the seat belt retractor 900 comprises the substantially cylindrical bobbin 2, around which a webbing 70 is wound; the take-up shaft 4 which is inserted into the bobbin 2, is rotatively supported by means of a retractor base 901, and has at one end thereof (i.e., on the right-side of the take-up shaft 4 shown in FIG. 65) the latch plate 4a formed from a ratchet wheel; and the emergency lock mechanism 300 which is identical to those described with reference to the preceding embodiments.

The retractor base 901 mounted on a frame member (not shown) of the backrest 62 is formed from a metal plate through press molding such that the majority of the retractor base 901 assumes a substantially angular C-shaped cross section. The take-up shaft 4 fitted into the bobbin 2 is rotatable and sandwiched between both sides plates 901a and 901b of the retractor base 901. The end of the take-up shaft 4 that passes through the side plate 1b of the retractor base 901 is provided with a known take-up device (not shown). At all times, the take-up device urges the bobbin 2, in the direction in which the webbing 70 is taken up, by way of the take-up shaft 4.

The vehicle body acceleration sensor 932 according to the ninth embodiment is provided below the ratchet wheel 19 constituting the emergency lock mechanism 300.

As shown in FIGS. 64 and 65, the vehicle body acceleration sensor 932 according to the ninth embodiment comprises a sensor arm 931, a sensor case 936, an inertial body 933, a case support member 937, and a transmission means 990.

The sensor case 936 comprises an inertial body support surface 936a on which the inertial body 933 is placed, and an arm support section 936b that rotatively supports the sensor arm 931. The inertial body support surface 936a of the sensor case 936 is formed into the shape of a fan having its center extending below the main portion of the fan.

As shown in FIG. 64, the case support member 937 comprises a case support section 940 in which the sensor case 936 is removably fitted; a pivot section 941 which extends upward from one side of the case support section 940 and is rotatably supported by the retractor base 901; and a joint section 942 to be connected to the terminal member 992b of the inner cable 992.

The pivot section 941 of the case support member 937 is supported so as to be able to pivot about the pivot axis T of the take-up shaft 4. When the backrest 62 is reclined by means of the transmission means 990 connected to the joint section 942, the case support member 937 is pivoted in synchronization with the reclining action of the backrest 62, thereby adjusting the sensor case 936 of the vehicle body acceleration sensor 932 in an appropriate orientation.

As shown in FIG. 64, a pin section 931a provided at the base end of the sensor arm 931 is rotatively supported by the sensor case 936. While the sensor case 936 is attached to the retractor 900, the sensor arm 931 can be pivoted about the pin section 931a thereof and can switch between a first position—where a leading edge 931b engages the teeth 19a of the ratchet wheel 19 to thereby prevent the take-up shaft 4 from rotating in the direction in which the webbing is drawn-out—and a second position—where the leading edge 931b is disengaged from the teeth 19a to thereby prevent actuation of the lock means.

When the leading edge 931b of the sensor arm 931 engages the teeth 19a of the ratchet wheel 19, the ratchet wheel 19 rotates so as to lag behind the take-up shaft 4. As a result, the pole 11 engages the latch plate 4a by way of the latch cup 13, thereby preventing rotation of the take-up shaft 4 in the direction in which the webbing is drawn-out. Further, the inertial body 933 is placed on the inertial body support surface 936a. Upon receipt of a velocity change greater than a predetermined magnitude, the inertial body 933 moves in relation to the inertial body support surface 936a, thereby moving to the first position the sensor arm 931 that remains in contact with the outside of the inertial body 933.

The foregoing seat belt retractor 900 comprises control means (not shown) for actuating the emergency lock mechanism 300 according to the taking up of the webbing so that the lock means follows an engagement position or a disengagement position with respect to the take-up shaft. The control means causes the lock means to engage the take-up shaft, thereby locking rotation of the take-up shaft in the direction in which the webbing is drawn-out and actuating an automatic lock mechanism. The detailed structure of the automatic lock mechanism is described in Japanese Utility Model Unexamined Publication No. Hei.6-61609 filed by the present inventor.

The foregoing seat belt retractor 900 is further provided with an end lock mechanism (not shown) which prevents actuation of the emergency lock mechanism 300 when the webbing of greater than a predetermined length is already taken up. This end lock mechanism permits the webbing to be readily drawn-out or taken up when no occupant is buckled up. The detailed structure of the end lock mechanism is described in Japanese Patent Unexamined Publication No. Hei.10-42015 filed by the present inventor.

Figure 66:
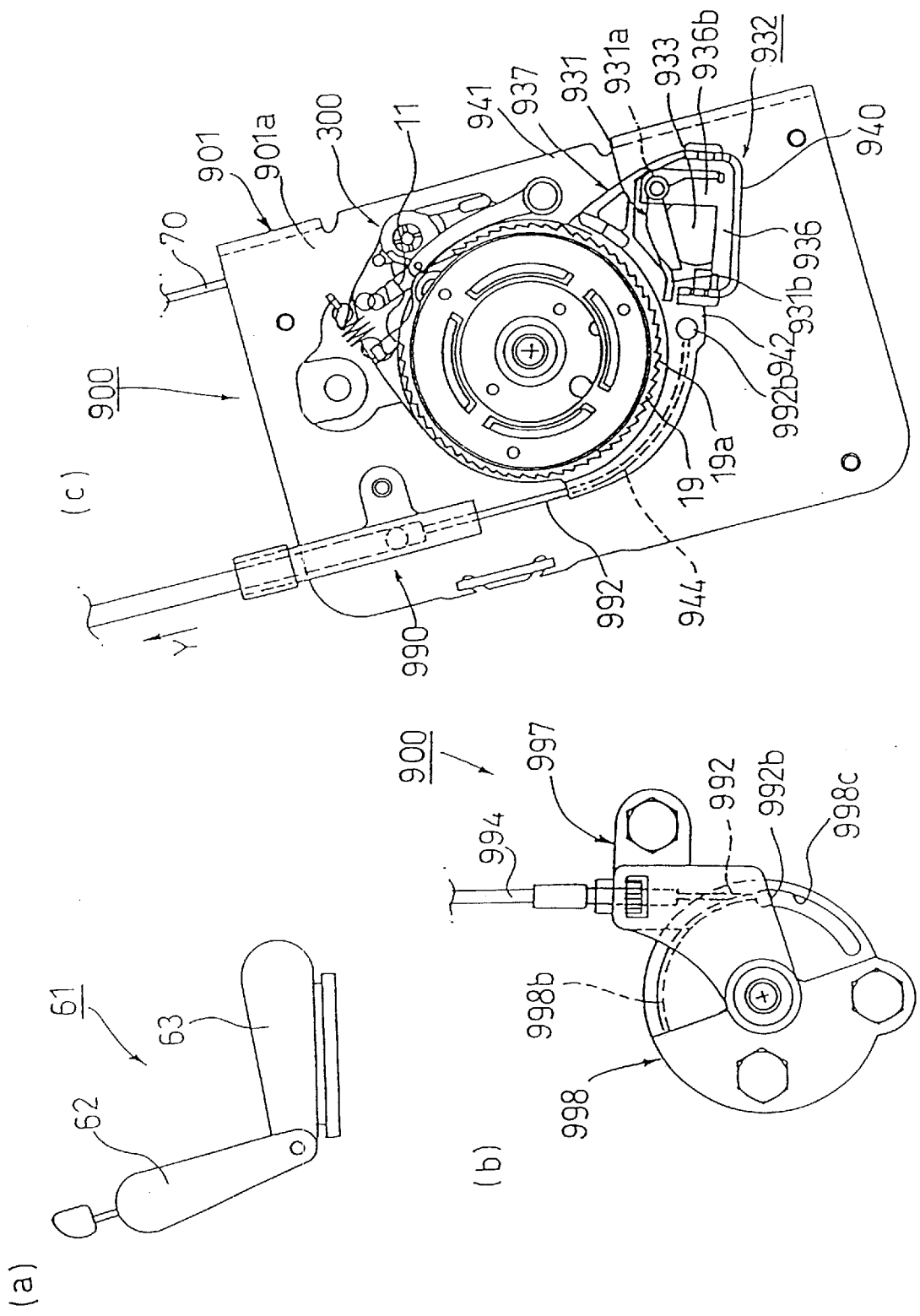
FIG. 66A is a side view showing a reclining seat when a backrest is reclined to the most forward position within a range of reclining action of the backrest in which an occupant can take the seat.
FIG. 66B is a side view showing a wire take-up member when the backrest is reclined as shown in FIG. 66A.
FIG. 66C is a side view showing a retractor when the backrest is reclined as shown in FIG. 66A.

FIG. 66A is a side view showing the reclining seat when the backrest 62 is reclined to the most forward position within a range of reclining action of the backrest in which an occupant can take the seat; FIG. 66B is a side view showing a wire take-up member 998 when the backrest 62 is reclined as shown in FIG. 66A; and FIG. 66C is a side view showing the retractor 900 when the backrest is reclined as shown in FIG. 66A.

When the backrest 62 shown in FIG. 66A is reclined backward from the most forwardly reclined position within the range of reclining action of the backrest in which an occupant can take the seat, the wire lever 997 secured to the backrest 62 shown in FIG. 66B is pivoted counterclockwise together with the backrest 62. Since the wire 992 is fixed to one end of the groove 998c formed in the wire take-up member 998, the wire lever 997 moves in relation to the wire 992. As a result, the wire 992 is pulled from the lever-side end section of the outer tuber 994 and is coiled around the guide groove 998b of the wire take-up member 998.

As shown in FIG. 66C, the retractor-side end section of the inner cable 992 is pulled in direction of Y. Since the retractor-side end section of the wire 992 is connected to the case support member 937 and the wire 992 is also moved along the take-up surface 994 concentric with the take-up shaft 4, the sensor case 936 retained by the case support member 937 also pivots in a clockwise direction about the take-up shaft 4.

If the radius of the wire 992 coiled around the guide groove 998b of the wire take-up member 998 is set so as to equal to the radius of the wire 992 coiled around the take-up surface 944, the retractor-side end section of the wire 992 is also moved by a distance corresponding to the length of the inner cable 992 coiled around the guide groove 998b as a result of reclining of the backrest 62. Therefore, the sensor case 936 is pivoted through an angle corresponding to the reclining angle of the backrest 62.

Accordingly, since the sensor case 936 is retained in an appropriate orientation regardless of the reclining angle of the backrest 62, the vehicle body acceleration sensor can sense the acceleration of the vehicle body without fail.

Figure 67:
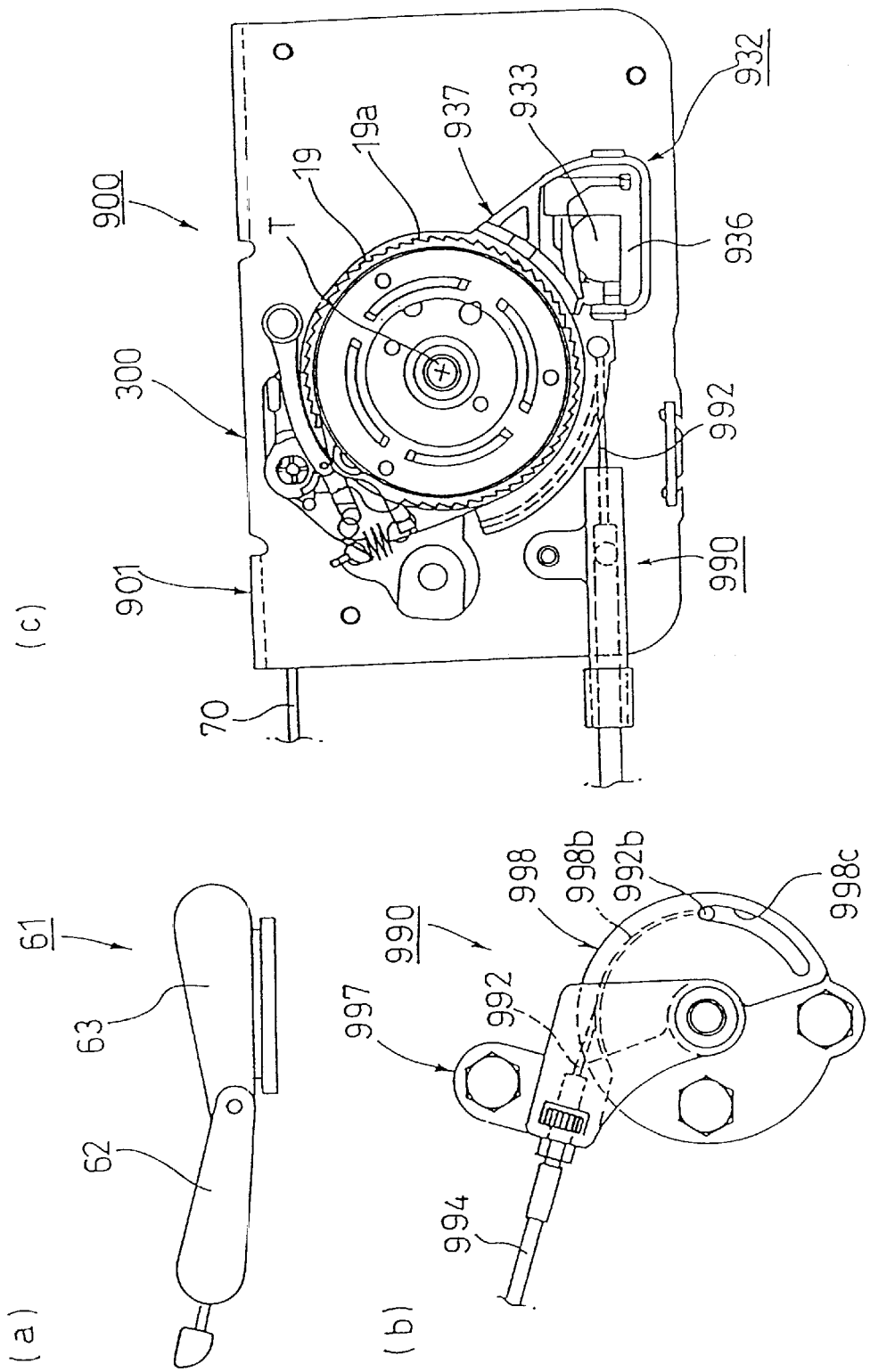
FIG. 67A is a side view showing a reclining seat when a backrest is reclined to the most backwardly reclined position (i.e., a full-flat position)
FIG. 67B is a side view showing a wire take-up member from which a cover is removed when the backrest is in the full-flat position.
FIG. 67C is a side view showing a retractor when the backrest is in the full-flat position.

FIG. 67A is a side view showing a reclining seat when the backrest 62 is reclined to the most reclined position (i.e., a full-flat position); FIG. 67B is a side view showing the wire take-up member 998 when the backrest 62 is in the full-flat position; and FIG. 67C is a side view showing the retractor 900 when the backrest 62 is in the full-flat position.

As shown in FIG. 67B, the lever-side end section of the wire 992 is coiled around the guide groove 998b of the wire take-up member 998 until the backrest 62 becomes full flat. As a result, as shown in FIG. 67C, the sensor case 936 pivots about the pivot axis T by way of the case support member 937 by the amount corresponding to the amount of the wire 992 being coiled and is adjusted toward an appropriate orientation.

Figure 68:
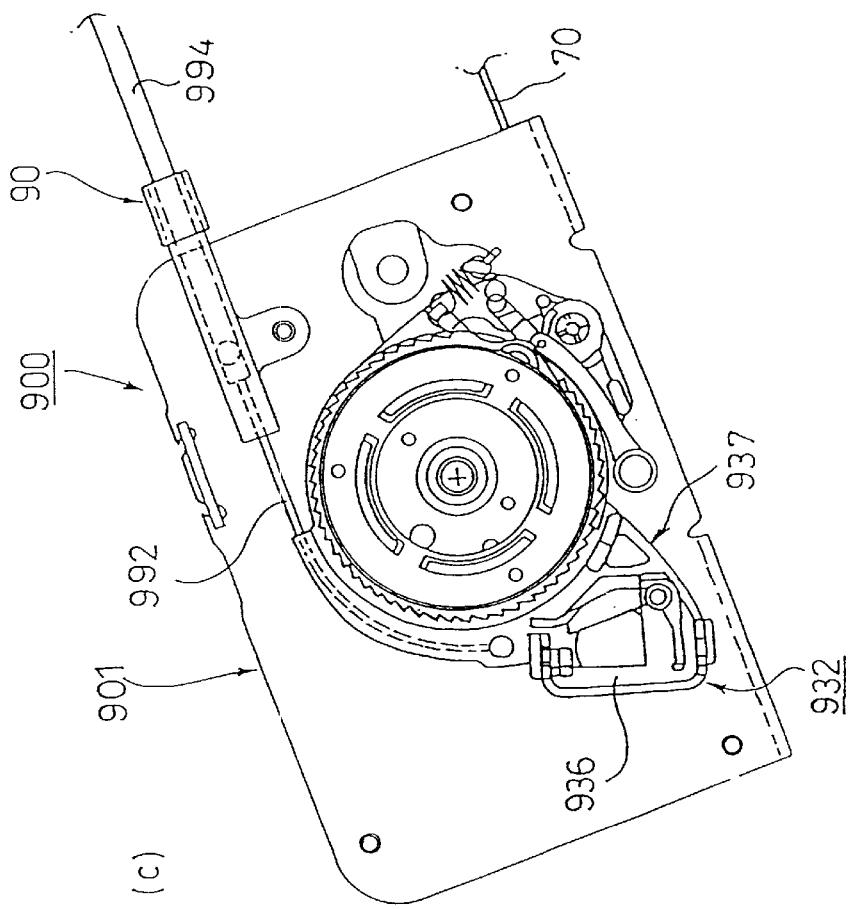
FIG. 68A is a side view showing a reclining seat when a backrest is reclined forwardly from the state such as that shown in FIG. 66.
FIG. 68B is a side view showing a wire take-up member when the backrest is reclined as shown in FIG. 68A.
FIG. 68C is a side view showing a retractor when the backrest is reclined as shown in FIG. 68A.
Figure 68:
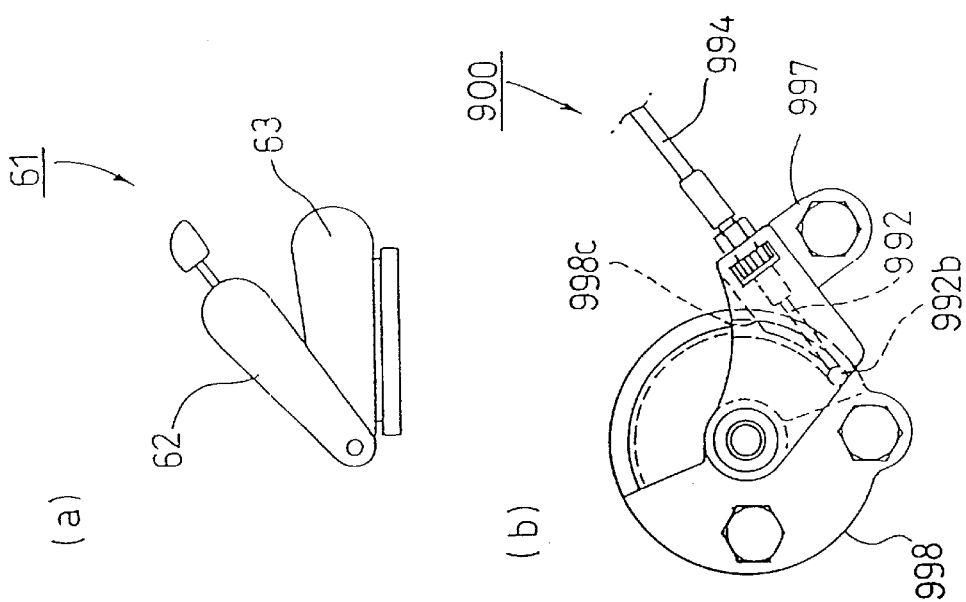

FIG. 68A is a side view showing a reclining seat when the backrest 62 is reclined from the position shown in FIGS. 66A to 66C; FIG. 68B is a side view showing the wire take-up member 998 when the backrest 62 is in the position shown in FIG. 68A; and FIG. 68C is a side view showing the retractor 900 when the backrest 62 is in the position shown in FIG. 68A.

As shown in FIG. 68A, when the backrest 62 is reclined forwardly, the wire lever 997 pivots in a clockwise direction together with the backrest 62. During the course of reclining of the backrest 62 from the full flat position to the most forward position within the range in which the occupant can take the seat, the wire lever 997 moves in relation to the terminal member 992b of the wire 992. However, after passage of the most forward position, the terminal member 992a of the wire 992 moves in cooperation with the wire lever 997 and travels within the groove 998c that takes as the center of radius the pivot of the wire lever 997. As a result, the wire 992 does not protrude from the lever-side end thereof or is not withdrawn from the retractor-side end thereof, thereby preventing the case support member 937 from pivoting in synchronization with the backrest 62.

In the state in which the backrest 62 is reclined forward from the range in which the occupant can take the seat, i.e., the state in which the synchronous movement of the vehicle body acceleration sensor 932 is canceled, the sensor case 936 remains stationary and does not protrude outward from the side surface of the retractor base 901. Therefore, the retractor 900 is prevented becoming bulky and can be made compact.

Even when the vehicle body sensor 932 is locked in the foregoing canceled state, the seat belt is already completely taken up. Further, the vehicle body acceleration sensor is provided with the end lock prevention means, thereby enabling withdrawal of the seat belt and eliminating a difficulty in reclining the backrest upward.

Figure 69:
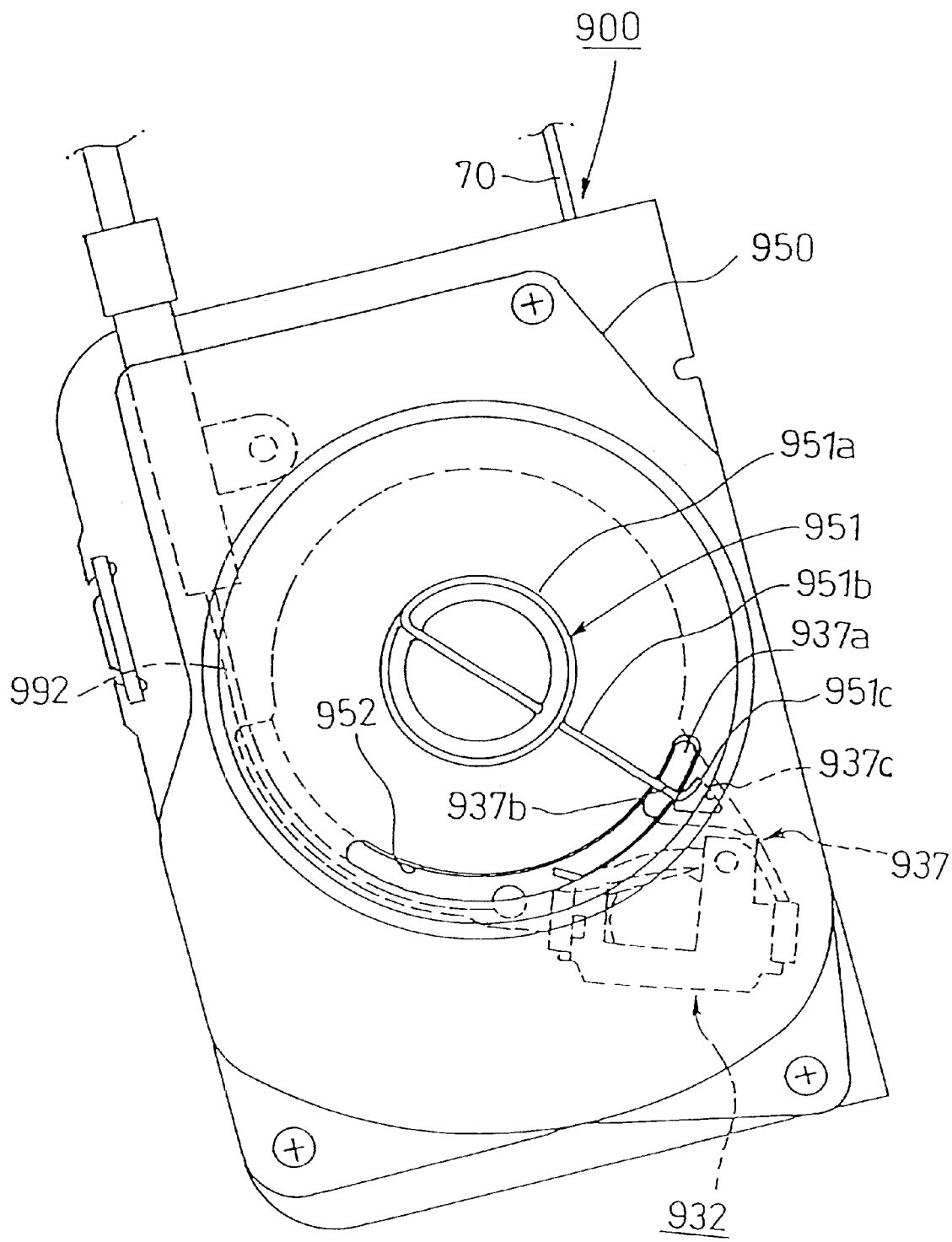
FIG. 69 is a front view showing the seat belt retractor shown in FIG. 60 when a sensor cover is attached to the retractor.

FIG. 69 is a front view showing the seat belt retractor 900 equipped with a sensor cover 950. As shown in FIG. 69, a spring 951 is attached to the outer peripheral surface of a sensor cover 950. The spring 951 comprises a coil section 951a, and a leg section 951b. The leg section 951b is provided with a claw 951c. The claw 951c of the spring 951 engages a step 937b of a protuberance 937a formed on the case support member 937, and the tip end of the claw 951c engages a hole 937C of the case support member 937, thereby urging the case support member 937 in a counter-clockwise direction.

Although the case support member 937 pivots in association with the movement of the wire 992 in the manner as mentioned above, a circular-arc hole 952 which permits insertion of the protuberance of 937 of the case support member 937 is formed in the sensor cover 950 so as to permit pivotal movement of the case support member 937. While the case support member 937 is pulled by means of the wire 992, the case support member 937 is urged in a counterclockwise direction by the restoration force of the spring 951, thereby generating tension between the case support member 937 and the wire 992. As a result, even if the case support member 937 is stopped during its pivotal movement, the vehicle body acceleration sensor 932 is maintained in an appropriate stationary condition.

The groove 998c of the wire take-up member 998 according to the ninth embodiment is not limited to the shape of a circular arc, and the groove 998c may assume any shape, so long as the shape ensures a region in which the wire lever 997 can work in cooperation with the terminal member 992a of the wire 992 when pivoting.

Figure 70:
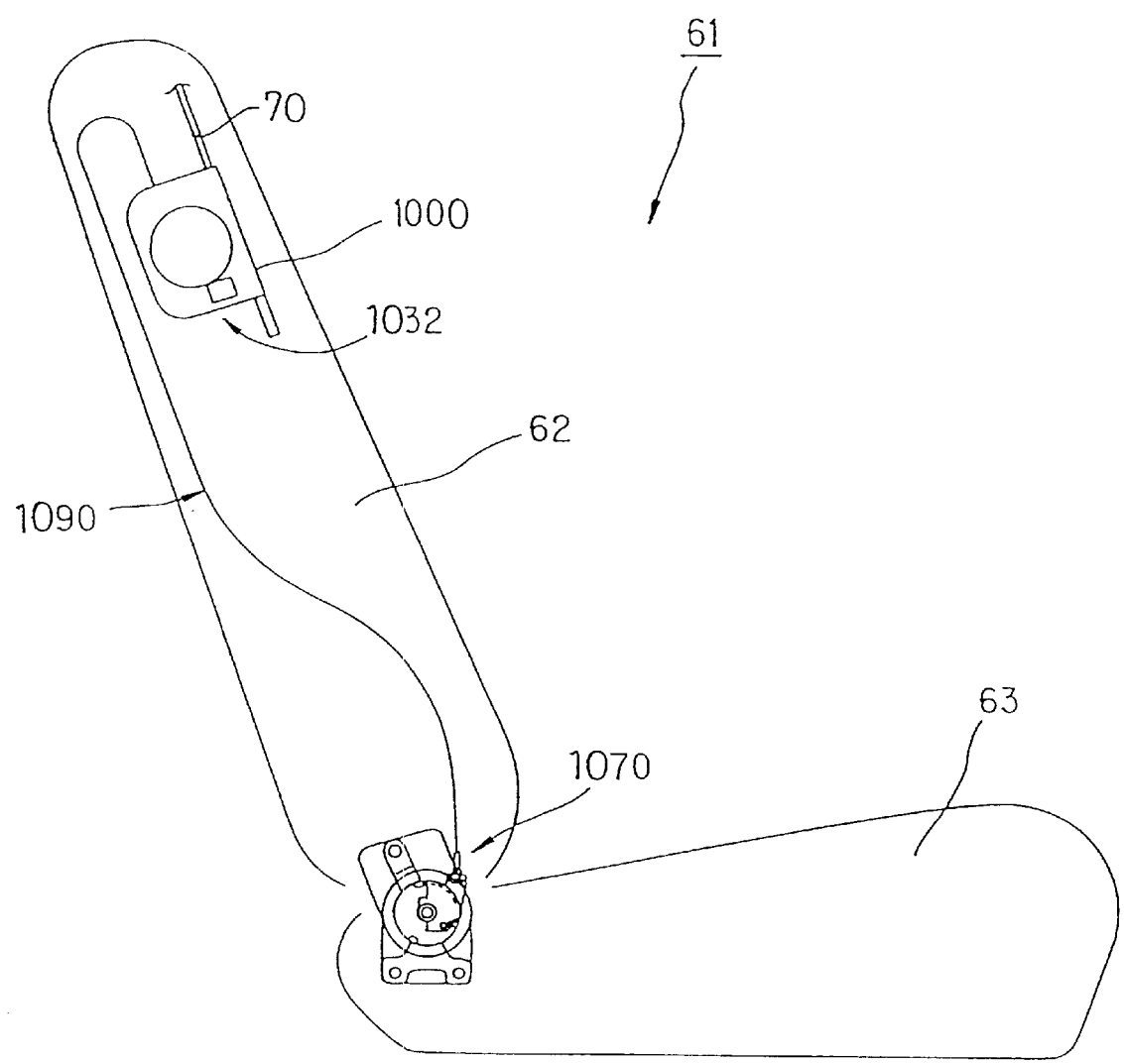
FIG. 70 is a schematic side view showing a reclining seat, wherein a seat belt retractor having a vehicle body acceleration sensor for use with a seat belt according to a tenth embodiment is incorporated in a backrest.

FIG. 70 is a schematic side view showing a reclining seat, wherein a seat belt retractor 1000 having a vehicle body acceleration sensor 1032 for use with a seat belt according to a tenth embodiment is incorporated in a backrest.

The seat belt retractor 1000 is built in the backrest 62 of the reclining seat 61 mounted on a vehicle body. The backrest 62 is connected to the seat portion 63 so as to be pivotal about a seat reclining pivot extending in the widthwise direction of the vehicle body. According to the physique of an occupant, the inclination of the backrest 62 is adjusted.

Figure 71:
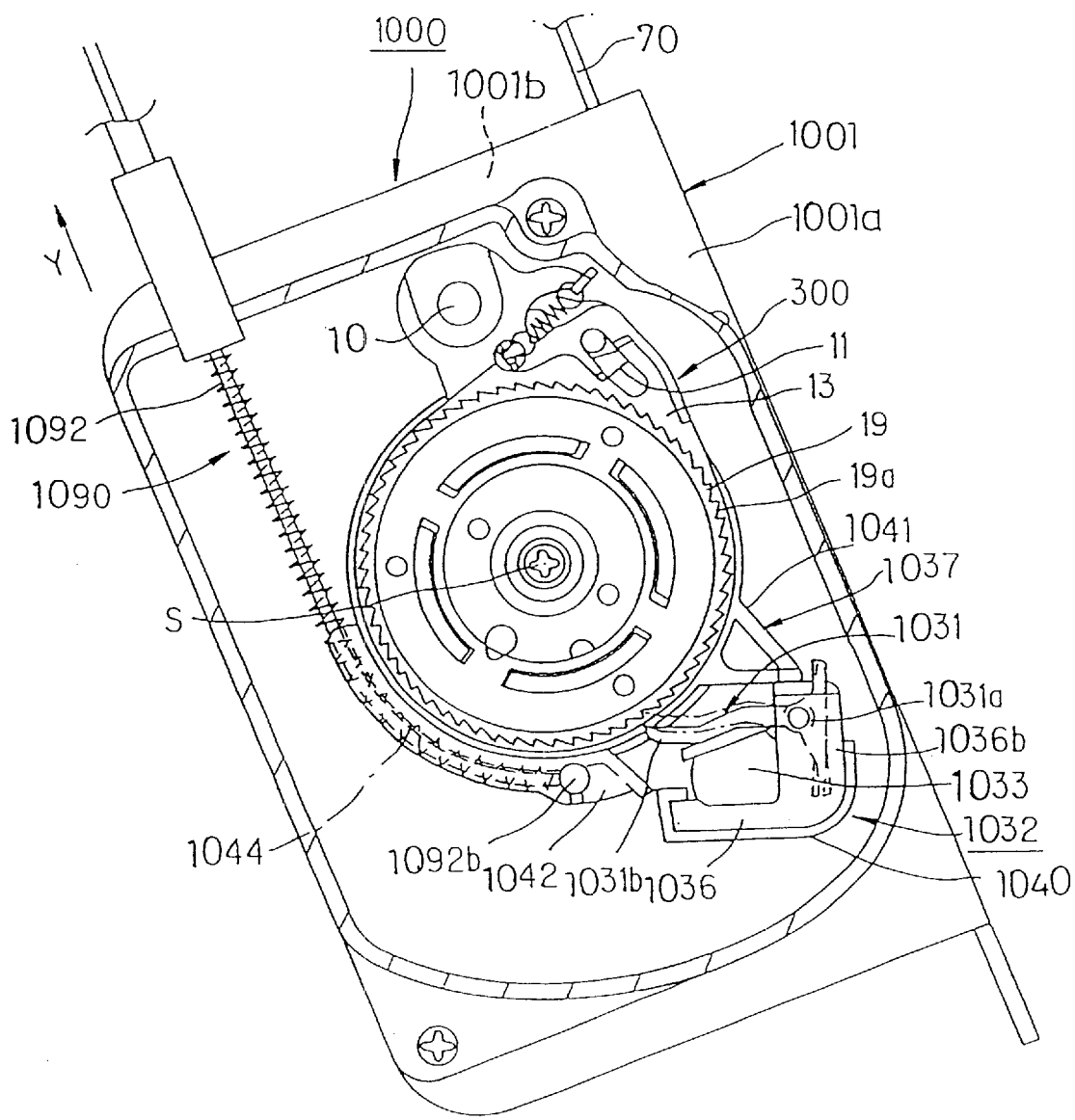
FIG. 71 is a side view showing the seat belt retractor shown in FIG. 70.
Figure 72:
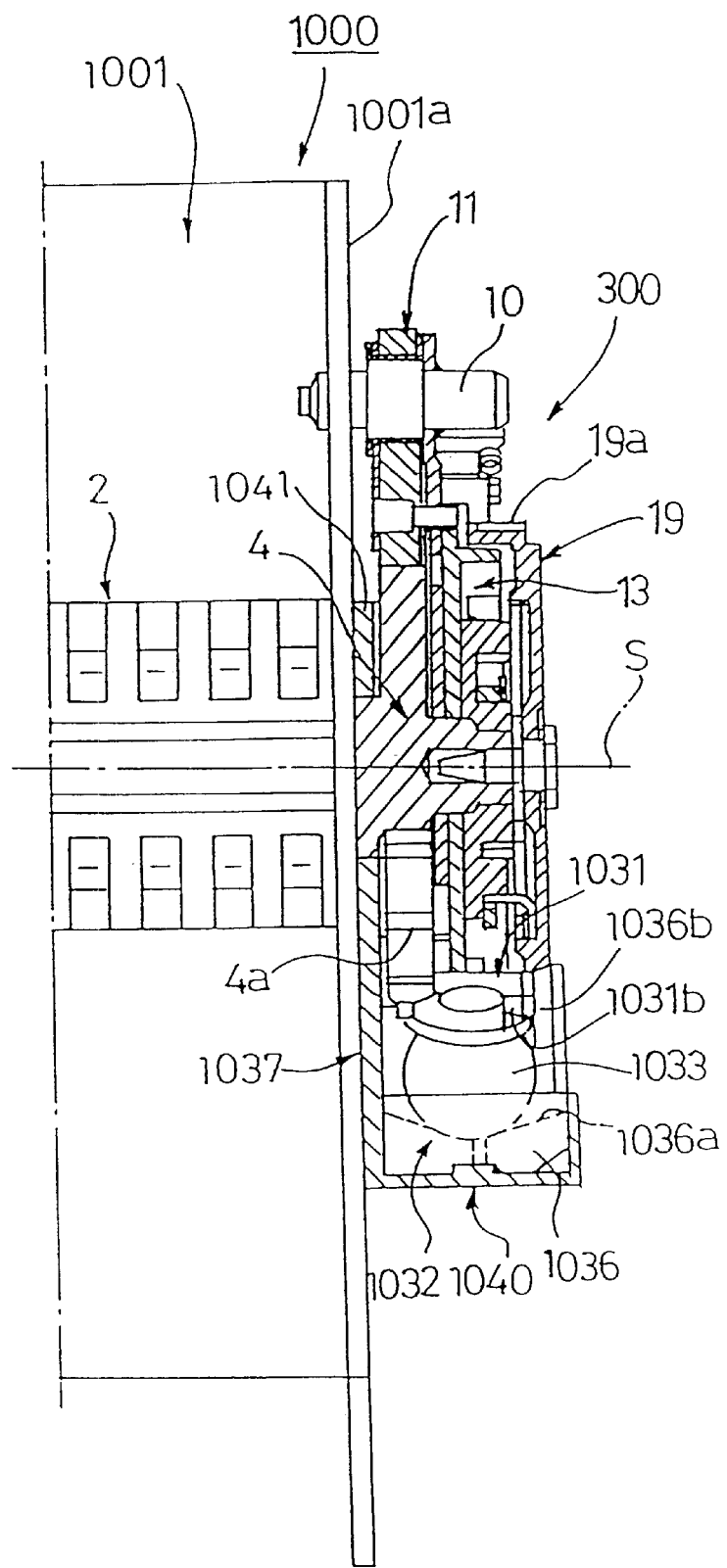
FIG. 72 is a cross-sectional view showing the principle elements of the seat belt retractor shown in FIG. 71.

As shown in FIGS. 71 and 72, the seat belt retractor 1000 comprises the substantially cylindrical bobbin 2 around which a webbing 70 is wound; the take-up shaft 4 which is inserted into the bobbin 2, is rotatively supported by means of the retractor base 1001, and has at one end thereof (i.e., on the right-side of the take-up shaft 4 shown in FIG. 72) the latch plate 4a formed from a ratchet wheel; and the emergency lock mechanism 300 which is identical to those described with reference to the preceding embodiments.

The retractor base 1001 mounted on a frame member (not shown) of the backrest 62 is formed from a metal plate through press molding such that the majority of the retractor base 1001 assumes a substantially angular C-shaped cross section. The take-up shaft 4 fitted into the bobbin 2 is rotatable and sandwiched between both sides plates 1001a and 1001b of the retractor base 1001. The end of the take-up shaft 4 that passes through the side plate 1b of the retractor base 1001 is provided with a known take-up device (not shown). At all times, the take-up device urges the bobbin 2, in the direction in which the webbing 70 is taken up, by way of the take-up shaft 4.

The vehicle body acceleration sensor 1032 according to the tenth embodiment is provided below the ratchet wheel 19 constituting the emergency lock mechanism 300.

As shown in FIGS. 71 and 72, the vehicle body acceleration sensor 1032 according to the tenth embodiment comprises a sensor arm 1031, a sensor case 1036, an inertial body 1033, a case support member 1037, and a transmission means 1090.

The sensor case 1036 comprises an inertial body support surface 1036a on which the inertial body 1033 is placed, and an arm support section 1036*b* that rotatively supports the sensor arm 1031. The inertial body support surface 1036*a* of the sensor case 1036 is formed into the shape of a fan having its center extending below the main portion of the fan.

The case support member 1037 comprises a case support section 1040 in which the sensor case 1036 is removably fitted; a pivot section 1041 which extends upward from one side of the case support section 1040 and is rotatably supported by the retractor base 1001; and a joint section 1042 to be connected to the terminal member 1092*b* of the inner cable 1092.

The pivot section 1041 of the case support member 1037 is supported so as to be able to pivot about the pivot axis T of the take-up shaft 4. When the backrest 62 is reclined by means of the transmission means 1090 connected to the joint section 1042, the case support member 1037 is pivoted in synchronization with the reclining action of the backrest 62, thereby adjusting the sensor case 1036 of the vehicle body acceleration sensor 1032 in an appropriate orientation.

As shown in FIG. 71, a pin section 10 provided at the base end of the sensor arm 1031 is rotatively supported by the sensor case 1036. While the sensor case 1036 is attached to the retractor 1000, the sensor arm 1031 can be pivoted about the pin section 1031*a* thereof and can switch between a first position—where a leading edge 1031*b* engages the teeth 19*a* of the ratchet wheel 19 to thereby prevent the take-up shaft 4 from rotating in the direction in which the webbing is drawn-out—and a second position—where the leading edge 1031*b* is disengaged from the teeth 19*a* to thereby prevent actuation of the lock means.

When the leading edge 1031*b* of the sensor arm 1031 engages the teeth 19*a* of the ratchet wheel 19, the ratchet wheel 19 rotates so as to lag behind the take-up shaft 4. As a result, the pole 11 engages the latch plate 4*a* by way of the latch cup 13, thereby preventing rotation of the take-up shaft 4 in the direction in which the webbing is drawn-out. Further, the inertial body 1033 assumes a spherical shape and is placed on the inertial body support surface 1036*a*. Upon receipt of a velocity change greater than a predetermined magnitude, the inertial body 1033 moves in relation to the inertial body support surface 1036*a*, thereby moving to the first position the sensor arm 1031 that remains in contact with the outside of the inertial body 1033.

Figure 73:
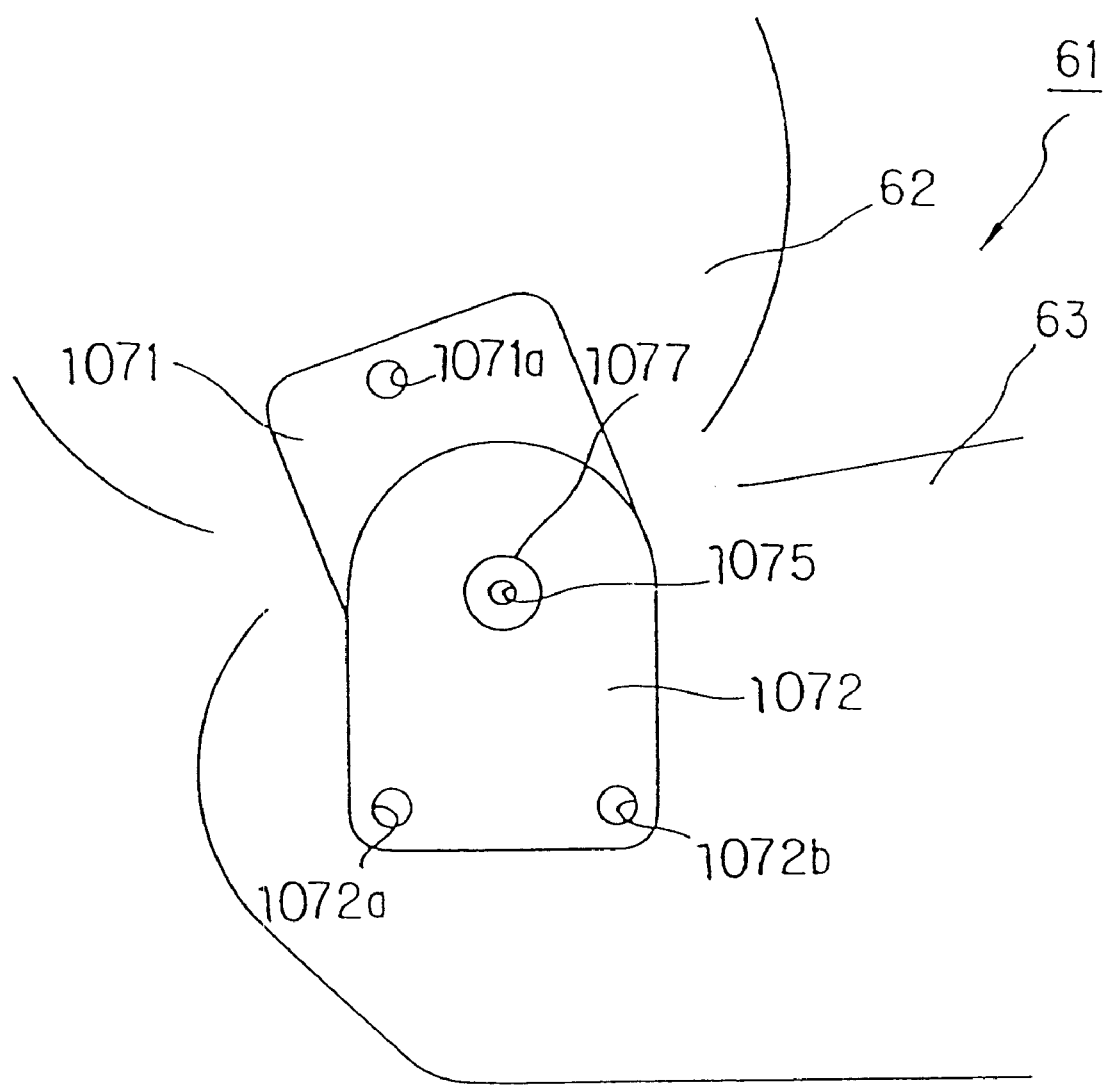
FIG. 73 is an enlarged fragmentary view showing the reclining seat shown in FIG. 70.

FIG. 73 is an enlarged fragmentary view showing the reclining seat 61 according to the tenth embodiment. As shown in FIG. 73, the backrest 62 is connected to the seat portion 63 so as to be pivotal about a seat reclining pivot (a seat reclining pivot) 1077 extending in the widthwise direction of the vehicle body. According to the physique of an occupant, the inclination of the backrest 62 is adjusted. A first plate 1071 is attached to the backrest 62,and a second plate 1072 is attached to the seat portion 63.

A first mount hole 1071*a* is formed in the first plate 1071 for the purpose of attaching the first plate 1071 to the backrest 62. A second mount hole 1072*a* and a third mount hole 1072*b* are formed in the second plate 1072 for the purpose of attaching the second plate 1072 to the seat portion 63. A circular cap 1075 is provided at the end surface of the seat reclining pivot 1077 that passes through the first and second plates 1071 and 1072.

Figure 74:
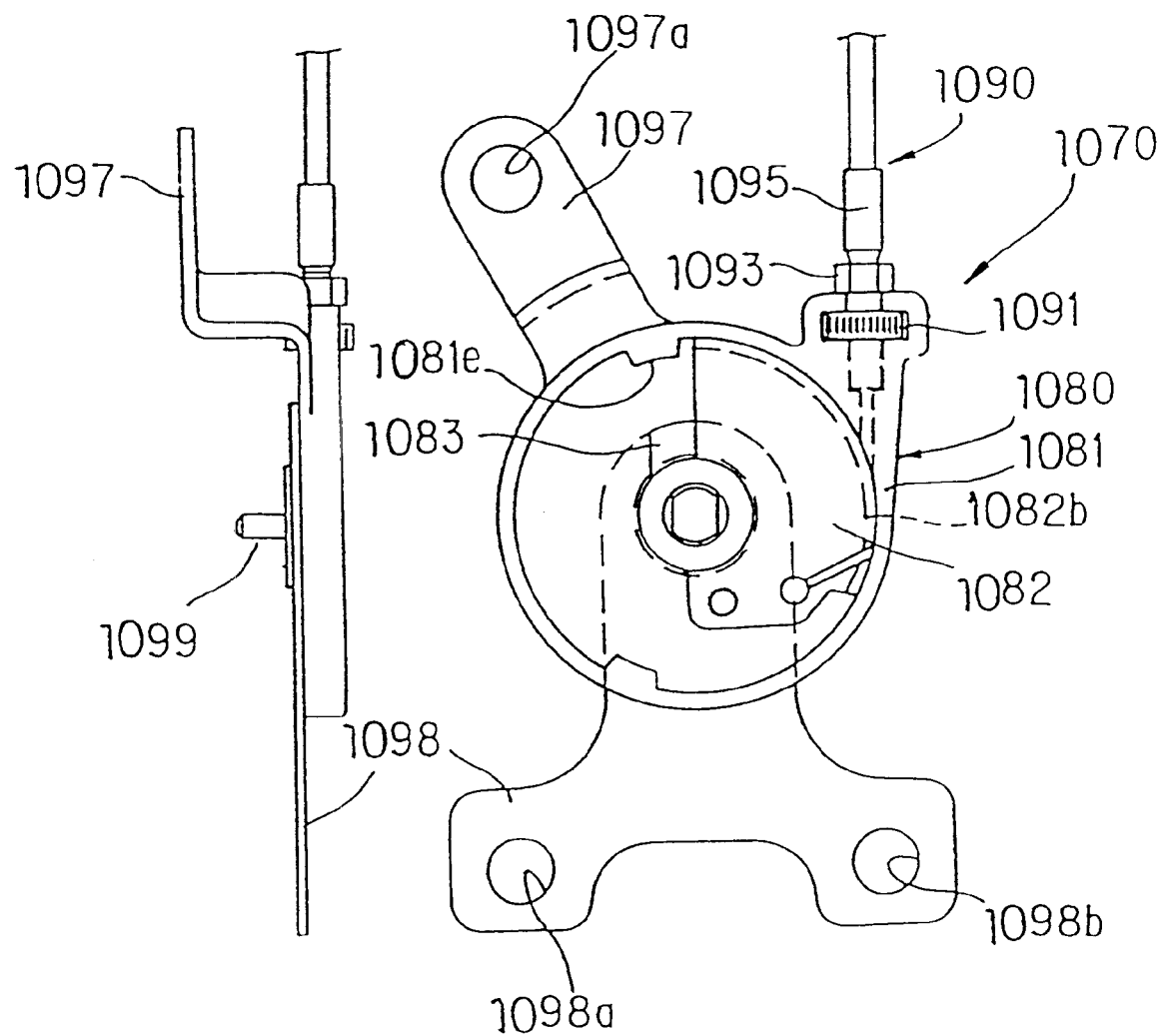
FIG. 74 provides a schematic side view and a front view, both of which show angle sensing means shown in FIG. 70.

FIG. 74 shows a schematic side view showing angle sensing means 1070 for sensing the reclining angle of the backrest according to the tenth embodiment. As shown in FIG. 74, the angle sensing means 1070 constituting the transmission means 1090 comprises a take-up member 1080 for sensing the reclining angle of the backrest 62 by detection of relative turning movement between a case 1081 which pivots in conjunction with the backrest 62 and a slider 1082 which is provided in the seat portion by way of a lever 1083 fixed to a seat portion fixture member 1098.

Through detection of relative turning movement between the case 1081 and the seat portion fixture member 1098, the reclining angle of the backrest 62 is sensed, whereby the case support member 1037 is pivoted in synchronization with the reclining action of the backrest 62 by way of the inner cable 1092. A first mount hole 1097*a* is formed in a backrest fixing member 1097 formed integrally with the case 1081, and a second mount hole 1098*a* and a third mount hole 1098*b* are formed in the sear portion fixture member 1098.

A pin member 1099—which serves as a pivot of the angle sensing means 1070 provided concentric with the seat reclining pivot of the backrest 62—is attached to the seat portion fixture member 1098. The pin member 1099 assuming the shape of a cylindrical protrude is fitted into the cap 1075 of the seat reclining pivot 1077. The pin member 1099 may be formed integrally with the seat portion fixture member 1098. The tip end of the pin member 1099 is chamfered so as to become readily enter the cap 1075.

Centering takes place through use of the pin member 1099 and the cap 1075. Subsequently, the first mount hole 1097*a* of the backrest fixing member 1097 is fitted to the first mount hole 1071*a* of the first plate 1071; the second mount hole 1098*a* of the seat portion fixture member 1098 is fitted to the second mount hole 1072*a* of the second plate 1072; and the third mount hole 1098*b* of the seat portion fixture member 1098 is fitted to the third mount hole 1072*b* of the second plate 1072. The seat portion fixture member 1098, the first plate 1071, and the second plate 1072 are fixed to the backrest 62 and the seat portion 63 by means of bolts.

Since the pin member 1099 of the angle sensing means 1070 is fitted into the cap 1075 of the seat reclining pivot 1077, the seat reclining pivot of the backrest 62 can be brought in alignment with the pivot axis of the angle sensing means 1070.

Thus, since there is match between the reclining angle of the backrest 62 and the pivoting angle of the angle sensing means 1070, the transmission means 1090 can correctly adjust the orientation of the sensor case 1036 of the vehicle body acceleration sensor 1032.

Further, there are required only provision of the pin member 1099 to the seat portion fixture member 1098 which fits to the cap 1075 and provision of the cap 1075 to the seat reclining pivot 1077, thereby preventing an increase in manufacturing costs.

Both the angle sensing means 1070 and the reclining seat 61 are formed from a plurality of components, and offsets of the pitch inevitably arise for reasons of dimensional tolerance and clearance among moving parts. However, if the angle sensing means 1070 is offset, the reclining angle of the backrest cannot be detected correctly.

However, the first mount hole 1097*a* of the backrest fixing member 1097, the second mount hole 1098*a* of the seat portion fixture member 1098, and the third mount hole 1098*b* of the seat portion fixture member 1098 are set so as to assume a hole diameter greater than the diameter of a bolt. Even if there are offsets between the first mount hole 1097*a* and the first mount hole 1071*a;* the second mount hole 1098*a* and the second mount hole 1072*a;* and the third mount hole 1098*b* and the third mount hole 1072*b,* the seat portion fixture member 1098, the first plate 1071, and the second plate 1072 are fixed to the backrest 62 and the seat portion 63. The first mount hole 1097*a,* the second mount hole 1098*a*, and the third mount hole 1098*b* may be formed into the shape of an elongated hole.

Accordingly, the angle sensing means 1070 can allow offset of the pitch at which the angle sensing means 1070 is secured to the backrest 62. Therefore, formation of a mount hole does not require a high degree of dimensional precision, thereby enabling a reduction in manufacturing costs.

Figure 75:
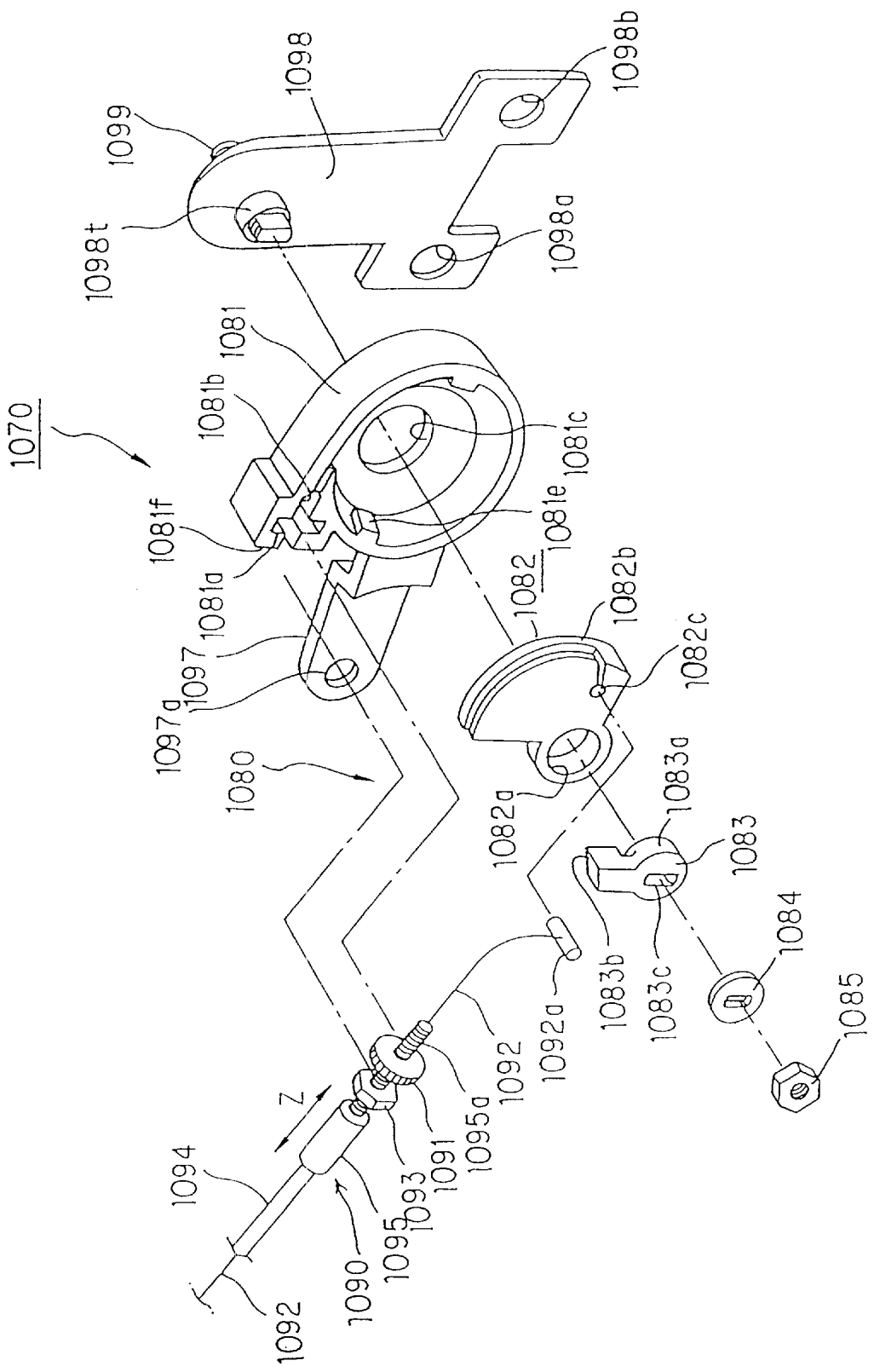
FIG. 75 is an exploded perspective view showing the angle sensing means shown in FIG. 74.

As shown in FIG. 75, the take-up member 1080 comprises a case 1081 which houses an inner cable 1092 serving as a transmission member of transmission means 1090 and has a backrest fixing member 1097; a substantially-fan-shaped slider 1082 around which the inner cable 1092 is coiled; a lever 1083 which hinders pivotal movement of the slider 1082 by means of a protuberance 1083*b* and has a cylindrical portion 1083*a* serving as the pivot of the slider 1082; and a nut 1085 which enables fixing of the lever 1083 to a protuberance 1098*t* of the seat portion fixture member 1098 by way of the washer 1084. Here, the lever 1083 may be fixed by caulking the protuberance 1098*t* of the seat portion fixture member 1098 without use of the washer 1084 and the nut 1085.

The case 1081 comprises a trench 1081*b* for housing a threaded portion 1095*a* of a joint 1095 formed on a seat-reclining-pivot-side end section of an outer tuber 1094 constituting the transmission means 1090; a screw receive hole 1081*a* for housing an adjustment screw 1091 which is screw-engaged with the threaded portion 1095*a*; a mount hole 1081*c* in which the cylindrical section 1083*a* of the lever 1083; and a protuberance 1081*e* for preventing pivotal movement of the slider 1082.

The slider 1082 comprises a hollow cylinder 1082*a* pivotally supported by the cylindrical portion 1083*a* of the lever 1083; a circular-arc shaped guide groove 1082*b* around which the inner cable 1092 is coiled; and a hole 1082*c* in which a terminal end member 1092*a* of the inner cable 1092 is secured.

Further, the transmission means 1090 comprises an adjustment screw 1091 and a nut 1093, both of which are attached to the threaded section 1095*a* of the joint 1095. Through adjustment of the adjustment screw 1091 housed in the screw receive hole 1081*a* of the case 1081 and the adjustment screw 1093 provided so as to be in contact with an end section 1081*f* of the case 1081, as required, the joint 1095 whose threaded section 1095*a* is housed in the trench 1081*b* of the case 1081 is moved in direction of Z, thereby enabling control of projection of the inner cable 1092 whose one end is fixed to the joint 1095.

When the backrest 62 shown in FIG. 70 is reclined backward, the slider 1082 is pulled by the inner cable 1092 and attempts to pivot in a counterclockwise direction. However, since the slider 1082 is pressed by the protuberance 1083*b* of the lever 1083, the slider 1082 cannot pivot. In contrast, as the backrest 62 is reclined, the case 1081 pivots in a counterclockwise direction together with the backrest 62, and hence the end sections of the slider 1082 and the inner cable 1092 remain stationary. When the case 1081 pivots in a counterclockwise direction, the inner cable 1092 protrudes and is coiled around the guide groove 1082*b* of the slider 1082.

As shown in FIG. 71, the inner cable 1092 is pulled in direction of Y. Since one end of the inner cable 1092 is joined to the case support member 1037 and the inner cable 1092 per se travels along the take-up surface 1044 concentric with the take-up shaft 4, the center case 1036 retained by the case support member 1037 also pivots in a clockwise direction about the take-up shaft 4.

If the radius of the wire 1092 coiled around the guide groove 1082*b* of the slider 1082 is set so as to equal to the radius of the inner cable 1092 coiled around the take-up surface 1044 by way of the spring 1089, the retractor-side end section of the inner cable 1092 moves over the distance corresponding to the length of the inner cable 1092 being coiled around the slider 1082 as a result of reclining of the backrest 62, and hence the sensor case 1036 pivots through an angle corresponding to the reclining angle of the backrest 62.

Accordingly, since the sensor case 1036 is retained in an appropriate orientation (i.e., an upright position) regardless of the reclining angle of the backrest 62, the vehicle body acceleration sensor can sense the acceleration of the vehicle body without fail.

Figure 76:
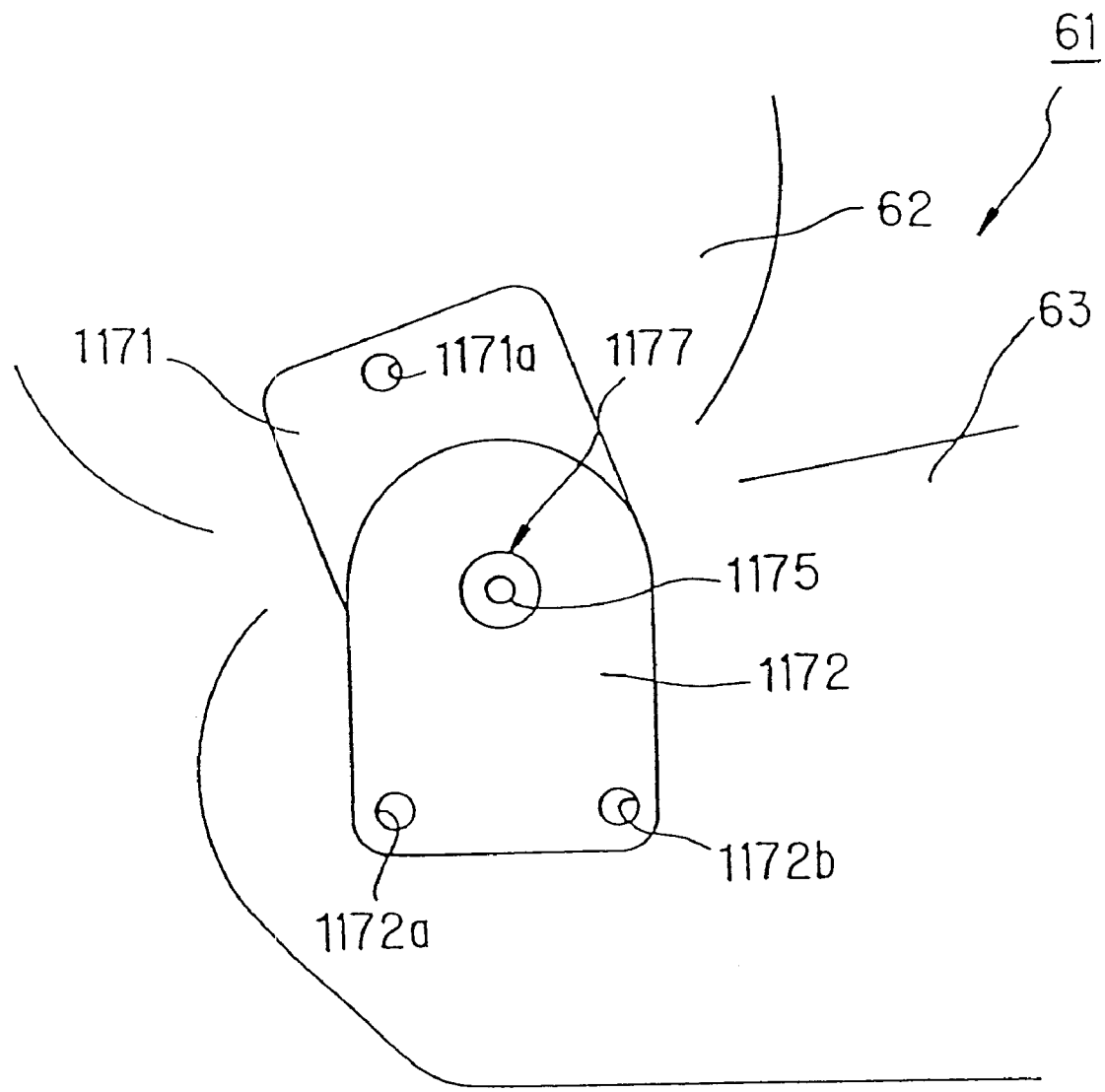
FIG. 76 is an enlarged fragmentary view showing a reclining seat related to a modification of the angle sensing means.
Figure 77:
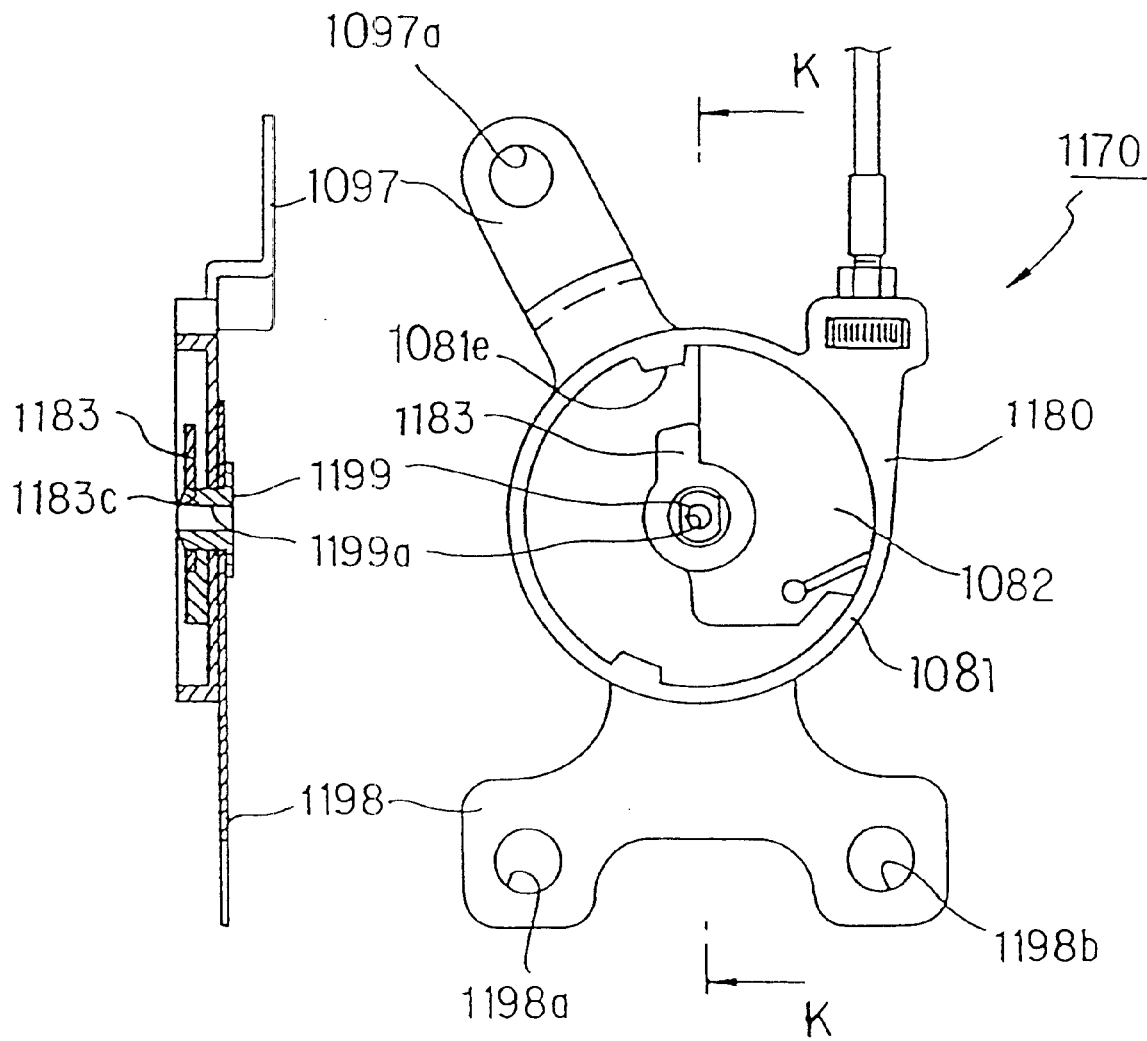
FIG. 77 is a schematic side view showing a modification of the angle sensing means and a cross-sectional view of the same when viewed in direction of arrow K—K.
Figure 78:
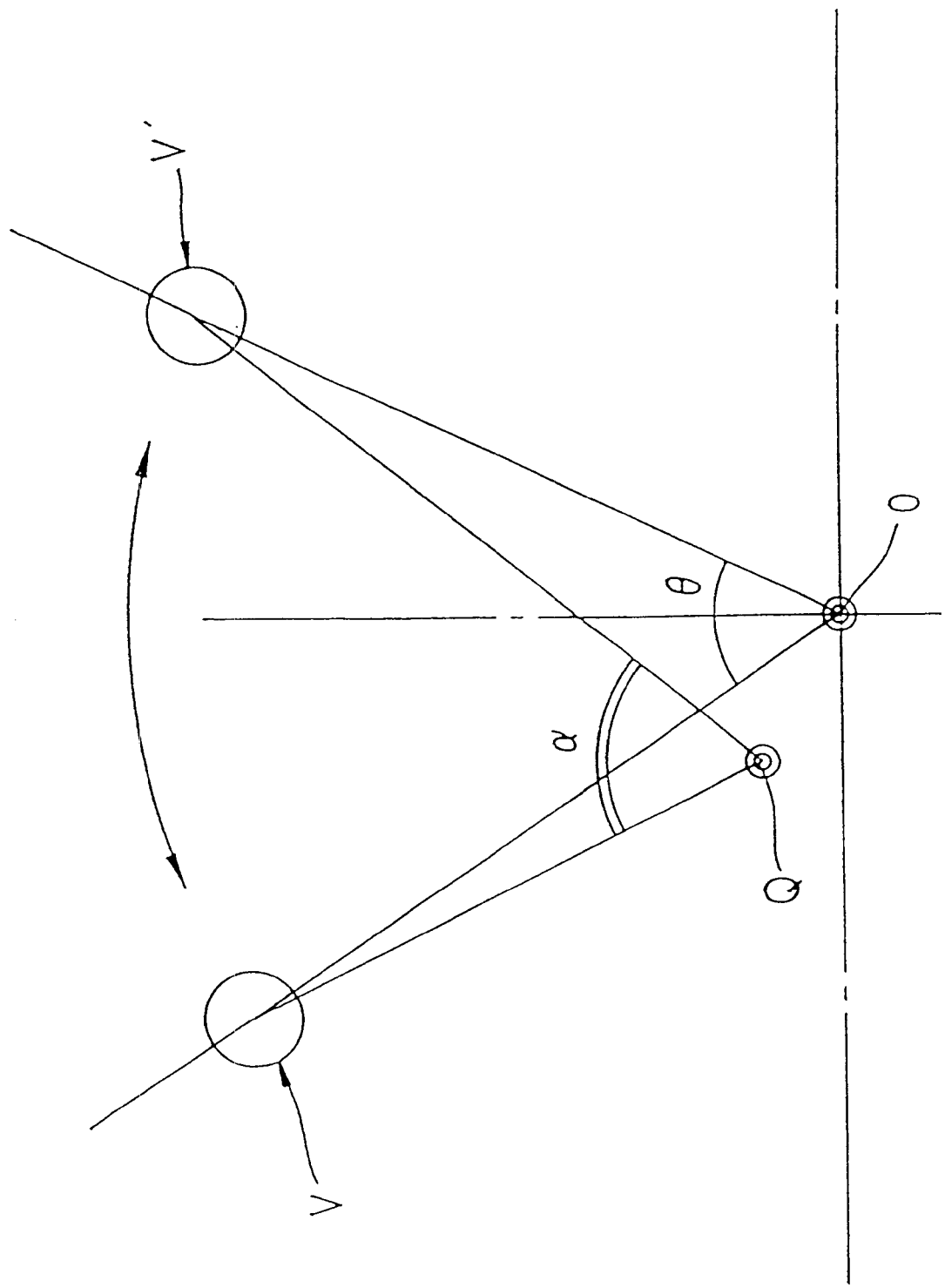
FIG. 78 is a schematic representation for describing a conventional technique.

FIGS. 76 and 77 show a modification of the angle sensing means according to the tenth embodiment.

As shown in FIG. 76, as in the case with the tenth embodiment, the backrest 62 is connected to the seat portion 63 so as to be able to pivot about a seat reclining pivot 1177. The backrest 62 has a first plate 1171, and a second plate 1172 is attached to the seat portion 63.

The first plate 1171 has a first mount hole 1071*a* used for attaching the first plate 1171 to the backrest 62, and the second plate 1172 has a second mount hole 1172*a* and a third mount hole 1172*b*, both of which are used for attaching the second plate 1172 to the seat portion 63. A circular cap 1175 is provided at the end surface of the seat reclining pivot 1177 that passes through the first and second plates 1171 and 1172.

As shown in FIG. 77, angle sensing means 1170 for sensing the reclining angle of the backrest comprises a take-up member 1180 for sensing the reclining angle of the backrest 62 by detection of relative turning movement between the case 1081 which pivots in conjunction with the backrest 62 and the slider 1082 which is provided in the seat portion by way of the lever 1183 fixed to a seat portion fixture member 1098.

Through detection of relative turning movement between the case 1081 and the seat portion fixture member 1198, the reclining angle of the backrest 62 is sensed, whereby the case support member 1037 is pivoted in synchronization with the reclining action of the backrest 62 by way of the inner cable 1092. A first mount hole 1097*a* is formed in a backrest fixing member 1097 formed integrally with the case 1081, and a second mount hole 1198*a* and a third mount hole 1198*b* are formed in the sear portion fixture member 1198.

A pin member 1199—which serves as a pivot of the angle sensing means 1170 provided concentric with the seat reclining pivot of the backrest 62—is attached to the seat portion fixture member 1198.

A circular hole 1199*a* serving as an indentation is formed in the pin member 1199 and fittingly receives the cap 1175 of the seat reclining pivot 1177.

Centering takes place through use of the pin member 1199*a* and the cap 1175. Subsequently, the first mount hole 1097*a* of the backrest fixing member 1097 is fitted to the first mount hole 1171*a* of the first plate 1171; the second mount hole 1198*a* of the seat portion fixture member 1198 is fitted to the second mount hole 1172*a* of the second plate 1172; and the third mount hole 1198*b* of the seat portion fixture member 1198 is fitted to the third mount hole 1172*b* of the second plate 1172. The seat portion fixture member 1198, the first plate 1171, and the second plate 1172 are fixed to the backrest 62 and the seat portion 63 by means of bolts. The second mount hole 1198*a* and the third mount hole 1198*b* are also set so as to assume a hole diameter greater than the diameter of the bolt.

Since the hole 1199*a* of the angle sensing means 1170 fittingly receives the cap 1175 of the seat reclining pivot 1177, the seat reclining pivot of the backrest 62 can be brought in alignment with the pivot axis of the angle sensing means 1170.

Thus, since there is match between the reclining angle of the backrest 62 and the pivoting angle of the angle sensing means 1170, the transmission means 1090 can correctly adjust the orientation of the sensor case 1036 of the vehicle body acceleration sensor 1032.

The shapes of the protrusion and the recess formed in the seat portion of the backrest and the pivot of the angle sensing means according to the embodiments are not limited to circular shapes or other shapes mentioned with reference to the embodiments. Polygonal shapes or other shapes may be employed, so long as the shapes enable fitting of elements.

The lock means, the sensor arm, the sensor case, and the inertial body according to the present invention mentioned with reference to the embodiments are not in configuration to the examples mentioned in the preceding embodiments. It goes without saying that they may be modified, as required.

For instance, although in the previous embodiments although the pivot of the sensor case is brought into alignment with the rotation center of the take-up shaft, the sensor case may be pivotally supported on the retractor base in a position outside the rotation center of the take-up shaft.

Further, although the sensor arm is attached to the sensor case in the embodiments, the sensor arm may be pivotally supported on the retractor base apart from the sensor case, so long as the pivot of the sensor case passes through the center of the spherical inertial body.

Further, in place of the latch plate constituting the lock means, there may be employed a configuration in which a pole meshes internal teeth of a retractor base.

The vehicle body acceleration sensor for use with a seat belt according to the present invention is not limited to the embodiments in terms of a specific configuration of the transmission means for pivoting the sensor case in synchronization with the reclining action of the backrest and a structure for incorporating the sensor case into the retractor base, and can be modified, as required, within the scope of the invention.

INDUSTRIAL APPLICABILITY

As has been described above, a vehicle body acceleration sensor for use with a seat belt according to the present invention is useful as a vehicle body acceleration sensor for use with a seat belt which is attached to a backrest of a reclining seat. Particularly, the sensor is suitable when it is attached to a retractor fixed in a backrest of a reclining seat which is reclined from the maximum forward position to the full flat position.

What is claimed is:

1. A vehicle body acceleration sensor for use with a seat belt comprising:
   a sensor case which is movably supported by a retractor base attached to a backrest of a vehicle reclining seat;
   a sensor arm which is pivotally supported by one of the sensor case and the retractor base in such a way as to shift between a first position where lock means is activated so as to prevent rotation of a take-up shaft, around which a webbing is wound, in a direction in which the webbing is drawn-out and a second position where the lock means is deactivated;
   an inertial body which moves in relation to an inertial body support surface of the sensor case upon receipt of a velocity change greater than a predetermined magnitude to thereby move the sensor arm to the first position; and
   transmission means for pivoting the sensor case in synchronization with reclining action of the backrest in such a way as to retain the inertial body support surface in an appropriate orientation regardless of reclining angle of the backrest, wherein the lock means is activated by means of movement of the inertial body when an acceleration of predetermined magnitude acts on the vehicle body;
   wherein the transmission means comprises a transmission member which can be wrapped around a take-up member provided concentrically and in line with the seat reclining pivot of the backrest, and the sensor case is pivoted in agreement with the amount of the transmission member which is wrapped around the take-up member in association with the reclining action of the backrest;
   wherein when the backrest is reclined forwardly beyond an area which enables an occupant to use the seat, the transmission member is prevented from being wrapped around the take-up member.

2. A vehicle body acceleration sensor for use with a seat belt comprising:
   a sensor case which is movably supported by a retractor base attached to a backrest of a vehicle reclining seat;
   a sensor arm which is pivotally supported by one of the sensor case and the retractor base in such a way as to shift between a first position where lock means is activated so as to prevent rotation of a take-up shaft, around which a webbing is wound, in a direction in which the webbing is drawn-out and a second position where the lock means is deactivated;
   an inertial body which moves in relation to an inertial body support surface of the sensor case upon receipt of a velocity change greater than a predetermined magnitude to thereby move the sensor arm to the first position; and
   transmission means for pivoting the sensor case in synchronization with reclining action of the backrest in such a way as to retain the inertial body support surface in an appropriate orientation regardless of reclining angle of the backrest, wherein the lock means is activated by means of movement of the inertial body when an acceleration of predetermined magnitude acts on the vehicle body, wherein the transmission means comprises a synchronous movement cancellation mechanism capable of canceling the movement of the sensor case which is in synchronization with the reclining action of the backrest.

3. The vehicle body acceleration sensor according to claim 2, wherein the transmission means comprises a transmission member which can be wrapped around a take-up member provided concentrically and in line with the seat reclining pivot of the backrest, and the sensor case is pivoted in agreement with the amount of the transmission member which is wrapped around the take-up member in association with the reclining action of the backrest.

4. The vehicle body acceleration sensor according to claim 3, wherein an end member of the transmission member facing the vehicle body acceleration sensor is wrapped about the take-up member, and the take-up member pivots the sensor case in agreement with the amount of the transmission member that is wrapped around the take-up member, by causing the winding radius of the end member of the transmission member facing the take-up member to match the winding radius of the end member of the transmission member facing the vehicle body acceleration sensor.

5. A vehicle body acceleration sensor for use with a seat belt comprising:
- a sensor case which is movably supported by a retractor base attached to a backrest of a vehicle reclining seat;
- a sensor arm which is pivotally supported by one of the sensor case and the retractor base in such a way as to shift between a first position where lock means is activated so as to prevent rotation of a take-up shaft, around which a webbing is wound, in a direction in which the webbing is drawn-out and a second position where the lock means is deactivated;
- an inertial body which moves in relation to an inertial body support surface of the sensor case upon receipt of a velocity change greater than a predetermined magnitude to thereby move the sensor arm to the first position; and
- transmission means for pivoting the sensor case in synchronization with reclining action of the backrest in such a way as to retain the inertial body support surface in an appropriate orientation regardless of reclining angle of the backrest, wherein the lock means is activated by means of movement of the inertial body when an acceleration of predetermined magnitude acts on the vehicle body; wherein the transmission means comprises:
- angle sensing means for sensing the reclining angle of the backrest by detection of relative turning movement between a member which is provided on the backrest and pivots in conjunction with a backrest and a member which is provided in a seat portion; and
- a seat pivot shaft placed in line with the seat reclining pivot of the backrest and a pivot shaft of the angle sensing means being provided concentrically and in line with the seat reclining pivot of the backrest, the pivot shafts having irregularities which mesh with each other.

6. The vehicle body acceleration sensor according to claim 5, wherein holes used for mounting said angle sensing means are formed so as to be large enough to allow offset of the pitch at which the angle sensing means is attached to the mount section of a seat portion.

7. A vehicle body acceleration sensor for use with a seat belt comprising:
- a sensor case which is movably supported by a retractor base attached to a backrest of a vehicle reclining seat;
- a sensor arm which is pivotally supported by one of the sensor case and the retractor base in such a way as to shift between a first position where lock means is activated so as to prevent rotation of a take-up shaft, around which a webbing is wound, in a direction in which the webbing is drawn-out and a second position where the lock means is deactivated;
- an inertial body which moves in relation to an inertial body support surface of the sensor case upon receipt of a velocity change greater than a predetermined magnitude to thereby move the sensor arm to the first position; and
- transmission means for pivoting the sensor case in synchronization with reclining action of the backrest in such a way as to retain the inertial body support surface in an appropriate orientation regardless of reclining angle of the backrest, wherein the lock means is activated by means of movement of the inertial body when an acceleration of predetermined magnitude acts on the vehicle body; wherein the transmission means includes:
- a cam plate whose cam surface extends in the circumferential direction from a seat reclining pivot of the backrest, and
- a transmission member which follows the cam surface of the cam plate and pivots the sensor case in conjunction with the reclining action of the backrest.

8. The vehicle body acceleration sensor according to claim 7, wherein the cam surface of the cam plate comprises:
- a synchronous movement area in which the sensor case is pivoted in synchronization with the reclining action of the backrest within only the optimum working range of the seat belt, and
- non-synchronous movement areas in which the sensor case is not pivoted in synchronization with the reclining action of the backrest.

9. The vehicle body acceleration sensor according to claim 7, wherein a cam contact section formed on a cam-plate-side end section of the transmission member which moves back and forth toward the cam surface of the cam plate is set so as to move back and forth in such a direction as to impart an optimum pressing force on the entire surface of the cam surface with which the cam contact section makes slidable, contact.

10. The vehicle body acceleration sensor according to claim 7, wherein the cam plate is fixed on a seat portion of the reclining seat, and a cam-plate-side end section of the transmission member is fixed on the backrest so as to be able to move back and forth toward the cam surface of the cam plate.

11. The vehicle body acceleration sensor according to claim 7, wherein said cam plate has an inner peripheral cam surface and extends in the circumferential direction of the seat reclining pivot of the backrest,
wherein said transmission means further comprises a follower which is provided on the inner peripheral cam surface of the cam plate so as to be able to move back and forth, and
wherein said transmission member has a cam-plate-side end section joined to the follower and a retractor-side end section joined to said sensor case and which transmits the forward and backward movement of the follower to said sensor case.

12. The vehicle body acceleration sensor according to claim 11, wherein the inner peripheral cam surface of the cam plate is provided with only a synchronous movement area in which the sensor case is pivoted in synchronization with the reclining action of the backrest within only the optimum working range of the seat belt.

13. The vehicle body acceleration sensor according to claim 11, wherein the follower has a roller which moves over the inner peripheral cam surface in a rotatable manner, and hence frictional resistance between the inner peripheral cam surface and the follower can be reduced, thereby enabling smooth forward and backward movement of the follower.

14. The vehicle body acceleration sensor according to claim 11, wherein the cam plate is mounted on a seat portion of the reclining seat, and the follower is fixed on the backrest so as to be able to move back and forth along the inner peripheral cam surface of the cam plate.

15. A vehicle body acceleration sensor for use with a seat belt comprising:

a sensor case which is movably supported by a retractor base attached to a backrest of a vehicle reclining seat;

a sensor arm which is pivotally supported by one of the sensor case and the retractor base in such a way as to shift between a first position where lock means is activated so as to prevent rotation of a take-up shaft, around which a webbing is wound, in a direction in which the webbing is drawn-out and a second position where the lock means is deactivated;

an inertial body which moves in relation to an inertial body support surface of the sensor case upon receipt of a velocity change greater than a predetermined magnitude to thereby move the sensor arm to the first position; and transmission means for pivoting the sensor case in synchronization with reclining action of the backrest in such a way as to retain the inertial body support surface in an appropriate orientation regardless of reclining angle of the backrest, wherein the lock means is activated by means of movement of the inertial body when an acceleration of predetermined magnitude acts on the vehicle body; wherein the transmission means comprises:

a slide member movably disposed in a seat portion of the reclining seat;

a cam plate which causes the slide member to advance or recede within only the pivotable range of the sensor case according to the reclining angle of the backrest; and a flexible transmission member, one end of which is connected to the slide member and the other end of which is connected to the sensor case and which transmits the movement of the slide member to the sensor case.

16. A vehicle body acceleration sensor for use with a seat belt comprising:

a sensor case which is movably supported by a retractor base attached to a backrest of a vehicle reclining seat;

a sensor arm which is pivotally supported by one of the sensor case and the retractor base in such a way as to shift between a first position where lock means is activated so as to prevent rotation of a take-up shaft, around which a webbing is wound, in a direction in which the webbing is drawn-out and a second position where the lock means is deactivated;

an inertial body which moves in relation to an inertial body support surface of the sensor case upon receipt of a velocity change greater than a predetermined magnitude to thereby move the sensor arm to the first position; and transmission means for pivoting the sensor case in synchronization with reclining action of the backrest in such a way as to retain the inertial body support surface in an appropriate orientation regardless of reclining angle of the backrest, wherein the lock means is activated by means of movement of the inertial body when an acceleration of predetermined magnitude acts on the vehicle body; wherein the transmission means comprises:

a transmission member which is actuated in synchronization with the reclining action of the backrest; and a synchronous movement cancellation mechanism which is interposed at least between a retractor-side joint section of said transmission member and the sensor case and which prevents the sensor case from moving in synchronization with the reclining action of the backrest when the backrest is reclined beyond an optimum working range of the seat belt.

17. The vehicle body acceleration sensor according to claim 16, wherein the synchronous movement cancellation mechanism comprises:

a slider which is joined to the sensor case by means of a retractor-side end section of the transmission member and has a range of movement limited to the pivotable range of the sensor case that is set to the optimum working range of the seat belt; and an elastic member which is interposed between the slider and a retractor-side joint section of the transmission member and which is resiliently deformable in the direction of movement of the slider upon receipt of a load of greater than a predetermined value.

18. The vehicle body acceleration sensor according to claim 16, wherein the synchronous movement cancellation mechanism comprises:

a gear with a cam which engages with a retractor-side joint section of the transmission member and is rotated; and the sensor case which follows the cam of the gear and pivots within a pivotable range which is set so as to correspond to the optimum working range of the seat belt.

* * * * *